US011229260B2

(12) United States Patent
Levy

(10) Patent No.: US 11,229,260 B2
(45) Date of Patent: Jan. 25, 2022

(54) PARTICULATE FOAM IN COATED CARRIER

(71) Applicant: NIKE, Inc., Beaverton, OR (US)

(72) Inventor: Cassidy R. Levy, West Linn, OR (US)

(73) Assignee: NIKE, Inc., Beaverton, OR (US)

( * ) Notice: Subject to any disclaimer, the term of this patent is extended or adjusted under 35 U.S.C. 154(b) by 361 days.

(21) Appl. No.: 16/327,551

(22) PCT Filed: Sep. 23, 2016

(86) PCT No.: PCT/US2016/053246
§ 371 (c)(1),
(2) Date: Feb. 22, 2019

(87) PCT Pub. No.: WO2017/053658
PCT Pub. Date: Mar. 30, 2017

(65) Prior Publication Data
US 2019/0223550 A1 Jul. 25, 2019

Related U.S. Application Data

(60) Provisional application No. 62/222,882, filed on Sep. 24, 2015, provisional application No. 62/222,842, (Continued)

(51) Int. Cl.
*A43B 13/12* (2006.01)
*A43B 13/18* (2006.01)
(Continued)

(52) U.S. Cl.
CPC .......... *A43B 13/141* (2013.01); *A43B 1/0072* (2013.01); *A43B 5/00* (2013.01);
(Continued)

(58) Field of Classification Search
CPC ......... A43B 13/02; A43B 13/04; A43B 13/12; A43B 13/125; A43B 13/127; A43B 13/18; A43B 13/187; A43B 13/188
See application file for complete search history.

(56) References Cited

U.S. PATENT DOCUMENTS

| 2,930,149 A | 3/1960 | Hack |
| 3,087,262 A | 4/1963 | Russell |

(Continued)

FOREIGN PATENT DOCUMENTS

| CH | 283034 A | 5/1952 |
| CN | 1053884 A | 8/1991 |

(Continued)

OTHER PUBLICATIONS

Korean Intellectual Property Office, Office Action for KR Application No. 10-2019-7036063, dated Feb. 7, 2020.
(Continued)

*Primary Examiner* — Sharon M Prange
(74) *Attorney, Agent, or Firm* — Honigman LLP; Matthew H. Szalach; Jonathan O'Brien

(57) ABSTRACT

An article of footwear includes an upper, an outsole attached to the upper, and a midsole. The outsole is attached to the upper and includes a ground-engaging surface and an inner surface disposed on an opposite side of the outsole than the ground-engaging surface. The midsole includes a footbed and a bottom surface disposed on an opposite side of the midsole than the footbed and opposing the inner surface of the outsole to define a cavity therebetween. The article of footwear also includes a casing received within the casing and defining an interior void. The interior void contains a first quantity of particulate matter movable relative to the casing and a second quantity of particulate matter attached to the casing.

20 Claims, 25 Drawing Sheets

Related U.S. Application Data filed on Sep. 24, 2015, provisional application No. 62/222,851, filed on Sep. 24, 2015, provisional application No. 62/222,816, filed on Sep. 24, 2015, provisional application No. 62/222,832, filed on Sep. 24, 2015, provisional application No. 62/222,873, filed on Sep. 24, 2015.

(51) Int. Cl.

| | | |
|---|---|---|
| A43B 13/14 | (2006.01) | |
| A43B 13/20 | (2006.01) | |
| A43B 1/00 | (2006.01) | |
| A43B 13/04 | (2006.01) | |
| A43B 5/00 | (2006.01) | |
| A43B 13/16 | (2006.01) | |
| B32B 5/16 | (2006.01) | |
| B32B 5/18 | (2006.01) | |
| B32B 25/04 | (2006.01) | |
| B32B 25/14 | (2006.01) | |
| A43B 7/14 | (2006.01) | |
| A43B 7/32 | (2006.01) | |

(52) U.S. Cl.
CPC ............... *A43B 7/141* (2013.01); *A43B 7/32* (2013.01); *A43B 13/04* (2013.01); *A43B 13/122* (2013.01); *A43B 13/125* (2013.01); *A43B 13/127* (2013.01); *A43B 13/16* (2013.01); *A43B 13/181* (2013.01); *A43B 13/186* (2013.01); *A43B 13/187* (2013.01); *A43B 13/188* (2013.01); *A43B 13/189* (2013.01); *A43B 13/20* (2013.01); *A43B 13/206* (2013.01); *B32B 5/16* (2013.01); *B32B 5/18* (2013.01); *B32B 25/047* (2013.01); *B32B 25/14* (2013.01); *B32B 2264/02* (2013.01); *B32B 2437/02* (2013.01)

(56) References Cited

U.S. PATENT DOCUMENTS

| | | | |
|---|---|---|---|
| 3,469,576 A | | 9/1969 | Smith et al. |
| 3,552,044 A | | 1/1971 | Wiele |
| 3,608,215 A | | 9/1971 | Fukuoka |
| 3,765,422 A | | 10/1973 | Smith |
| 3,906,570 A | | 9/1975 | Revill |
| 3,971,839 A | * | 7/1976 | Taylor ............... A47G 9/00 264/112 |
| 4,170,078 A | | 10/1979 | Moss |
| 4,307,200 A | | 12/1981 | Lichter et al. |
| 4,343,047 A | | 8/1982 | Lazowski et al. |
| 4,345,387 A | | 8/1982 | Daswick |
| 4,524,529 A | | 6/1985 | Schaefer |
| 4,658,515 A | | 4/1987 | Oatman |
| 4,686,781 A | | 8/1987 | Bury |
| 4,724,627 A | | 2/1988 | Sisco |
| 4,823,799 A | | 4/1989 | Robbins |
| 4,905,320 A | | 3/1990 | Squyers, Jr. |
| 4,970,807 A | * | 11/1990 | Anderie ............... A43B 13/181 36/28 |
| 5,005,575 A | | 4/1991 | Geri |
| 5,150,490 A | | 9/1992 | Busch et al. |
| 5,231,776 A | | 8/1993 | Wagner |
| 5,363,570 A | | 11/1994 | Allen et al. |
| 5,378,223 A | | 1/1995 | Grim et al. |
| 5,383,290 A | | 1/1995 | Grim |
| 5,392,534 A | | 2/1995 | Grim |
| 5,517,770 A | | 5/1996 | Martin et al. |
| 5,617,650 A | | 4/1997 | Grim |
| 5,665,285 A | | 9/1997 | Hattori et al. |
| 5,718,064 A | | 2/1998 | Pyle |
| 5,753,357 A | | 5/1998 | Filipitsch et al. |
| 5,758,435 A | | 6/1998 | Miyata |
| 5,920,915 A | | 7/1999 | Bainbridge et al. |
| 5,987,781 A | | 11/1999 | Pavesi et al. |
| 6,020,055 A | | 2/2000 | Pearce |
| 6,032,300 A | | 3/2000 | Bainbridge et al. |
| 6,061,928 A | | 5/2000 | Nichols |
| 6,098,209 A | | 8/2000 | Bainbridge et al. |
| 6,158,149 A | | 12/2000 | Rudy |
| 6,266,896 B1 | | 7/2001 | Liu |
| D460,852 S | | 7/2002 | Daudier |
| 6,453,477 B1 | * | 9/2002 | Bainbridge ............ A41D 13/015 2/455 |
| 6,502,331 B2 | | 1/2003 | Hines |
| 6,532,689 B1 | | 3/2003 | Jones, Jr. |
| 6,635,203 B2 | | 10/2003 | Monaci |
| 6,759,443 B2 | | 7/2004 | Brant et al. |
| 6,782,640 B2 | | 8/2004 | Westin |
| 6,848,200 B1 | | 2/2005 | Westin |
| 6,878,753 B1 | | 4/2005 | Takemura et al. |
| 7,037,571 B2 | | 5/2006 | Fish et al. |
| 7,069,672 B2 | | 7/2006 | Hahn |
| 7,152,342 B2 | | 12/2006 | Sommer |
| 7,484,318 B2 | | 2/2009 | Finkelstein |
| 7,555,851 B2 | | 7/2009 | Hazenberg et al. |
| 7,594,344 B2 | | 9/2009 | Mizrahi |
| 7,805,859 B2 | | 10/2010 | Finkelstein |
| 7,823,238 B2 | | 11/2010 | Din Mahamed |
| 7,904,971 B2 | | 3/2011 | Doria et al. |
| 8,091,254 B2 | | 1/2012 | Wang |
| 8,178,022 B2 | | 5/2012 | Schindler et al. |
| 8,272,149 B2 | | 9/2012 | Cooper et al. |
| 8,671,591 B2 | | 3/2014 | Brown |
| 8,713,817 B2 | | 5/2014 | Litchfield et al. |
| 2001/0000835 A1 | | 5/2001 | Hines |
| 2003/0046831 A1 | | 3/2003 | Westin |
| 2005/0022424 A1 | | 2/2005 | Held |
| 2005/0086728 A1 | | 4/2005 | Tobergte |
| 2005/0150132 A1 | | 7/2005 | Iannacone |
| 2006/0010717 A1 | | 1/2006 | Finkelstein |
| 2006/0026863 A1 | | 2/2006 | Liu |
| 2006/0130363 A1 | | 6/2006 | Hottinger |
| 2007/0051018 A1 | | 3/2007 | Issler |
| 2007/0169379 A1 | | 7/2007 | Hazenberg et al. |
| 2008/0066341 A1 | | 3/2008 | Hottinger |
| 2008/0148599 A1 | * | 6/2008 | Collins ............... B29D 35/142 36/44 |
| 2008/0230956 A1 | | 9/2008 | Allmendinger et al. |
| 2009/0094855 A1 | | 4/2009 | Finkelstein |
| 2009/0313853 A1 | | 12/2009 | Tadin |
| 2010/0011618 A1 | | 1/2010 | Bitton |
| 2010/0047550 A1 | | 2/2010 | Prissok et al. |
| 2010/0154252 A1 | | 6/2010 | Avent et al. |
| 2010/0222442 A1 | | 9/2010 | Prissok et al. |
| 2010/0251565 A1 | | 10/2010 | Litchfield et al. |
| 2011/0016747 A1 | * | 1/2011 | Bitton ............... A43B 17/04 36/43 |
| 2011/0215497 A1 | | 9/2011 | McEvoy et al. |
| 2012/0036698 A1 | | 2/2012 | Guertin |
| 2012/0073163 A1 | | 3/2012 | Tse |
| 2012/0204451 A1 | | 8/2012 | De Roode et al. |
| 2012/0210602 A1 | | 8/2012 | Brown |
| 2013/0008050 A1 | | 1/2013 | Marc |
| 2013/0145653 A1 | | 6/2013 | Bradford |
| 2013/0247422 A1 | | 9/2013 | Holt et al. |
| 2014/0007456 A1 | | 1/2014 | Tadin |
| 2014/0151918 A1 | | 6/2014 | Hartmann |
| 2014/0223776 A1 | | 8/2014 | Wardlaw et al. |
| 2014/0223777 A1 | | 8/2014 | Whiteman et al. |
| 2014/0283413 A1 | | 9/2014 | Christensen et al. |
| 2015/0196085 A1 | | 7/2015 | Westmoreland et al. |
| 2015/0223564 A1 | | 8/2015 | Peyton et al. |
| 2015/0257481 A1 | | 9/2015 | Campos, II et al. |
| 2016/0073732 A1 | | 3/2016 | Ernst et al. |
| 2017/0055636 A1 | | 3/2017 | Campos, II et al. |

(56) References Cited

U.S. PATENT DOCUMENTS

| | | | |
|---|---|---|---|
| 2018/0132564 A1 | 5/2018 | Bruce et al. | |
| 2019/0343225 A1 | 11/2019 | Reddy et al. | |

FOREIGN PATENT DOCUMENTS

| | | | | |
|---|---|---|---|---|
| CN | 1211901 | A | 3/1999 | |
| CN | 2620493 | Y | 6/2004 | |
| CN | 2888936 | Y | 4/2007 | |
| CN | 202051034 | U | 11/2011 | |
| CN | 202145956 | U | 2/2012 | |
| CN | 103141993 | A | 6/2013 | |
| CN | 103720129 | A | 4/2014 | |
| CN | 104010541 | A | 8/2014 | |
| CN | 104203029 | A | 12/2014 | |
| CN | 104363783 | A | 2/2015 | |
| CN | 104490008 | A | 4/2015 | |
| DE | 2907506 | A1 | 9/1980 | |
| DE | 3406504 | A1 | 8/1985 | |
| DE | 3627538 | A1 | 2/1988 | |
| DE | 3723549 | A1 | 2/1988 | |
| DE | 3406504 | C2 | 1/1990 | |
| DE | 3839747 | A1 | 5/1990 | |
| DE | 3905989 | C2 | 1/1991 | |
| DE | 4202159 | A1 | 7/1993 | |
| DE | 4401282 | A1 | 12/1994 | |
| DE | 4446252 | A1 | 6/1995 | |
| DE | 19708622 | A1 | 9/1997 | |
| DE | 19938609 | A1 | 3/2001 | |
| DE | 10138426 | C1 | 12/2002 | |
| DE | 102009009589 | A1 | 9/2010 | |
| DE | 102010046278 | A1 | 2/2011 | |
| DE | 202016104626 | U1 | 10/2016 | |
| EP | 0007948 | A1 | 2/1980 | |
| EP | 130816 | A2 | 1/1985 | |
| EP | 316289 | A2 | 5/1989 | |
| EP | 0359699 | A1 | 3/1990 | |
| EP | 0383685 | A1 | 8/1990 | |
| EP | 529941 | A1 | 3/1993 | |
| EP | 2609824 | A1 | 7/2013 | |
| EP | 2649896 | B1 | 10/2016 | |
| EP | 3386334 | A1 | 10/2018 | |
| FR | 996111 | A | 12/1951 | |
| FR | 1018215 | A | 12/1952 | |
| FR | 2824884 | A1 | 11/2002 | |
| GB | 1301147 | A | 12/1972 | |
| GB | 2066049 | A | 7/1981 | |
| GB | 2462100 | A | 1/2010 | |
| JP | S56-080702 | U | 6/1981 | |
| JP | H02-121601 | A | 5/1990 | |
| JP | H05-37104 | U | 5/1993 | |
| JP | H0723804 | A | 1/1995 | |
| JP | H0739404 | A | 2/1995 | |
| JP | 3042853 | U | 11/1997 | |
| JP | H11-32806 | A | 2/1999 | |
| JP | 2000316606 | A | 11/2000 | |
| JP | 2002306280 | A | 10/2002 | |
| JP | 2009056007 | A | 3/2009 | |
| JP | 2015513354 | A | 5/2015 | |
| KR | 19990069793 | A | 9/1999 | |
| KR | 100230096 | B1 | 11/1999 | |
| KR | 200374026 | Y1 | 1/2005 | |
| KR | 20100086227 | A | 7/2010 | |
| KR | 20120033710 | A | 4/2012 | |
| WO | WO-1997035496 | A1 | 10/1997 | |
| WO | WO-9947014 | A1 | 9/1999 | |
| WO | WO-2006049401 | A1 * | 5/2006 | ........... A43B 13/181 |
| WO | WO-2008012809 | A2 | 1/2008 | |
| WO | WO-2012177957 | A2 | 12/2012 | |
| WO | WO-2013013784 | A1 | 1/2013 | |
| WO | WO-2014126799 | A1 | 8/2014 | |
| WO | WO-2015/065578 | A1 | 5/2015 | |
| WO | WO-2018169535 | A1 | 9/2018 | |
| WO | WO-2018175734 | A1 | 9/2018 | |
| WO | WO-2020125963 | A1 | 6/2020 | |

OTHER PUBLICATIONS

China National Intellectual Property Office, Office Action for CN Application No. 201680066156.7, dated Jan. 22, 2020.
China National Intellectual Property Office, Office Action and Search Report for CN Application No. 201680062323.0, dated Mar. 4, 2020.
China National Intellectual Property Office, Office Action and Search Report for CN Application No. 201680062231.2, dated Mar. 24, 2020.
China National Intellectual Property Office, Office Action for CN Application No. 201680066534.1, dated Mar. 26, 2020.
China National Intellectual Property Office, Office Action and Search Report for CN Application No. 201680062300.X, dated Mar. 12, 2020.
European Patent Office, Communication pursuant to Article 94(3) EPC for EP Application No. 16777864.6, dated Apr. 7, 2020.
Korean Intellectual Property Office, Office Action for Application No. 10-2018-7011476, dated May 29, 2019.
European Patent Office, Communication pursuant to Article 94(3) EPC for EP Application No. 16777863.8, dated Apr. 15, 2020.
Japan Patent Office, Decision of Rejection for JP Application No. 2018-515812, dated Apr. 6, 2020.
European Patent Office, Extended European Search Report for EP Application No. 19212921.1, dated Mar. 31, 2020.
European Patent Office, Communication pursuant to Article 94(3) EPC for EP Application No. 16777865.3, dated Apr. 20, 2020.
Korean Intellectual Property Office, Office Action for KR Application No. 10-2020-7003423, dated Apr. 21, 2020.
European Patent Office as the International Searching Authority, International Search Report and Written Opinion for PCT Application No. PCT/US2016/053256, dated Jan. 12, 2017.
European Patent Office as the International Searching Authority, International Search Report and Written Opinion for PCT Application No. PCT/US2016/053240, dated Jan. 3, 2017.
European Patent Office as the International Searching Authority, International Search Report and Written Opinion for PCT Application No. PCT/US2016/053260, dated Dec. 15, 2016.
European Patent Office as the International Searching Authority, International Search Report and Written Opinion for PCT Application No. PCT/US2016/053232, dated Jan. 10, 2017.
European Patent Office as the International Searching Authority, International Search Report and Written Opinion for PCT Application No. PCT/US2016/053246, dated Jan. 10, 2017.
European Patent Office as the International Searching Authority, International Search Report and Written Opinion for PCT Application No. PCT/US2016/053265, dated Dec. 20, 2016.
United States Patent and Trademark Office, Office Action for U.S. Appl. No. 15/816,270, dated Apr. 17, 2018.
United States Patent and Trademark Office, Office Action for U.S. Appl. No. 15/816,200, dated Apr. 18, 2018.
European Patent Office, Extended European Search Report for EP Application No. 19196682.9, dated Jan. 2, 2020.
China National Intellectual Property Office, Office Action for CN Application No. 201680062271.7, dated Feb. 3, 2020.
European Patent Office (ISA), International Preliminary Report on Patentability for International Application No. PCT/US2017/022651, dated Sep. 26, 2019.
European Patent Office (ISA), International Preliminary Report on Patentability for International Application No. PCT/US2017/022647, dated Sep. 26, 2019.
United States Patent and Trademark Office, Office Action for U.S. Appl. No. 15/574,700, dated Oct. 22, 2019.
Japan Patent Office, Notice of Reasons for Rejection for JP Application No. 2018-515812 dated Jul. 29, 2019.
Japan Patent Office, Notice of Reasons for Rejection for JP Application No. 2018-515822 dated Jul. 22, 2019.
Japan Patent Office, Notice of Reasons for Rejection for JP Application No. 2018-515842 dated Aug. 5, 2019.
Japan Patent Office, Notice of Reasons for Rejection for JP Application No. 2018-515825 dated Jul. 22, 2019.
Japan Patent Office, Notice of Reasons for Rejection for JP Application No. 2018-515843 dated Aug. 5, 2019.

(56) References Cited

OTHER PUBLICATIONS

Japan Patent Office, Notice of Reasons for Rejection for JP Application No. 2018-515828 dated Jul. 22, 2019.
Taiwan Intellectual Property Office, Search Report for TW Application No. 105130844 dated Aug. 27, 2019.
European Patent Office (ISA), International Search Report and Written Opinion for PCT Application No. PCT/US2017/022651, dated Oct. 25, 2017.
European Patent Office (ISA), International Search Report and Written Opinion for PCT Application No. PCT/US2017/022647, dated Nov. 2, 2017.
Korean Intellectual Property Office, Office Action for Application No. 10-2018-7011477, dated May 29, 2019.
Korean Intellectual Property Office, Office Action for Application No. 10-2018-7011479, dated Jun. 4, 2019.
Korean Intellectual Property Office, Office Action for Application No. 10-2018-7011480, dated Jun. 10, 2019.
Korean Intellectual Property Office, Office Action for Application No. 10-2018-7011478, dated Jun. 4, 2019.
Korean Intellectual Property Office, Office Action for KR Application No. 10-2018-7011479, dated Dec. 26, 2019.
Korean Intellectual Property Office, Office Action for KR Application No. 10-2018-7011480, dated Jan. 21, 2020.
European Patent Office (ISA), International Search Report and Written Opinion for PCT Application No. PCT/US2020/042784, dated Sep. 17, 2020.
Ge, Chengbiao et al., Steam-chest molding of expanded thermoplastic polyuerethane bead foams and their mechanical properties, Chemical Engineering Science 174 (2017) pp. 337-346.
Japan Patent Office, Notification of Reasons for Refusal for JP Application No. 2019-550843, dated Nov. 24, 2020.
European Patent Office, Communication pursuant to Article 94(3) EPC for EP Application No. 16777864.6, dated Dec. 16, 2020.
European Patent Office, Communication pursuant to Article 94(3) EPC for EP Application No. 16777863.8, dated Dec. 22, 2020.
KS65 Luxury Light Fescue—Field Green <http://www.kodiaksports.com/Artificial-Turf/Fake-Grass/Artificial-Grass-ST65_LFS_Field, Oct. 12, 2013, (Oct. 12, 2013), Retrieved from internet: URL:https://web.archive.org/web/*/http://www.kodiaksports.com/core/media/media.nl/id.28351/c.1268496/.f?h=1c04c87e9fd3f9d67f24 [retrieved on Dec. 15, 2016].
European Patent Office as the International Searching Authority, International Search Report and Written Opinion for PCT Application No. PCT/US2020/042735, dated Sep. 16, 2020.
European Patent Office as the International Searching Authority, International Search Report and Written Opinion for PCT Application No. PCT/US2020/042784, dated Sep. 17, 2020.
European Patent Office as the International Searching Authority, International Search Report and Written Opinion for PCT Application No. PCT/US2020/042807, dated Sep. 16, 2020.

* cited by examiner

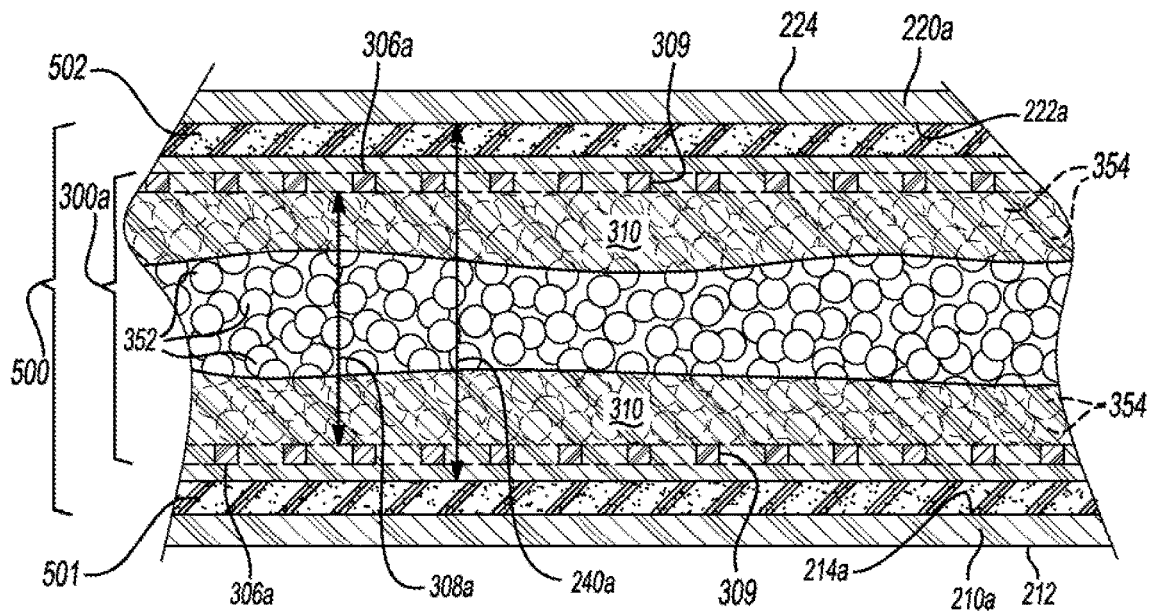
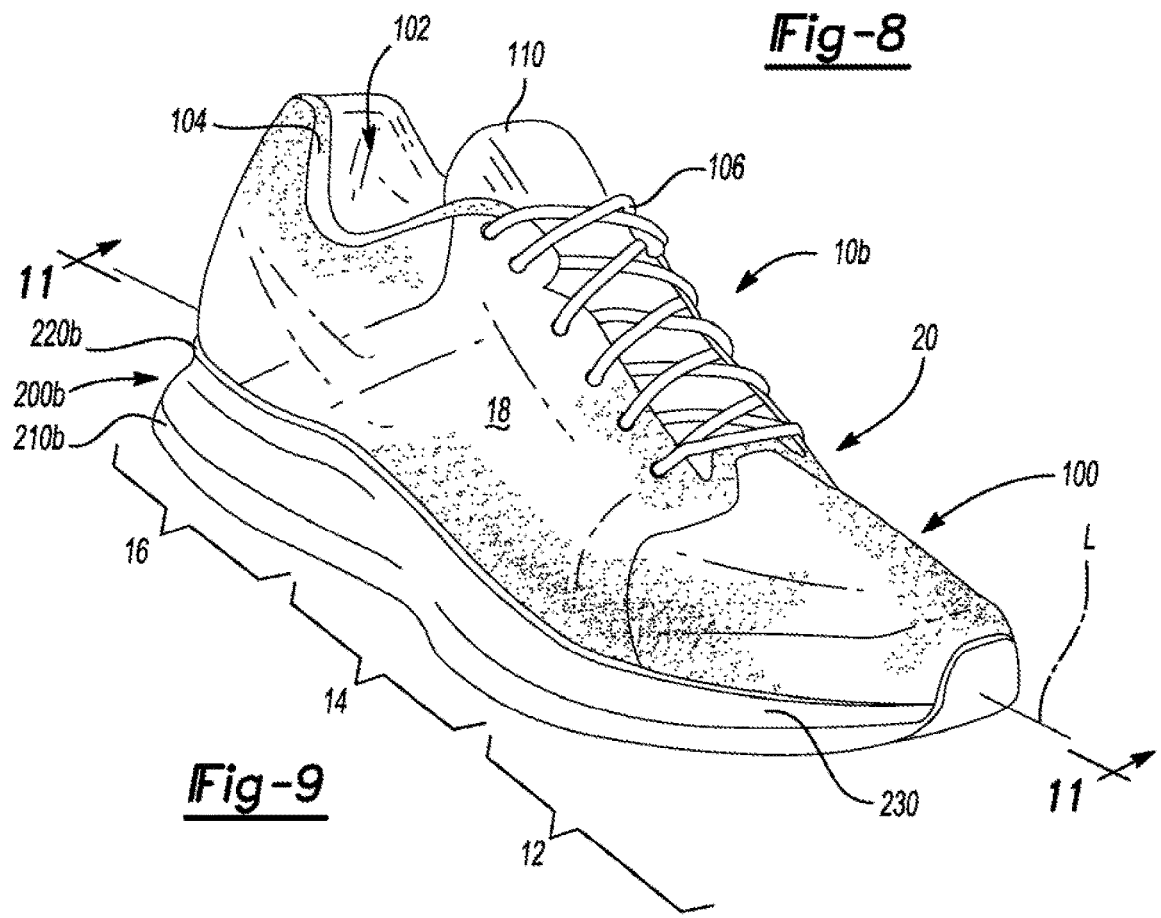

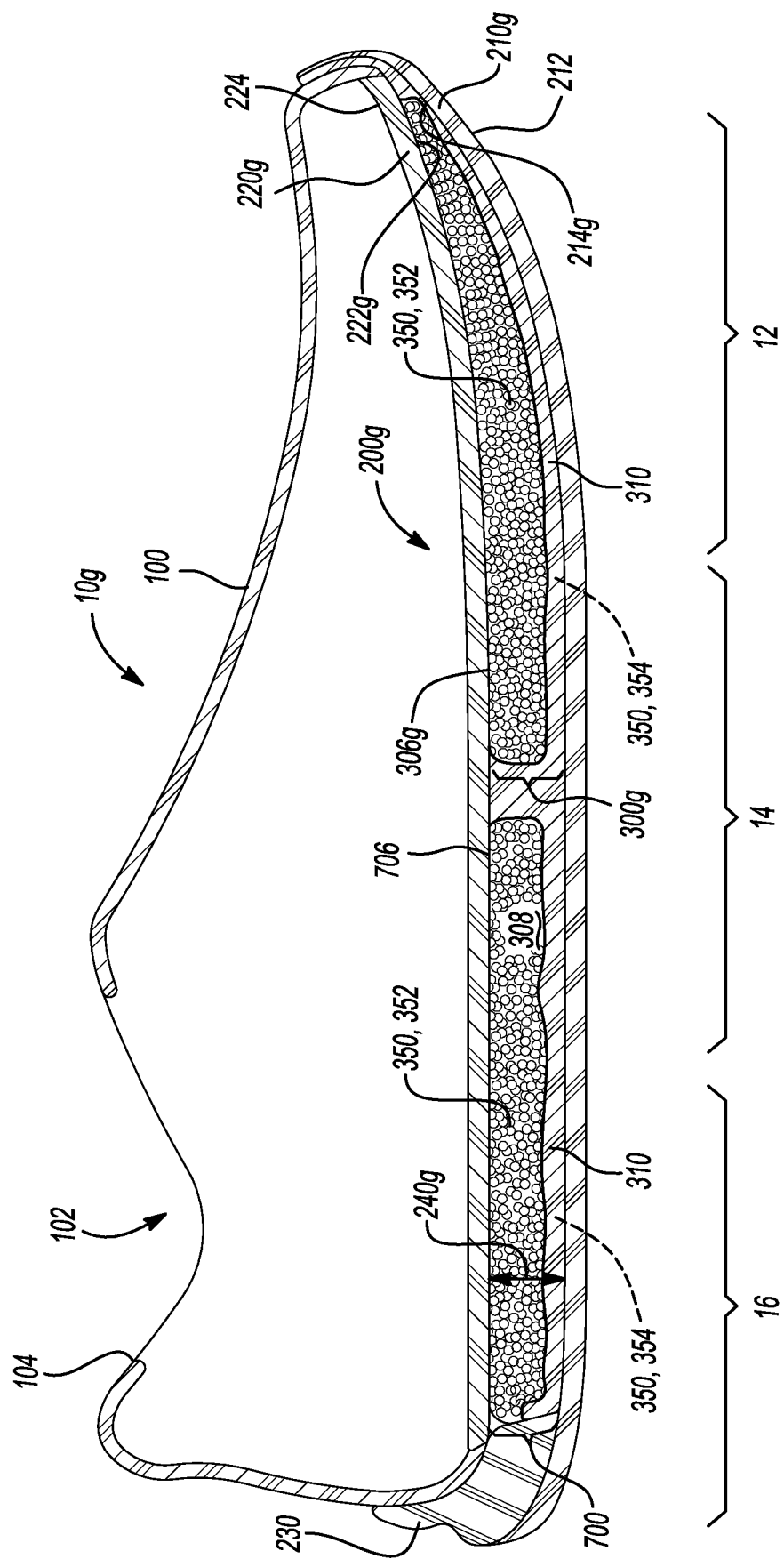

PARTICULATE FOAM IN COATED CARRIER

CROSS REFERENCE TO RELATED APPLICATIONS

This application is a 371 National Stage entry based on International Application No. PCT/US2016/053246, filed Sep. 23, 2016, which claims priority to U.S. Provisional Application Ser. No. 62/222,882, filed Sep. 24, 2015, and to U.S. Provisional Application Ser. No. 62/222,873, filed Sep. 24, 2015, and to U.S. Provisional Application Ser. No. 62/222,851, filed Sep. 24, 2015, and to U.S. Provisional Application Ser. No. 62/222,842, filed Sep. 24, 2015, and to U.S. Provisional Application Ser. No. 62/222,832, filed Sep. 24, 2015, and to U.S. Provisional Application Ser. No. 62/222,816, filed Sep. 24, 2015, the disclosures of which are hereby incorporated by reference in their entirety.

The present disclosure relates to articles of footwear having particulate foam incorporated with elements that restrict migration of the particulate foam within the article of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 8 is a partial cross-sectional view taken along line 8-8 of FIG. 5 showing a cushioning material encapsulating a casing containing a first quantity of particulate matter movable relative to the casing and a second quantity of particulate matter adhered to an elastomeric material that extends into the casing;

FIG. 9 is a top perspective view of an article of footwear in accordance with principles of the present disclosure;

Figure 39:
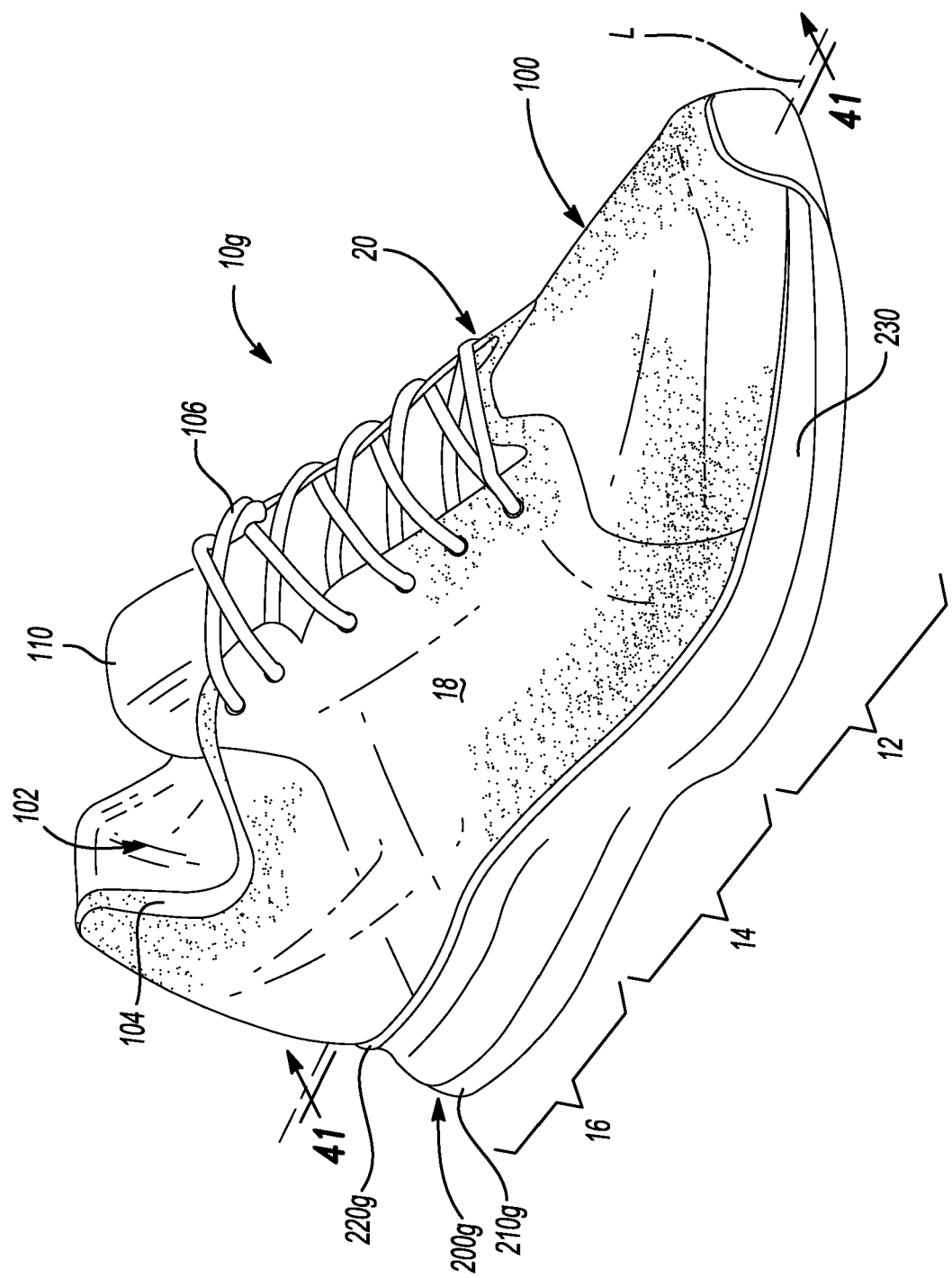
FIG. 39 is a top perspective view of an article of footwear in accordance with principles of the present disclosure.
Figure 40:
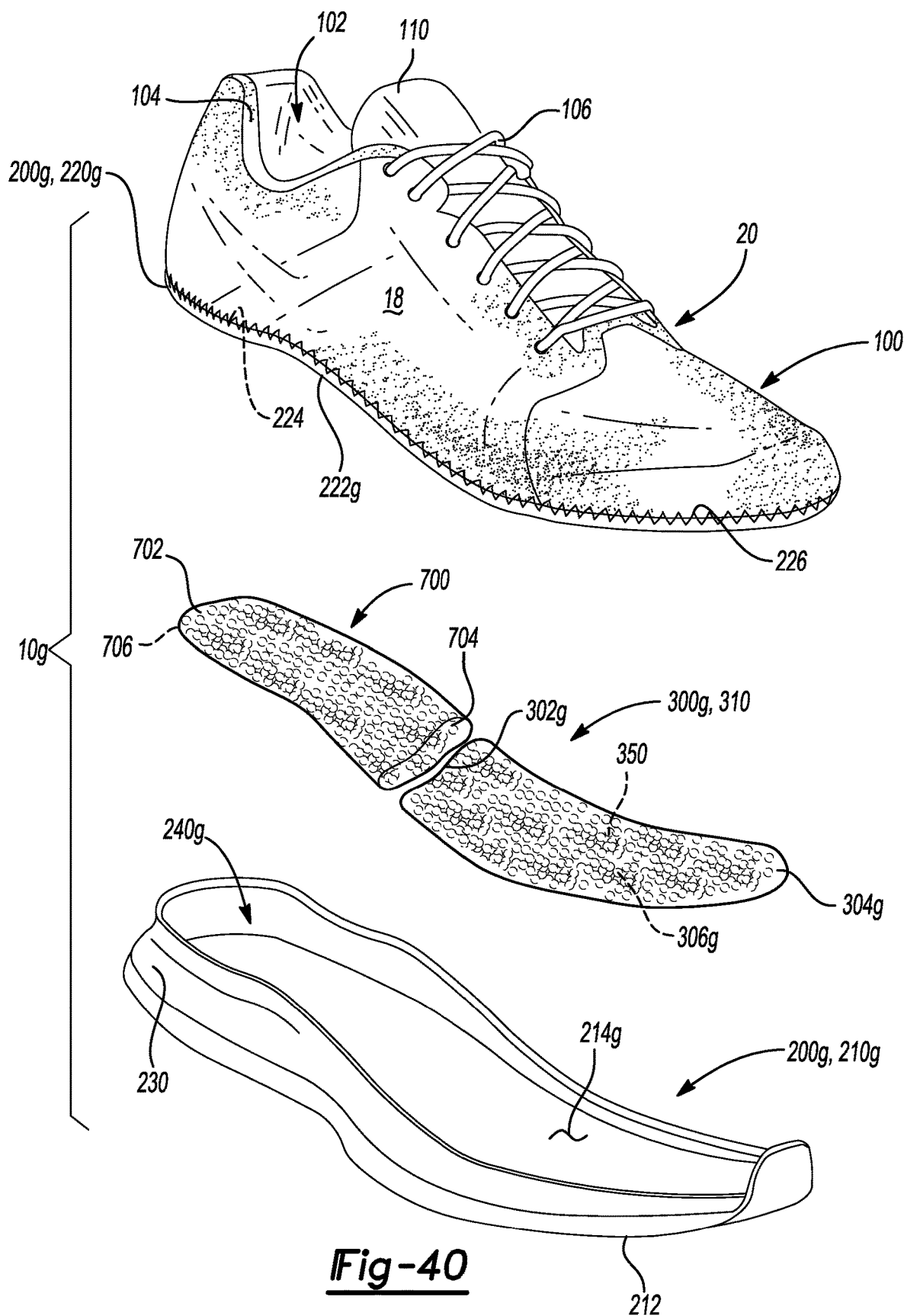

FIG. 40 is an exploded view of the article of footwear of FIG. 39 showing a first casing and a second casing each containing particulate matter and received within a cavity between an inner surface of an outsole and a bottom surface of a midsole; and FIG. 41 is a cross-sectional view taken along line 41-41 of FIG. 39 showing a first casing and a second casing each containing particulate matter and received within a cavity between an inner surface of an outsole and a bottom surface of a midsole.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In one aspect of the disclosure, an article of footwear is provided and includes an upper, an outsole, and a midsole. The outsole is attached to the upper and includes a ground-engaging surface and an inner surface disposed on an opposite side of the outsole than the ground-engaging surface. The midsole includes a footbed and a bottom surface disposed on an opposite side of the midsole than the footbed and opposing the inner surface of the outsole to define a cavity therebetween. The article of footwear also includes a casing received within the cavity that defines an interior void. The interior void contains a first quantity of particulate matter movable relative to the casing and a second quantity of particulate matter attached to the casing.

The casing may be formed from a flexible material. Additionally or alternatively, the casing may be formed from a mesh material and/or a nylon material.

In some implementations, an elastomeric material is disposed on a surface of the casing. For instance, the elastomeric material may be disposed on an exterior surface of the casing. In some examples, at least a portion of the elastomeric material may extend into the interior void of the casing. In these examples, the second quantity of particulate matter attaches to the casing by adhering to the elastomeric material. The elastomeric material may encapsulate the casing. In some configurations, a first foam segment is attached to the elastomeric material. Additionally or alternatively, a second foam segment may be disposed within the interior void of the casing.

The particulate matter may include foam beads. Here, the foam beads may include at least one of a substantially spherical shape and a substantially polygonal shape. In some examples, the foam beads include approximately the same size and shape. In other examples, at least one of the foam beads includes at least one of a different size and shape.

In some implementations, the casing is molded to conform to surface profiles of the inner surface of the outsole and the bottom surface of the midsole. The article of footwear may also include a resilient member disposed within the cavity between the casing and the inner surface of the outsole. In some configurations, the article of footwear also includes at least one divider wall disposed within the interior void and bonded to walls of the casing to define at least two segments. The at least two segments may each contain at least one of a portion of the first quantity of particulate matter and a portion of the second quantity of particulate matter.

In another aspect of the disclosure, an article of footwear is provided and includes an upper, an outsole, and a midsole. The outsole is attached to the upper and includes a ground-engaging surface and an inner surface disposed on an opposite side of the outsole than the ground-engaging surface. The midsole includes a footbed and a bottom surface disposed on an opposite side of the midsole than the footbed. The bottom surface opposes the inner surface of the outsole to define a cavity therebetween. The article of footwear also includes a casing disposed within an elastomeric material and received within the cavity. The casing includes a first portion of particulate matter affixed to the casing by the elastomeric material.

In some implementations, the particulate matter includes a second portion movable relative to the casing. The particulate matter may include foam beads. Here, the foam beads may include at least one of a substantially spherical shape and a substantially polygonal shape. In some examples, the foam beads include approximately the same size and shape. In other examples, at least one of the foam beads includes at least one of a different size and shape. The casing may be formed from a flexible material. Additionally or alternatively, the casing may be formed from a porous material. The elastomeric material may be applied to exterior surfaces of the casing as a liquid. In some examples, at least a portion of the elastomeric material extends into the casing. Additionally or alternatively, at least a portion of the elastomeric material may encapsulate the casing.

In some configurations, a quantity of foam segments is disposed within the casing. The foam segments may include a different size and shape than the foam beads. The quantity of foam segments may be movable relative to the casing. In other configurations, however, at least a portion of the quantity of foam segments is affixed to the casing by the elastomeric material. In some implementations, a cushioning material encapsulates the casing.

The article of footwear may also include a divider wall disposed within the interior void and bonded to walls of the casing to define at least two segments each containing a respective quantity of the particulate matter. In some examples, the casing is molded to conform to surface profiles of the inner surface of the outsole and the bottom surface of them midsole. In some implementations, the article of footwear also includes a resilient member disposed within the cavity between the casing and the inner surface of the outsole.

In yet another aspect of the disclosure, a method of making an article of footwear is provided and includes providing a cavity between a footbed and an outsole. The method also includes providing a casing containing a first quantity of particulate matter movable relative to the casing and a second quantity of particulate matter attached to the casing and inserting the casing into the cavity.

In some implementations, the method also includes forming the casing form a porous material and/or forming the casing from a flexible material. In some examples, the method also includes coating at least a portion of an exterior surface of the casing with an elastomeric material. In these examples, coating the casing with the elastomeric material may include coating the casing with a liquid elastomeric material. Here, the liquid elastomeric material may be hardened. In some configurations, the method also includes adhering the elastomeric material to the second quantity of particulate matter to attach the second quantity of particulate matter to the casing.

The method may include encapsulating the casing with a first cushioning material. For example, the casing may be encapsulated with the first cushioning material by attaching the first cushioning material to the casing via the elastomeric material. In some examples, the method includes providing a tensile member disposed within the interior void of the casing and bonded to walls of the casing. The method may also include providing the first quantity of particulate matter and the second quantity of particulate matter by providing the casing with a quantity of foam beads. Providing the foam beads may include providing foam beads having at least one of a substantially spherical shape and a substantially polygonal shape. Further, providing the foam beads may include providing foam beads having approximately the same size and shape. Additionally or alternatively, providing the foam beads may include providing foam beads that include at least one of a different size and shape.

In some examples, the method further includes securing walls of the casing together to define at least two segments each containing at least one of a portion of the first quantity of particulate matter and a portion of the second quantity of particulate matter.

In another aspect of the present disclosure, a method of making an article of footwear includes providing a cavity between a footbed and an outsole and providing a casing containing a first quantity of particulate matter. The method also includes coating an exterior surface of the casing with an elastomeric material, hardening the elastomeric material, and inserting the casing into the casing.

In some implementations, the method also includes forming the casing form a porous material. Additionally or alternatively, the method may include forming the casing from a flexible material. In some examples, the method also includes encapsulating the casing in a first cushioning material. In these examples, the method may include encapsulating the casing with the first cushioning material by attaching the casing to the first cushioning material via the elastomeric material. Additionally or alternatively, the method may include providing a tensile member disposed within the interior void of the casing and bonded to walls of the casing.

The method may also include providing the casing with a second quantity of particulate matter. In some examples, the method includes attaching the second quantity of particulate matter to the casing via the elastomeric material. In some configurations, coating the exterior surface of the casing causes the elastomeric material to enter the casing and contact the second quantity of particulate matter. In some examples, the method includes securing walls of the casing together to define at least two segments each containing at least one of a portion of the first quantity of particulate matter and a portion of the second quantity of particulate matter.

In some implementations, providing the first quantity of particulate matter and the second quantity of particulate matter includes providing the casing with a quantity of foam beads. Providing the foam beads may include providing foam beads having at least one of a substantially spherical shape and a substantially polygonal shape. In other examples, providing the quantity of foam beads includes providing foam beads having approximately the same size and shape. Additionally or alternatively, providing foam beads includes providing foam beads that include at least one of a different size and shape.

Referring to FIGS. 1-4, an article of footwear 10 is provided and includes an upper 100 and a sole structure 200 attached to the upper 100. The article of footwear 10 may be divided into one or more portions. The portions may include a forefoot portion 12, a mid-foot portion 14, and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200. An ankle opening 104 in the heel portion 16 may provide access to the interior void 102. For example, the ankle opening 104 may receive a foot to secure the foot within the void 102 and facilitate entry and removal of the foot to and from the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210 and a midsole 220 arranged in a layered configuration. The sole structure 200 (e.g., the outsole 210 and the midsole 220) defines a longitudinal axis L. For example, the outsole 210 engages with a ground surface during use of the article of footwear 10 and the midsole 220 is disposed between the upper 100 and the outsole 210. In some examples, the sole structure 200 may also incorporate additional layers such as an insole or sockliner (neither shown), which may reside within the interior void 102 of the upper 100 to receive a plantar surface of the foot to enhance the comfort of the footwear 10. In some examples, a sidewall 230 surrounds a perimeter of the outsole 210 and separates the outsole 210 and the midsole 220 to define a cavity 240 therebetween.

In some configurations, the cavity 240 receives a casing 300 that contains particulate matter 350 to provide cushioning for the foot during use of the footwear 10. The casing 300 may define a length that extends substantially parallel to the longitudinal axis L of the sole structure 200 and may be formed to provide contours that conform to a profile of the bottom surface of the foot as well as the inner surface 214 of the outsole 210. In some examples, the casing 300 is formed from a porous material such as mesh and/or other suitable porous fabrics. Additionally or alternatively, the casing 300 may be formed from a flexible material.

An exterior surface 306 of the casing 300 may be coated with an elastomeric material 310 to provide the casing 300 with a flexible outer skin. For example, the elastomeric material 310 may be applied as a liquid that is hardened when the casing 300 is formed with a desired shape and configuration (i.e., the casing 300 may be formed by molding the casing to conform to surface profiles of the inner surface 214 of the outsole 210 and/or the bottom surface 222 of the midsole 220). As such, the elastomeric material 310 disposed on the casing 300 may encapsulate the casing 300 formed in the forgoing manner and may provide the casing 300 with an outer surface once hardened.

The porosity of the casing 300 may permit at least a portion of the liquid elastomeric material 310—when applied to the casing 300—to extend into the casing 300 and into contact with a portion of the particulate matter 350 residing therein. In these examples, when the elastomeric material 310 is hardened, the elastomeric material 310 may adhere to the exterior surface 306 of the casing 300 and also to a portion of particulate matter 350 disposed within the casing 300. Namely, a portion of the particulate matter 350 disposed adjacent to the material of the casing 300 will come into contact with the elastomeric material 310 that extends into the casing 300. As such, the portion of particulate matter 350 that comes into contact with the elastomeric material 310 may be attached to the casing 300 via the elastomeric material 310. The particulate material 350 that is attached to the casing 300 via the elastomeric material 310 is prevented from moving relative to the casing 300 by the elastomeric material 310. Conversely, other portions of the particulate matter 350 that are not exposed to the elastomeric material 310 are permitted to move relative to the casing 300. Accordingly, while the particulate matter 350 may include portions attached to the casing 300 by the elastomeric material 310, other portions of particulate matter 350 that are spaced apart from the elastomeric material 310 are permitted to shift and move relative to and within the casing 300 to provide gradient cushioning as the ground-engaging surface 212 of the outsole 210 rolls for engagement with the ground surface between the heel portion 16 and the forefoot portion 12.

The elastomeric material may include, but is not limited to, nitrile rubber, chlorinated polyethylene, neoprene (chloroprene polymers), chlorosulfonyl polyethylene (Hypalon), ethylene ether polysulfides, ethylene polysulfides, ethylene propylene copolymers (EPM), ethylene propylene terpolymers (EPDM), fluorinated hydrocarbons, fluorosilicone, isobutylene isoprene, organopolysiloxanes, acrylic rubbers, polybutadienes, polyepichlorohydrens, natural rubber, synthetic isoprene, urethane rubbers (both polyurethane (polyester), and polyurethane (polyethers)).

In some examples, the particulate matter 350 contained within the casing 300 may include foam beads having a substantially spherical shape. In some examples, the particulate matter 350 includes foam beads that have approximately the same size and shape. In other examples, the particulate matter 350 includes foam beads having at least one of a different size and shape. Regardless of the particular size and shape of the particulate matter 350, the particulate matter 350 cooperates with the outsole 210 and the midsole 220 to provide the article of footwear 10 with a cushioned and responsive performance. In some examples, the particulate matter 350 and the elastomeric material 310 are formed from one or more recyclable polymer materials.

Figure 1:
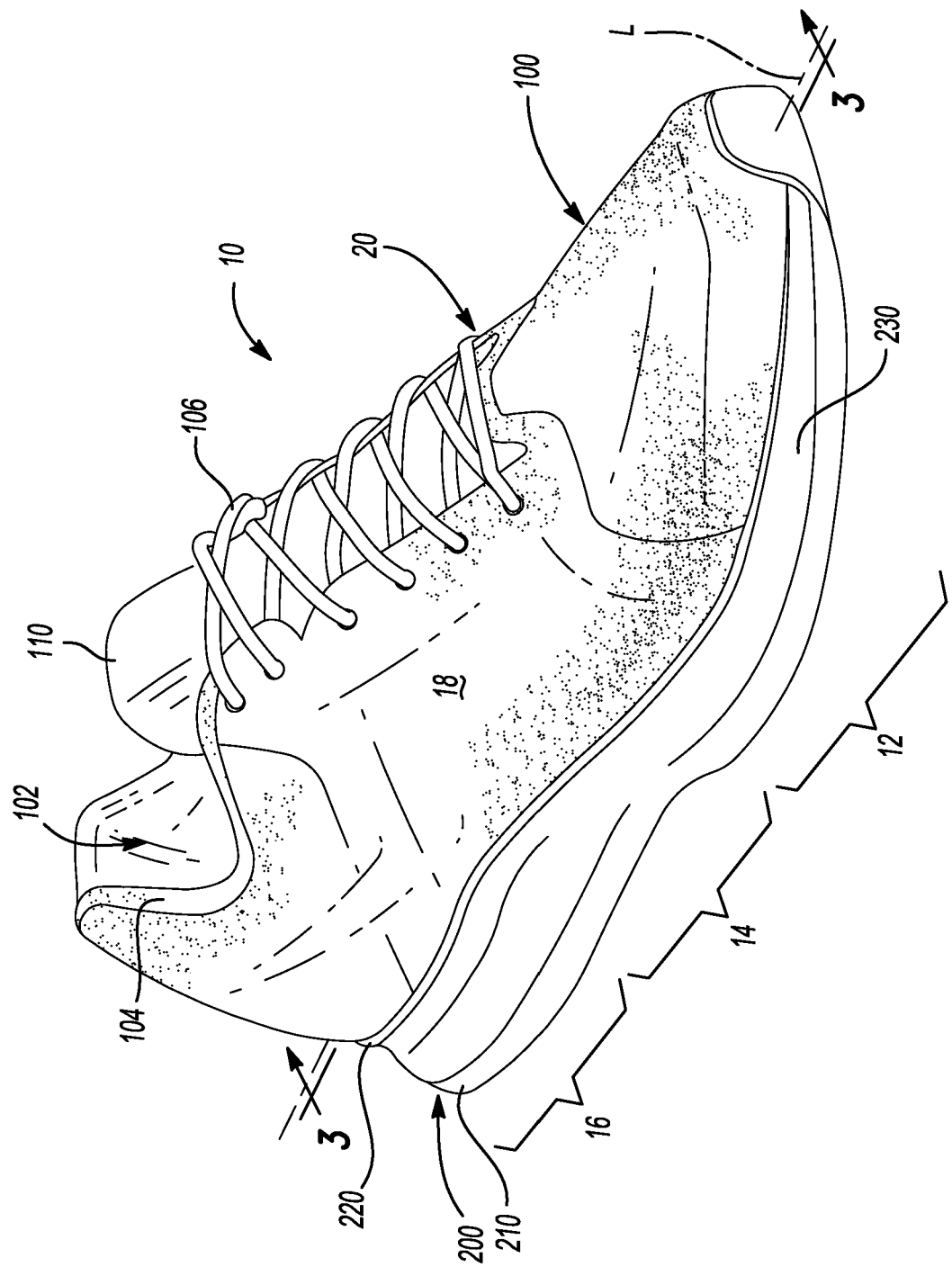
FIG. 1 is a top perspective view of an article of footwear in accordance with principles of the present disclosure.

The outsole 210 may include a ground-engaging surface 212 and an opposite inner surface 214. The outsole 210 may attach to the upper 100. In some examples, the sidewall 230 extends from the perimeter of the outsole 210 and attaches to the midsole 220 or the upper 100. The example of FIG. 1 shows the outsole 210 attaching to the upper 100 proximate to a tip of the forefoot portion 12. The outsole 210 generally provides abrasion-resistance and traction with the ground surface during use of the article of footwear 10. The outsole 210 may be formed from one or more materials that impart durability and wear-resistance, as well as enhance traction with the ground surface. For example, rubber may form at least a portion of the outsole 210.

The midsole 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. The bottom surface 222 may oppose the inner surface 214 of the outsole 210 to define the cavity 240 therebetween. The midsole 220 may be formed from a flexible material that allows the midsole 220 to conform to the particulate matter 350 disposed within the casing 300 and residing in the cavity 240. In so doing, the flexible midsole 220 may correspond to a flexible strobel that allows the particulate matter 350 residing in the cavity 240 to interact with the profile of the bottom surface of a foot during gradient loading of the sole structure 200. In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under applied loads to attenuate ground-reaction forces.

Figure 2:
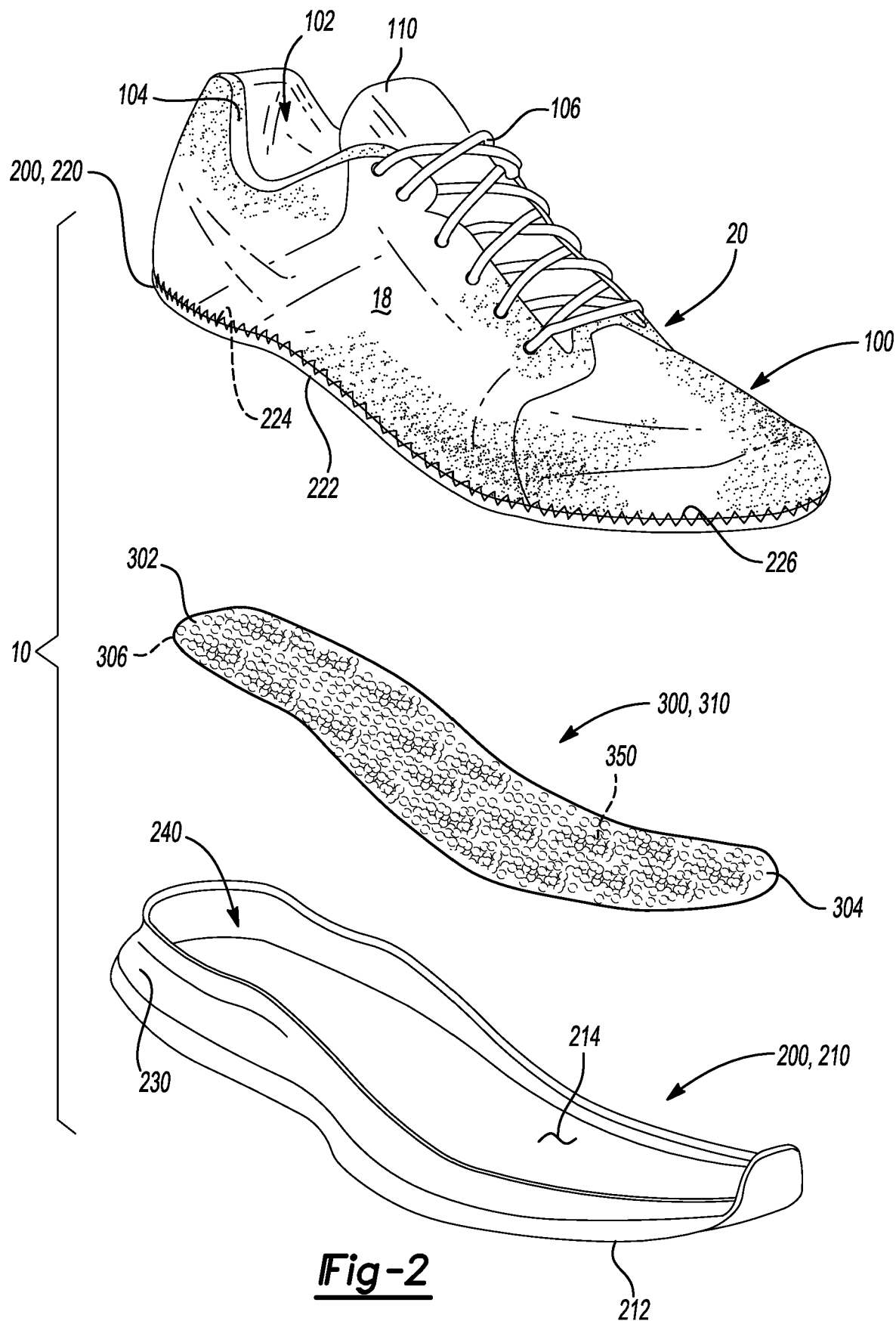
FIG. 2 is an exploded view of the article of footwear of FIG. 1 showing a casing containing particulate matter and received within a cavity between an inner surface of an outsole and a bottom surface of a midsole.

FIG. 2 provides an exploded view of the article of footwear 10 showing the casing 300 containing the particulate matter 350, the inner surface 214 of the outsole 210, and the bottom surface 222 of the midsole 220. As set forth above, the casing 300 may be coated with liquid elastomeric material 310 and may be formed by molding the casing 300 (e.g., FIGS. 18-20) to conform to the surface profiles of the bottom surface 222 of the midsole 220 and the inner surface 214 of the outsole 210.

Figure 4:
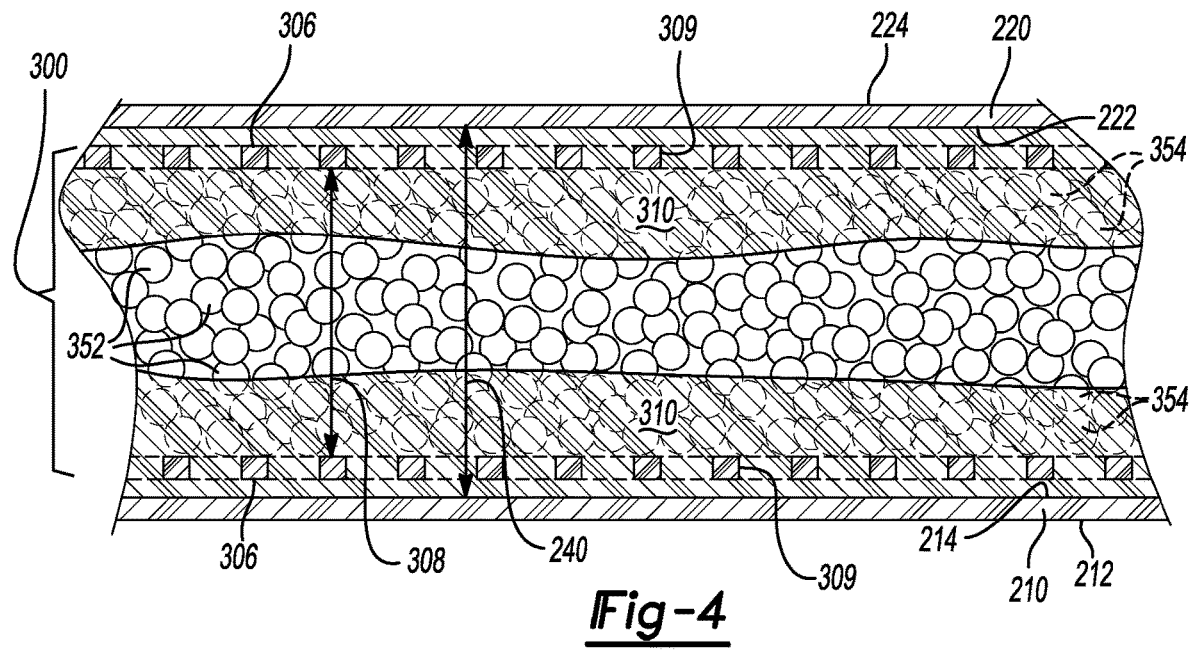
FIG. 4 is a detailed cross-sectional view of a portion of the structure of FIG. 3 showing a first quantity of the particulate matter movable relative to the casing and a second quantity of the particulate matter adhered to an elastomeric material that extends into the casing.

The length of the casing 300 may extend between a first end 302 and a second end 304. The first end 302 may be disposed proximate to the heel portion 16 of the sole structure 200 and the second end 304 may be disposed proximate to the forefoot portion 12 of the sole structure 200. The casing 300 may also include a thickness extending substantially perpendicular to the longitudinal axis L of the sole structure 200 and a width extending between the lateral side 18 and the medial side 20. Accordingly, the length, the width, and the thickness of the casing 300 may substantially occupy the cavity 240 defined by the inner surface 214 and the bottom surface 222 and may extend through the forefoot, mid-foot, and heel portions 12, 14, 16, respectively, of the outsole 210. As shown in FIG. 4, the overall thickness of the casing 300 includes a thickness of the elastomeric material 310 that extends from the exterior surface 306. In this configuration, the elastomeric material 310 opposes and is in contact with the bottom surface 222 of the midsole 220 and the inner surface 214 of the outsole 210.

Figure 3:
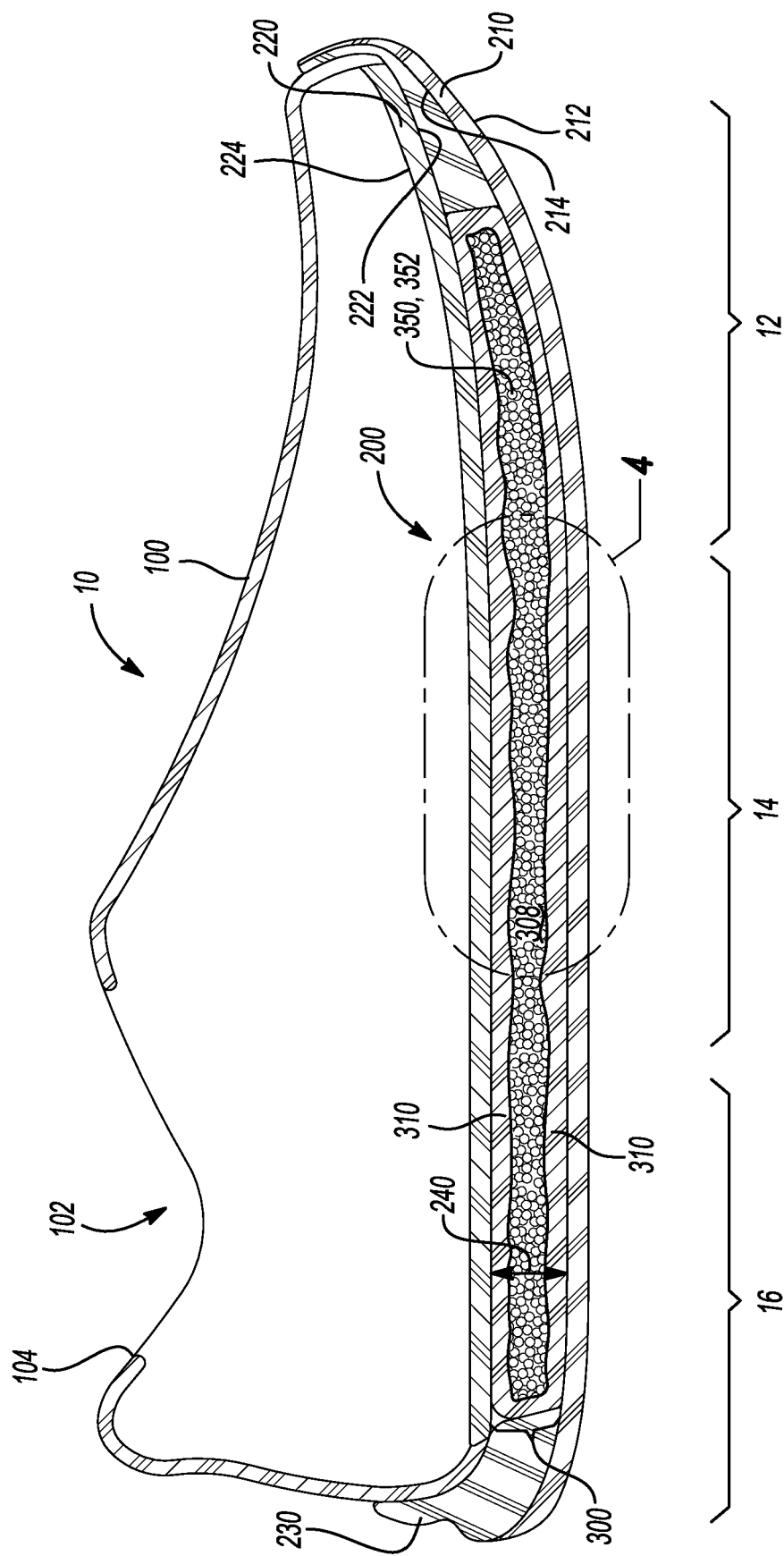
FIG. 3 is a cross-sectional view taken along line 3-3 of FIG. 1 showing a casing containing particulate matter and received within a cavity between an inner surface of an outsole and a bottom surface of a midsole.

Referring to FIG. 3, a cross-sectional view taken along line 3-3 of FIG. 1 shows the casing 300 containing the particulate matter 350 and received within the cavity 240 between the outsole 210 and the midsole 220. FIG. 3 shows the casing 300 having the exterior surface 306 (e.g., exterior wall) opposing the inner surface 214 of the outsole 210 and the bottom surface 222 of the midsole 220, as well as the inner periphery surfaces of the sidewall 130. The exterior surface 306 of the casing 300 may define an interior void 308 that receives the particulate matter 350 therein to provide cushioning for the foot during use of the footwear 10. Moreover, the elastomeric material 310 that coats and adheres to the exterior surface 306 of the casing 300 provides a flexible outer skin that encapsulates the casing 300 when the elastomeric material 310 hardens. In some examples, the elastomeric material 310 hardens during the formation of the casing 300. In addition to protecting the casing 300 by imparting properties such as abrasion-resistance and durability, the elastomeric material 310 may allow the casing 300 to take its desired shape during the molding process when the elastomeric material 310 hardens. In some configurations, the midsole 220, or a portion thereof, may be removed to provide direct contact between the bottom surface of the foot and the exterior surface 306 and/or the hardened elastomeric material 310 adhered to the casing 300. In these configurations, the casing 300 may correspond to a flexible strobel that allows the particulate matter 350 residing in the cavity 240 to conform to the bottom surface of the foot during gradient loading of the sole structure 200.

In some scenarios, at least a portion of the elastomeric material 310 applied to the casing 300 as a liquid, may extend into the interior void 308 and into contact with portions of the particulate matter 350 residing near the outer regions of the interior void 308, or otherwise disposed substantially proximate to the exterior surface 306 of the casing 300. The shaded portions within the interior void 308 of FIG. 4 denote elastomeric material 310 received within the interior void 308 via openings 309 formed in the outer surface 306 when the elastomeric material 310 is applied to the exterior surface 306 in a liquid state. For instance, the elastomeric material 310 may seep into the casing 300 via the openings 309 and may reside between adjacent particulate matter 350, thereby bonding the particulate matter 350 together proximate to the openings 309 when the elastomeric material 310 is hardened.

Referring to FIG. 4, a detailed schematic view within dashed box 4 of FIG. 3 shows the elastomeric material 310 partially extending into the interior void 308. The elastomeric material 310 only contacts a portion of the particulate matter 350 disposed within the interior void 308, thereby leaving particulate matter 350 disposed within interior regions (i.e., separated from the exterior surface 306) of the interior void 308 unexposed to the elastomeric material 310. Accordingly, a first quantity 352 of the particulate matter 350, neither exposed to nor in contact with the elastomeric material 310, is allowed to move relative to the casing 300. Conversely, a second quantity 354 of the particulate matter 350 in contact with the elastomeric material 310, is subsequently adhered to the elastomeric material 310, thereby attaching and affixing the second quantity 354 of particulate matter 350 to the casing 300. Accordingly, in addition to encapsulating the casing 300 to provide the casing 300 with a flexible outer skin, the elastomeric material 310 may adhere to the second quantity 354 of particulate matter 350 and, thus, may attach the second quantity 354 of particulate matter 350 to the casing 300 to prevent the second quantity 354 of particulate matter 350 from migrating throughout the cavity 240 of the sole structure 200 during repeated compressions. The first quantity 352 of particulate matter 350 is permitted to move about the casing 300 so that a level of soft-type cushioning may be dynamically distributed based on a direction and magnitude of the ground-reaction force being applied to the sole structure 200.

In some implementations, the particulate matter 350 (e.g., foam beads) slightly overfills the casing 300 to permit the particulate matter 350 to substantially occupy the interior void 308 enclosed by the exterior surface 306, thereby expanding the casing 300 to provide a substantially uniform and smooth surface profile at the exterior surface 306 prior to being formed to its desired shape. In contrast, when the casing 300 is filled using the force of gravity alone (i.e., not overfilled), the formed casing 300 may have voids unoccupied by particulate matter 350, thereby providing ample opportunity for the particulate matter 350 residing therein to shift and migrate freely when the sole structure 200 compresses. In some configurations, forming the casing 300 to the desired shape (i.e., by molding) may result in the second quantity 354 of particulate matter 350 adhered to the elastomeric material 310 being more dense or tightly packed than the first quantity 352 of particulate matter 350. That is, the more loosely packed first quantity 352 of particulate matter 350 may provide a degree of fluid cushioning during gradient loading of the sole structure 200 as the ground-engaging surface 212 rolls for engagement with the ground surface, while the second quantity 354 of particulate matter 350 affixed to the casing 300 may provide a more responsive-type cushioning as the sole structure 200 compresses. While the first quantity 352 of particulate matter 350 may be loosely packed, the first quantity 352 of particulate matter 350 and the second quantity 354 of particulate matter 350 may still substantially fill all voids enclosed by the casing 300. Note that while the particulate matter 350 is described as substantially filling all voids of the casing 300, gaps may obviously exits between adjacent particulate matter 350, as the particulate matter 350 may include a substantially spherical shape. The elastomeric material 310 may also provide some degree of responsive-type cushioning.

FIGS. 5-8 provide an article of footwear 10a that includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a may include an outsole 210a and a midsole 220a (e.g., also referred to as a footbed 220a) arranged in the layered configuration. The sidewall 230 may surround the perimeter of the outsole 210a and may separate the outsole 210a and the midsole 220a to define a cavity 240a therebetween. The outsole 210a includes an inner surface 214a disposed on an opposite side of the outsole 210a than the ground-engaging surface 212. The midsole 220a includes a bottom surface 222a disposed on an opposite side of the midsole 220a than the footbed 224. The bottom surface 222a opposes the inner surface 214a and the sidewall 230 may separate the bottom surface 222a and the inner surface 214a to define a depth of the cavity 240a.

Figure 6:
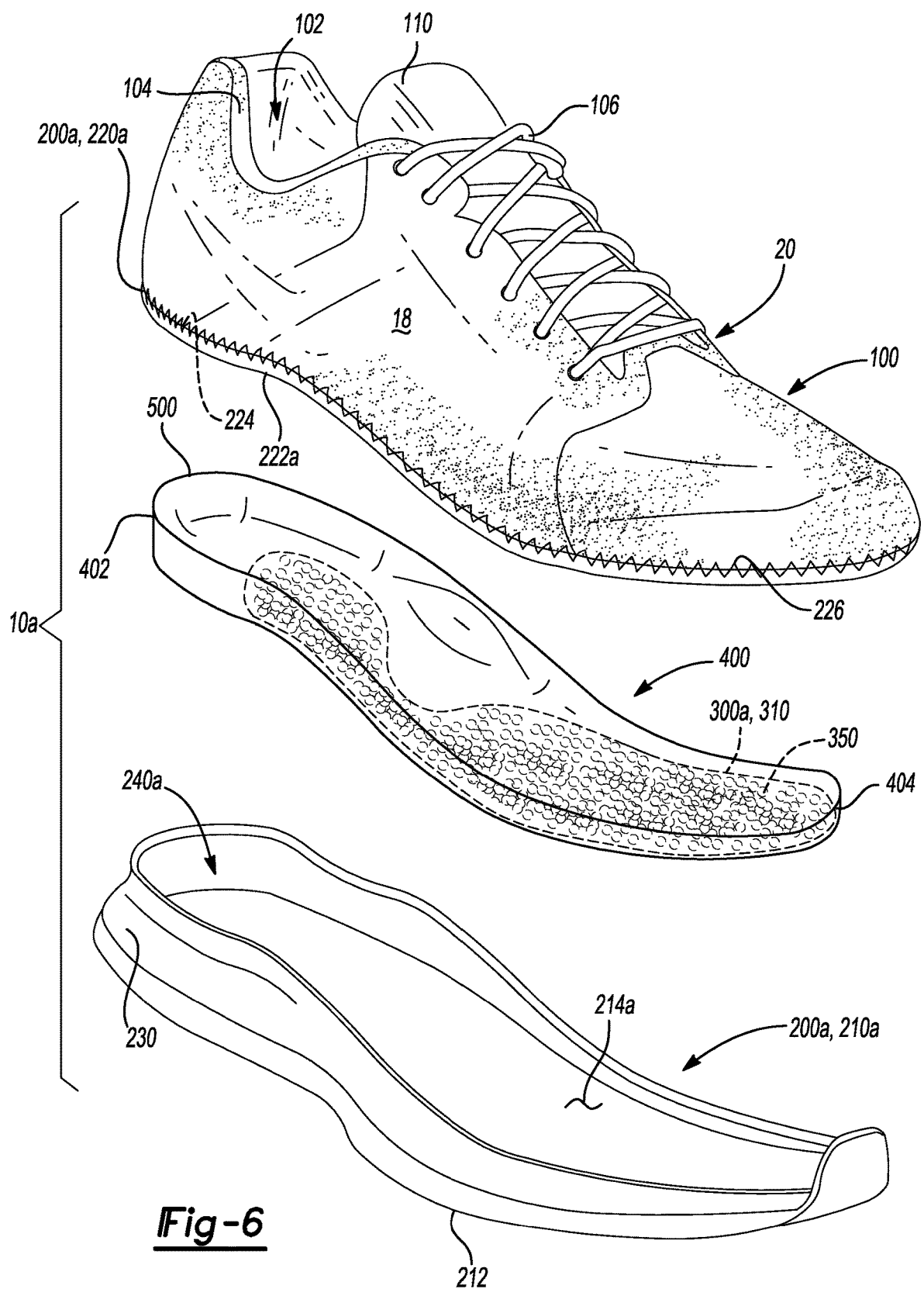
FIG. 6 is an exploded view of the article of footwear of FIG. 5 showing a cushioning member that provides cushioning material encapsulating a casing containing particulate matter and received within a cavity between an inner surface of an outsole and a bottom surface of a midsole.

In some configurations, the cavity 240a receives a cushioning member 400 that includes a casing 300a encapsulated by a cushioning material 500 and containing particulate matter 350. FIG. 6 provides an exploded view of the article of footwear 10a showing the cushioning member 400 having a length extending along the longitudinal axis L and between a first end 402 and a second end 404. The cushioning member 400 may be formed to provide contours that conform to a profile of the bottom surface 222a of the midsole 220a as well as the inner surface 214a of the outsole 210a. The cushioning material 500 that encapsulates the casing 300a may define a length substantially equal to the length of the cushioning member 400. In other configurations, the cushioning material 500 may partially encapsulate the casing 300a such that only a surface of the casing 300a that opposes the inner surface 214a of the outsole 210a or the bottom surface 222a of the midsole 220a is encapsulated by the cushioning material 500. For example, the cushioning material 500 may only be applied to the casing 300a in an area of the casing 300a that opposes and contacts the inner surface 214a. In this regard, an exterior surface 306a of the casing 300a may be exposed and may form a foot-receiving surface if the midsole 220a is partially or entirely removed. The midsole 220a may be formed from the flexible material forming the midsole 220 of FIGS. 1-4 to provide the midsole 220a with sufficient flexibility, thereby allowing the particulate matter 350 received within the casing 300a and residing in the cavity 240a to interact with the profile of the bottom surface of a foot during gradient loading of the sole structure 200a.

The cushioning material 500 may be formed from one or more polymer foam materials, such as ethyl-vinyl-acetate or polyurethane, to provide resilient compressibility under an applied load to attenuate ground-reaction forces. Conversely, compressibility by the particulate matter 350 may provide a soft-type cushioning. Accordingly, the cushioning material 500 that encapsulates the casing 300a and the particulate matter 350 disposed within the casing 300a may cooperate to provide gradient cushioning to the article of footwear 10a that changes as the applied load changes (i.e., the greater the load, the more the cushioning material 500 compresses and, thus, the more responsive the footwear performs).

The casing 300a may be formed from a flexible and porous material. For example, the casing 300a may be formed from the mesh material and/or the nylon material that form the casing 300 of FIGS. 1-4. In a similar fashion as described above with respect to FIGS. 1-4, the elastomeric material 310 may be applied to surfaces of the casing 300a to provide the casing 300a with a flexible outer skin that encapsulates the casing 300a. Additionally or alternatively, the cushioning material 500 may encapsulate the casing 300a by adhering to the elastomeric material 310 when the cushioning member 400 is molded (e.g., FIGS. 21-24) to conform to the surface profiles of the inner surface 214a of the outsole 210a and the bottom surface 222a of the midsole 220a. In some examples, the cushioning material 500, the particulate matter 350, and the elastomeric material 310 are formed from one or more recyclable polymers.

Figure 7:
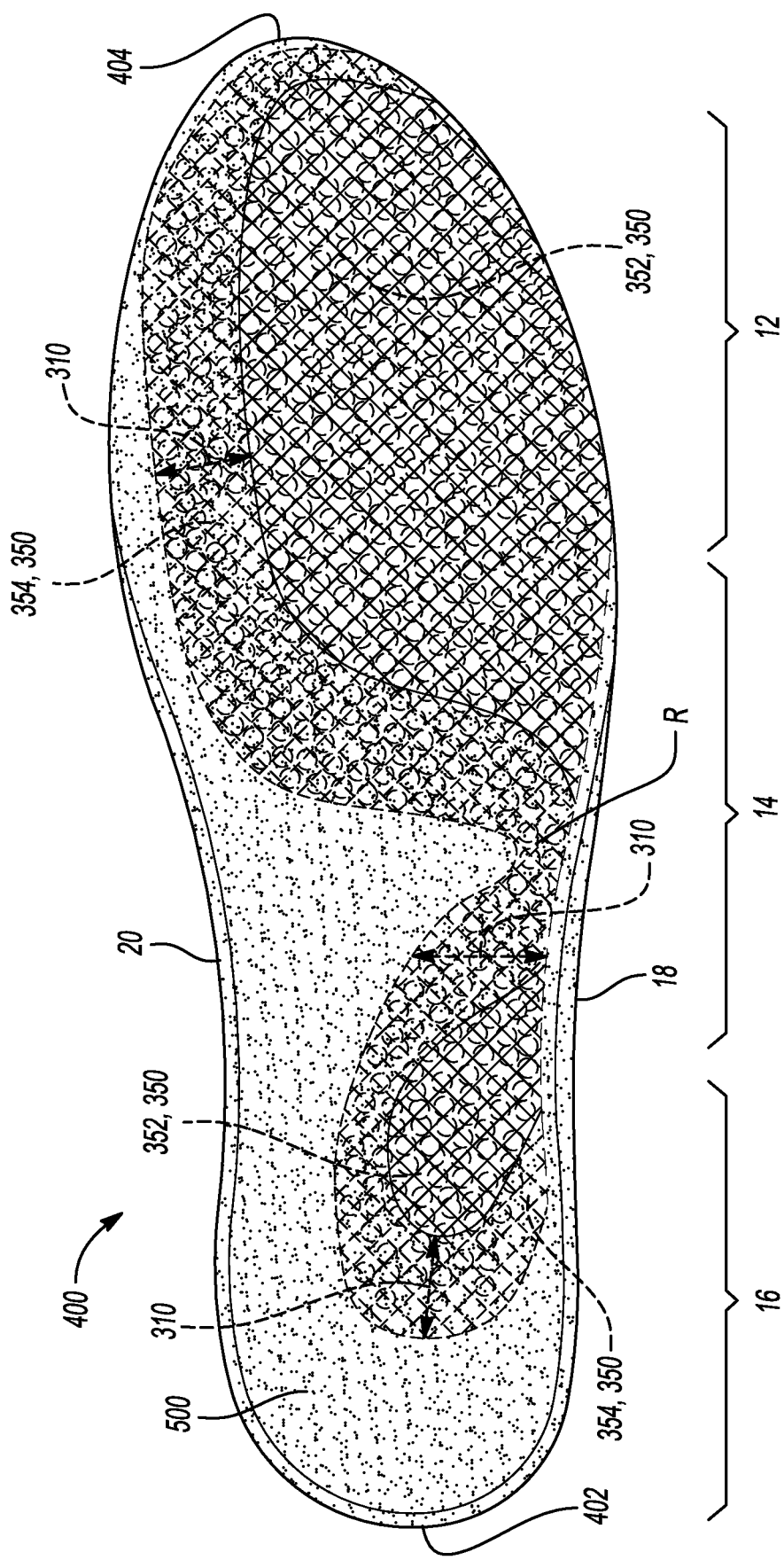
FIG. 7 is a top view of a cushioning member of the article of footwear of FIG. 5 showing a casing encapsulated within the cushioning material and containing particulate matter.

Referring to FIG. 7, a top view of the cushioning member 400 of the article of footwear 10a shows the cushioning material 500 encapsulating the casing 300a coated with the elastomeric material 310 and containing the particulate matter 350. The casing 300a may include a size and shape selected to place the particulate matter 350 residing therein at designated locations in the sole structure 200a when the cushioning material 500 of the formed cushioning member 400 encapsulates the casing 300a coated with the elastomeric material 310. For example, the casing 300a—when encapsulated by the cushioning material 500—may be tapered to provide a partial barrier between the heel portion 16 and the forefoot portion 12 of the sole structure 200a that prevents the particulate matter 350 from migrating therebetween. Additionally or alternatively, walls of the casing 300a may be secured together to define at least two segments each containing a respective portion of the particulate matter 350 to prevent the portions of particulate matter 350 from migrating between the adjacent segments. The walls of the casing 300a could be joined in a region R disposed between the heel portion 16 and the forefoot portion 12, for example. In some examples, the casing 300a is shaped so that a greater quantity of particulate matter 350 resides in the forefoot portion 12 and the mid-foot portion 14 collectively compared to the quantity of particulate matter 350 residing in the heel portion 16. Accordingly, portions of the casing 300a associated with the forefoot portion 12 and the mid-foot portion 14 may define a larger volume for containing particulate matter 350 due to the forefoot portion 12 and the mid-foot portion 14 of the sole structure 200a defining a greater width extending between the lateral side 18 and the medial side 20 than the width of the heel portion 16.

Figure 5:
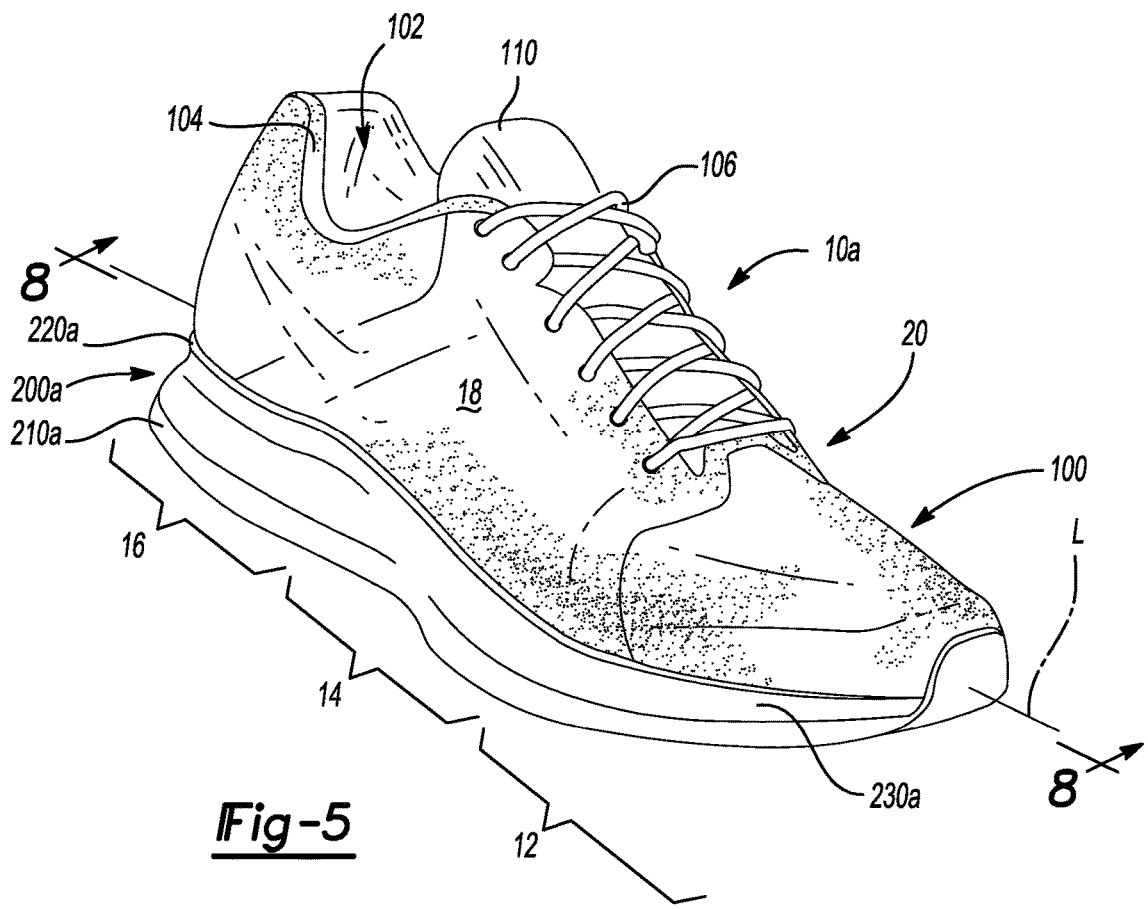
FIG. 5 is a top perspective view of an article of footwear in accordance with principles of the present disclosure.

FIG. 8 provides a partial cross-sectional view taken along line 8-8 of FIG. 5 showing the cushioning member 400 received within the cavity 240a between the outsole 210a and the midsole 220a. The cushioning material 500 includes a bottom portion 501 in contact with the inner surface 214a of the outsole 210a and a top portion 502 disposed on an opposite side of the cushioning material 500 than the bottom portion 501 and in contact with the bottom surface 222a of the midsole 220a.

In some implementations, the casing 300a is encapsulated between the bottom portion 501 and the top portion 502 of the cushioning material 500. The Exterior surface 306a of the casing 300 may define an interior void 308a that receives the particulate matter 350 residing therein to provide cushioning for the foot during use of the footwear 10a. The elastomeric material 310 may be coated on the exterior surface 306 of the casing 300a as a liquid, in a similar fashion as described above with reference to FIGS. 1-4. Accordingly, the elastomeric material 310 may adhere to the exterior surface 306a of the casing 300a and to the bottom portion 501 and the top portion 502 of the cushioning material 500 to permit the cushioning material 500 to encapsulate the casing 300a when the cushioning member 400 is molded (e.g., FIGS. 21-23). In some examples, prior to molding the cushioning member 400, the bottom portion 501 may correspond to a first layer and the top portion 502 may correspond to a second layer separate from the first layer. In these examples, the first layer 501 and the second layer 502 may adhere to the elastomeric material 310 to form the cushioning material 500 that encapsulates the casing 300a. In other implementations, the casing 300a is partially encapsulated by one of the bottom portion 501 or the top portion 502 of the cushioning material 500.

As with the casing 300a of FIGS. 1-4, at least a portion of the elastomeric material 310 coated on the exterior surface 306a of the casing 300a may extend into the interior void 308a via openings 309 and into contact with portions of the particulate matter 350 residing near the outer regions of the interior void 308a, or otherwise disposed substantially proximate to the exterior surfaces 306a of the casing 300a. The shaded portions within the interior void 308a denote a portion of the elastomeric material 310 disposed within the interior void 308a. Thus, the view of FIG. 8 shows the interior void 308a enclosing the first quantity 352 of particulate matter 350 spaced apart from the elastomeric material 310 and also enclosing the second quantity 354 of particulate matter 350 in contact with the elastomeric material 310. Accordingly, the second quantity 354 of particulate matter 350 may attach or affix to the casing 300 by adhering to the elastomeric material while the first quantity 352 of particulate matter 350 is allowed to move relative to the casing 300a and the cushioning material 500. Advantageously, the second quantity 354 of particulate matter 350 is prevented from migrating throughout the cavity 240a of the sole structure 200a during repeated compressions, while the first quantity 352 of particulate matter 350 is permitted to move relative to the casing 300a (and also to the second quantity 354 of particulate matter 350) so that a level of soft-type cushioning may be dynamically distributed based on a direction and magnitude of the ground-reaction force being applied to the sole structure 200.

The cushioning material 500 may compress between the midsole 220 and the outsole 210 during gradient loading of the sole structure 200a. As described above, compressibility by the particulate matter 350 may provide a level of soft-type cushioning while compressibility by the cushioning material 500 may provide a responsive-type cushioning. Thus, when the sole structure 200b is under load, the particulate matter 350 may provide the level of soft-type cushioning during an initial impact of a ground-reaction force while compressibility of the cushioning material 500 may occur after the initial impact to provide responsive-type cushioning. Accordingly, the cushioning material 500 and the particulate matter 350 may cooperate to provide gradient cushioning to the article of footwear 10a that changes as the applied load changes (i.e., the greater the load, the more the cushioning material 500 is compressed and, thus, the more responsive the footwear 10a performs). In some configurations, the midsole 220a, or a portion thereof, may be removed to provide direct contact between the bottom surface of a foot and the cushioning member 400. In these configurations, the cushioning member 400 may correspond to a flexible strobel that allows the particulate matter 350 residing in the casing 300a and the cushioning material 500 encapsulating the casing 300a to conform to the bottom surface of the foot during gradient loading of the sole structure 200a. Further, the cushioning member 400 may be a so-called "drop-in" cushioning member 400 that may or may not be adhered to the sole structure 200b. Namely, the cushioning member 400 may be inserted into the article of footwear 10b at the interior void 102 of the upper 100 and may rest on the inner surface 214a. The cushioning member 400 may rest on the inner surface 214a or, alternatively, may be adhered to the inner surface 214a via a suitable adhesive.

Figure 10:
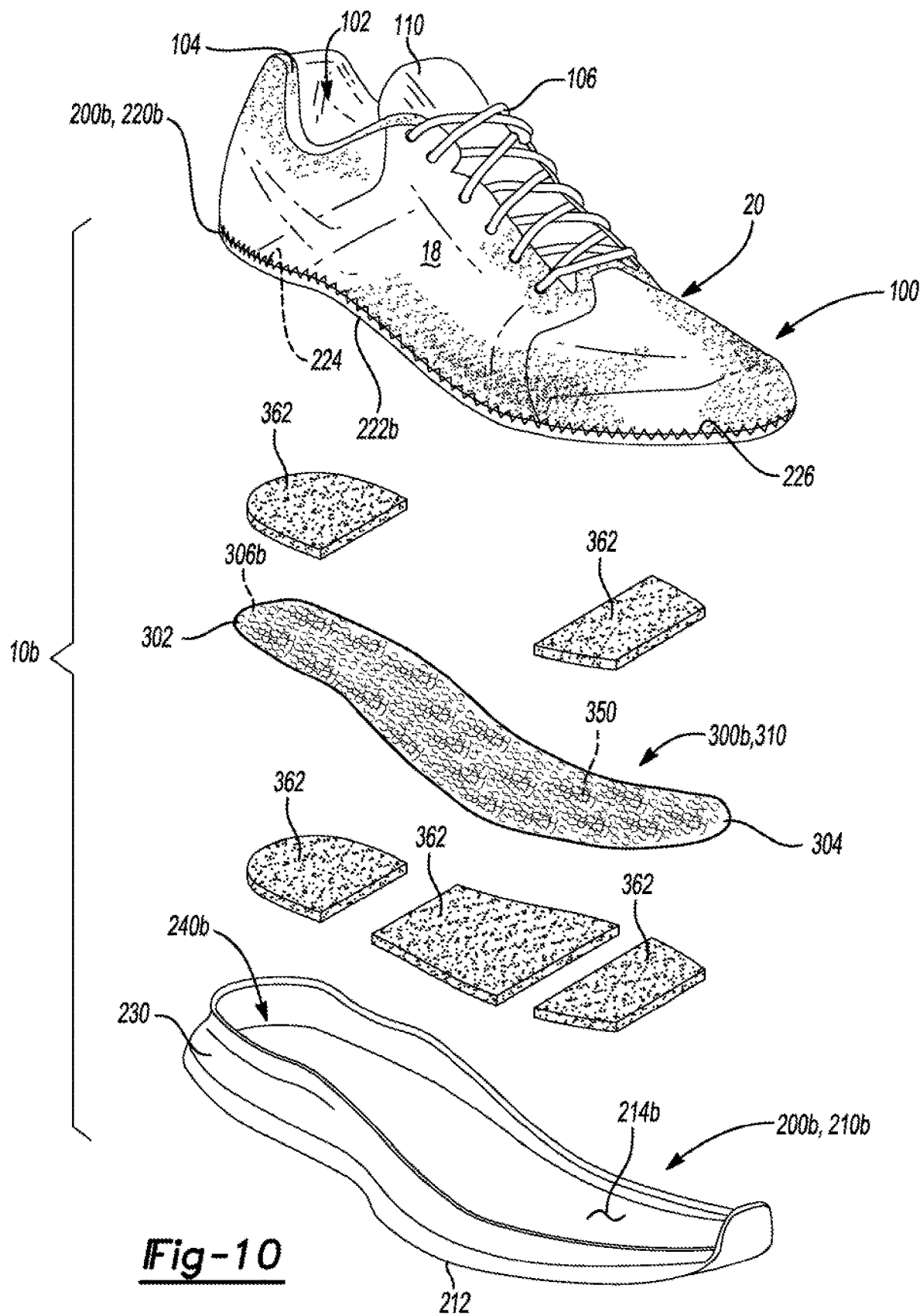
FIG. 10 is an exploded view of the article of footwear of FIG. 9 showing first foam segments adhered to an exterior surface of a casing received within a cavity between an inner surface of an outsole and a bottom surface of a midsole.
Figure 11:
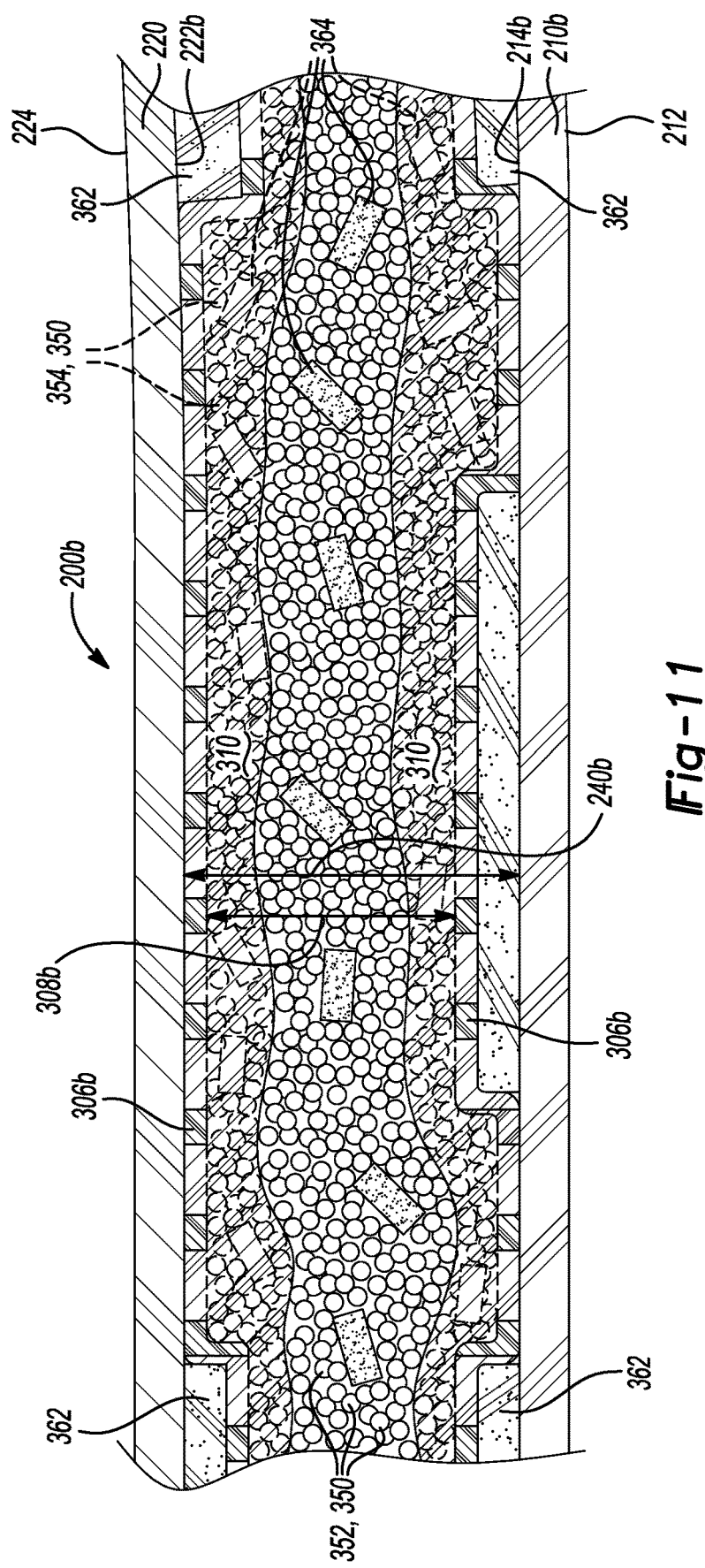
FIG. 11 is a partial cross-sectional view taken along line 10-10 of FIG. 9 showing first foam segments adhered to an exterior surface of a casing received within a cavity between a bottom surface of a midsole and an inner surface of an outsole.

Referring to FIGS. 9-11, an article of footwear 10b is provided and includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified.

The sole structure 200b may include an outsole 210b and a midsole 220b arranged in the layered configuration. The sidewall 230 may surround the perimeter of the outsole 210b and may separate the outsole 210b and the midsole 220b to define a cavity 240b therebetween. The outsole 210b includes an inner surface 214b disposed on an opposite side of the outsole 210b than the ground-engaging surface 212. The midsole 220b includes a bottom surface 222b disposed on an opposite side of the midsole 220b than the footbed 224. The bottom surface 222b opposes the inner surface 214b and the sidewall 230 may separate the bottom surface 222b and the inner surface 214b to define a depth of the cavity 240b.

In some configurations, the cavity 240b receives a casing 300b that contains particulate matter 350 to provide cushioning for the foot during use of the footwear 10b. The casing 300b may define a length that extends substantially parallel to the longitudinal axis L of the sole structure 200b and may be formed to provide contours that conform to surface profiles of the inner surface 214b of the outsole 210b and the bottom surface 222b of the midsole 220b. As with the casing 300 of the article of footwear 10 of FIGS. 1-4, the casing 300b may be formed from one or more flexible and porous materials such as a mesh material and/or a nylon material and may be coated with the elastomeric material 310 to provide a flexible outer skin that encapsulates the casing 300b. At least a portion of the elastomeric material 310 may extend into an interior void 308b defined by an exterior surface 306b of the casing 300b. Accordingly, the first quantity 352 of particulate matter 350 may be movable relative to the casing 300b and the second quantity 354 of particulate matter 350 is adhered to the elastomeric material 310 and is therefore not movable relative to the casing 300b. As with the casing 300, the casing 300b provides gradient cushioning as the ground-engaging surface 212 of the outsole 210b rolls for engagement with the ground surface between the heel portion 16 and the forefoot portion 12. The second quantity 354 of particulate matter 350 and the elastomeric material 310 interact in a similar fashion as described above with reference to the article of footwear 10 of FIGS. 1-4.

In some implementations, one or more first foam segments 362 are attached to the elastomeric material 310 and are disposed on the exterior surface 306b of the casing 300b. FIG. 10 provides an exploded view of the article of footwear 10b showing the casing 300b received within the cavity 240b and the first foam segments 362 attached to the casing 300b by adhering to the elastomeric material 310 disposed on the exterior surface 306b of the casing 300b. The elastomeric material 310 may be coated on the exterior surface 306b of the casing 300b in a liquid state in a similar fashion as described above with respect to FIGS. 1-4. As such, when the elastomeric material 310 hardens, the elastomeric material 310 may adhere to the exterior surface 306b of the casing 300b and also to the first foam segments 362 when the casing 300b is formed to provide the contours that conform to the surface profiles of the bottom surface 222b of the midsole 220b and the inner surface 214b of the outsole 210b. In some examples, the first foam segments 362 adhere to the elastomeric material 310 when the casing 300b is molded (e.g., FIGS. 24-26) to conform to the foregoing surface profiles of the sole structure 200b.

In some configurations, a quantity of second foam segments 364 is disposed within the interior void 308b of the casing 300b. Referring to FIG. 11, a partial cross-sectional view taken along line 11-11 shows the casing 300b received within the cavity 240b between the outsole 210b and the midsole 220b, the first foam segments 362 attached to the exterior surface 306b of the casing 300b, and the quantity of second foam segments 364 disposed within the interior void 308b. The first foam segments 362 may be spaced apart from one another along the length of the sole structure 200b between the casing 300b and the bottom surface 222b of the midsole 220b and also between the casing 300b and the inner surface 214b of the outsole 210b. For example, two of the first foam segments 362 may be disposed between the casing 300b and the bottom surface 222b of the midsole 220b at respective ones of the forefoot portion 12 and the heel portion 16 of the sole structure 200b. Additionally or alternatively, three of the first foam segments 362 may be disposed between the casing 300b and the inner surface 214b of the outsole 210b at respective ones of the forefoot portion 12, the mid-foot portion 14, and the heel portion 16 of the sole structure 200b. In other configurations, more or less of the first foam segments 362 may be disposed between the casing 300b and the bottom surface 222b and/or between the casing 300b and the inner surface 214b. The first foam segments 362 may correspond to resilient members that provide resiliently compressibility to attenuate ground-reaction forces when the sole structure 200b is under an applied load and are not limited to being formed from a foam material. For example, any one or all of the segments 362 could be fluid-filled bladders. In some configurations, the particulate matter 350, the elastomeric material 310, the first foam segments 362, and the second foam segments 364 are formed one or more recyclable polymer materials.

The quantity of second foam segments 364 and the particulate matter 350 may be disposed within the interior void 308b. Here, the second foam segments 364 may include a different size and shape than the particulate matter 350 (e.g., foam beads). In some examples, the second foam segments 364 are larger than the foam beads and exhibit cushioning characteristics that are more responsive when compressed. In some examples, at least a portion of the second foam segments 364 are attached to the casing 300b by the elastomeric material 310 disposed within the interior void 308b. More specifically, portions of the second foam segments 364 that come into contact with the elastomeric material 310 are attached to the casing 300b by adhering to the elastomeric material 310 in a similar fashion as the second quantity 354 of particulate matter 350. As such, these portions of the second foam segments 364 may be attached to the casing 300b together with the second quantity 354 of the particulate matter 350.

As with the first quantity 352 of particulate matter 350, at least a portion of the second foam segments 364 are movable relative to the casing 300b. That is, portions of the second foam segments 364 that are spaced apart from the elastomeric material 310 may be permitted to shift and move relative to the casing 300b in cooperation with the first quantity 352 of particulate matter 350 to provide fluidic cushioning characteristics in response to the direction and magnitude of a ground-reaction force applied to the sole structure 200b. As described above, the first foam segments 362 and the second foam segments 364 are more resilient than the particulate matter 350 and, therefore, more responsive. Accordingly, when the foam segments 362, 364 are compressed, they provide a more responsive feel as compared to the level of soft-type cushioning provided by particulate matter 350 when compressed. Accordingly, the first foam segments 362 and the second foam segments 364 may cooperate with the particulate matter 350 to enhance functionality and enhance cushioning characteristics that a conventional midsole provides. For example, when the sole structure 200c is under load, the particulate matter 350 compressing may provide a level of soft-type cushioning during an initial impact of a ground-reaction force while compressibility of the first foam segments 362 and the second foam segments 364 may occur after the initial impact to provide responsive-type cushioning. Thus, the particulate matter 350 and the foam segments 362, 364 residing in the cavity 240b may cooperate to provide gradient cushioning to the article of footwear 10b that changes as the applied load changes (i.e., the greater the load, the more the foam segments 362, 364 are compressed and, thus, the more responsive the footwear 10b performs).

The midsole 220b may be formed from the flexible material forming the midsole 220 of FIGS. 1-4 to provide the midsole 220b with sufficient flexibility, thereby allowing the particulate matter 350, the second foam segments 364 received within the casing 300b, and the first foam segments 362 disposed on the exterior surface 306b of the casing 300b, to interact with the profile of the bottom surface of the foot during gradient loading of the sole structure 200b. In some configurations, the midsole 220b, or a portion thereof, may be removed to provide direct contact between the bottom surface of a foot and the exterior surface 306b of the casing 300b and/or the first foam segments 362 disposed on the exterior surface 306b of the casing 300b. In these configurations, the casing 300b may correspond to a flexible strobel that allows the particulate matter 350 residing in the cavity 240b to conform to the bottom surface of the foot during gradient loading of the sole structure 200b.

Figure 12:
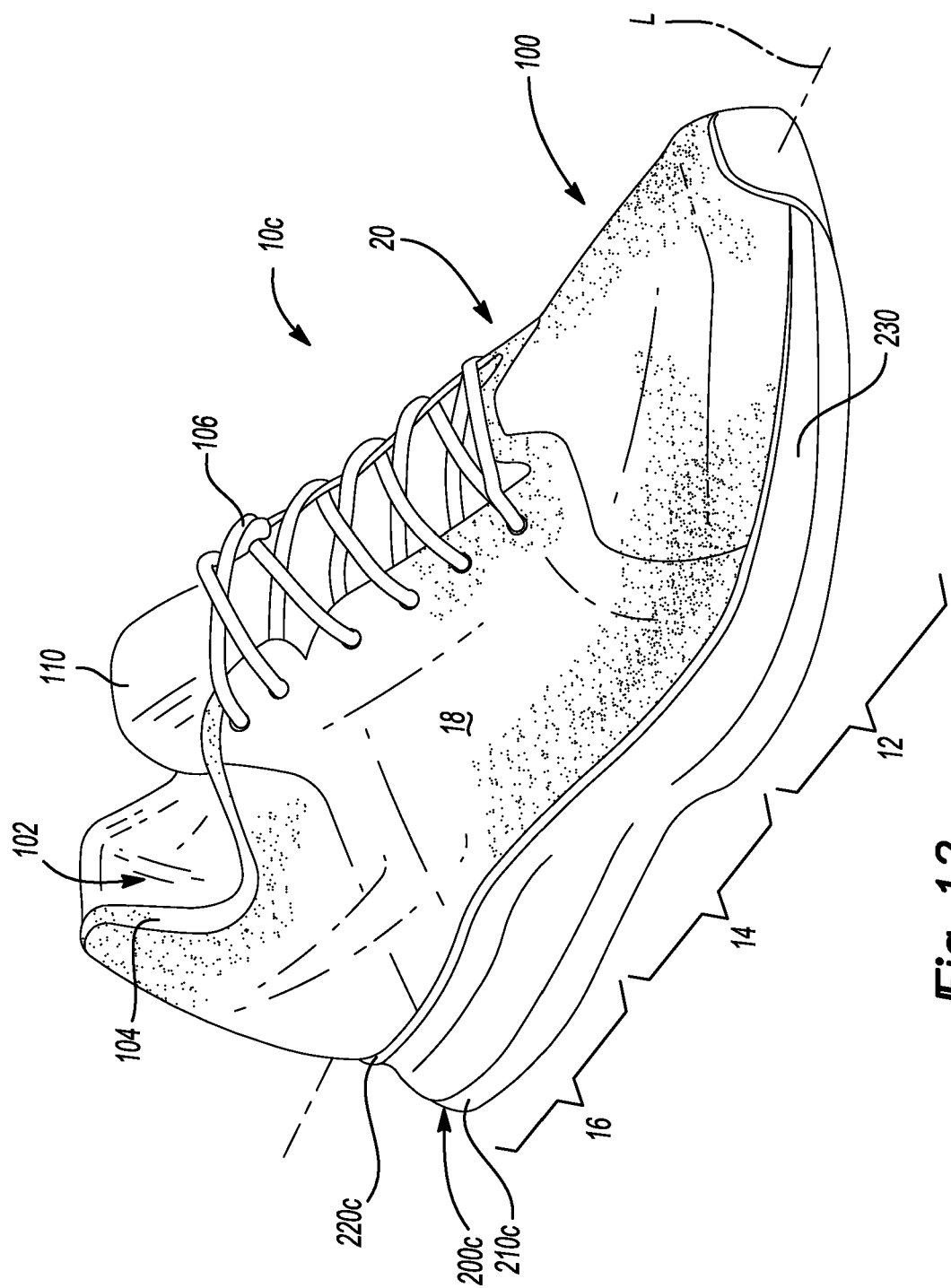
FIG. 12 is a top perspective view of an article of footwear in accordance with principles of the present disclosure.
Figure 13:
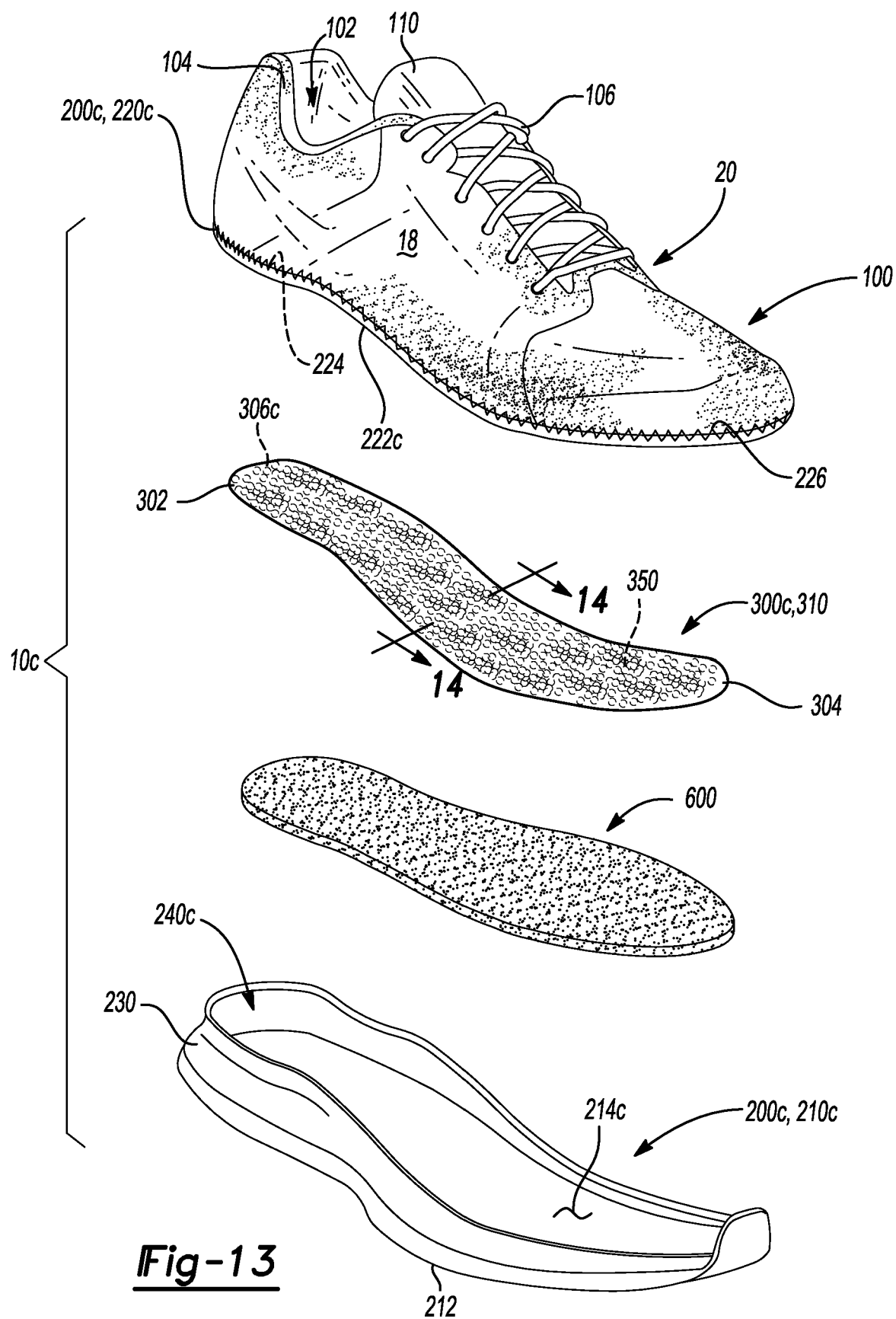
FIG. 13 is an exploded view of the article of footwear of FIG. 12 showing a casing containing particulate matter and received within a cavity between an inner surface of an outsole and a bottom surface of a midsole.
Figures 14, 15:
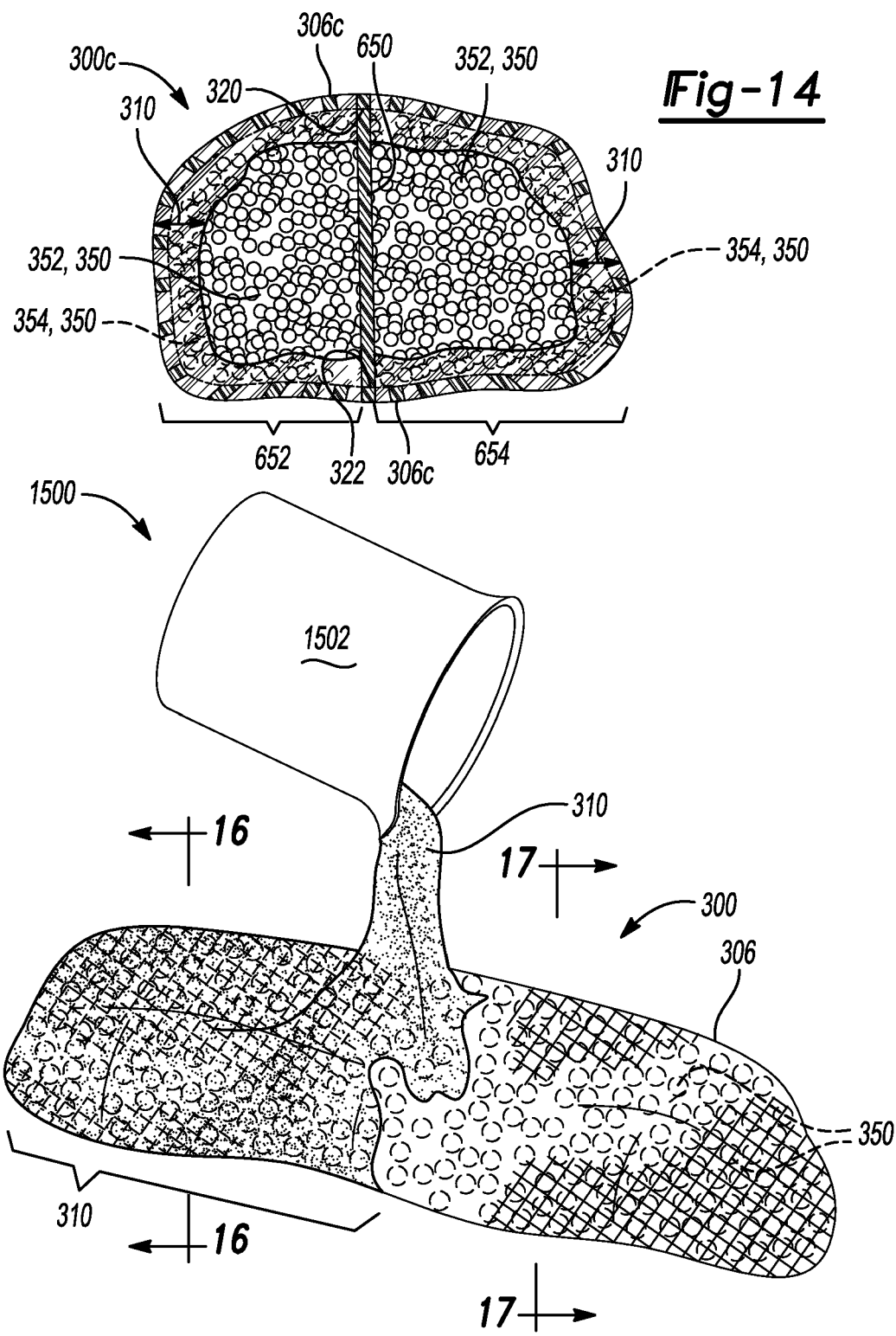
FIG. 14 is a cross-sectional view taken along line 14-14 of FIG. 13 showing a divider wall disposed within an interior void of the casing and a first quantity of particulate matter movable relative to the casing and a second quantity of particulate matter adhered to an elastomeric material that extends into the interior void of the casing.
FIG. 15 is a perspective view of a process for applying elastomeric material to an exterior surface of a casing in accordance with principles of the present disclosure.

Referring to FIGS. 12-14, an article of footwear 10c is provided and includes an upper 100 and a sole structure 200c attached to the upper 100. In view of the substantial similarity in structure and function of the components associated with the article of footwear 10 with respect to the article of footwear 10c, like reference numerals are used hereinafter and in the drawings to identify like components while like reference numerals containing letter extensions are used to identify those components that have been modified.

The sole structure 200c may include an outsole 210c and a midsole 220c arranged in the layered configuration. The sidewall 230 may surround the perimeter of the outsole 210c and may separate the outsole 210c and the midsole 220c to define a cavity 240c therebetween. The outsole 210c includes an inner surface 214c disposed on an opposite side of the outsole 210c than the ground-engaging surface 212. The midsole 220c includes a bottom surface 222c disposed on an opposite side of the midsole 220c than the footbed 224. The bottom surface 222c opposes the inner surface 214c and the sidewall 230 may separate the bottom surface 222c and the inner surface 214c to define a depth of the cavity 240c.

In some configurations, the cavity 240c receives a casing 300c that contains particulate matter 350 to provide cushioning for the foot during use of the footwear 10c. The casing 300c may define a length that extends between the first end 302 and the second end in a direction substantially parallel to the longitudinal axis L of the sole structure 200c. The casing 300c may be formed to provide contours that conform to at least the bottom surface 222c of the midsole 220c. As with the casing 300 of the article of footwear 10 of FIGS. 1-4, the casing 300c may be formed from one or more flexible and porous materials such as a mesh material and/or a nylon material and may be coated with the elastomeric material 310 to provide a flexible outer skin that encapsulates the casing 300c or is at least disposed on an exterior surface 306c of the casing 300c.

At least a portion of the elastomeric material 310 may extend into an interior void 308c defined by the exterior surface 306c of the casing 300c. Accordingly, the first quantity 352 of particulate matter 350 is movable relative to the casing 300c and the second quantity 354 of particulate matter 350 adhered to the elastomeric material 310 is fixed for movement with the casing 300c. As with the casing 300 of FIGS. 1-4, the casing 300c provides gradient cushioning for the footwear 10c as the ground-engaging surface 212 of the outsole 210 rolls for engagement with the ground surface between the heel portion 16 and the forefoot portion 12. The second quantity 354 of particulate matter 350 and the elastomeric material 310 may interact in a similar fashion as described above with reference to the article of footwear 10 of FIGS. 1-4. The midsole 220c may be formed from the flexible material forming the midsole 220 of FIGS. 1-4 to provide the midsole 220c with sufficient flexibility, thereby allowing the particulate matter 350 received within the casing 300c and residing in the cavity 240c to interact with the profile of the bottom surface of a foot during gradient loading of the sole structure 200c.

In some implementations, the sole structure 200c includes a resilient member 600 disposed within the cavity 240c between the inner surface 214c of the outsole 210c and the casing 300c. Referring to FIG. 13, an exploded view of the article of footwear 10c shows the resilient member 600 disposed on the inner surface 214c of the outsole 210c and the casing 300c containing the particulate matter 350 disposed between the resilient member 600 and the bottom surface 222c of the midsole 220c. The resilient member 600 may be sized and shaped to occupy a portion of empty space within the cavity 240c. Here, a gap between the resilient member 600 and the bottom surface 222c defines a remaining portion of empty space within the cavity 240c that receives the casing 300c. Accordingly, the resilient member 600 and the casing 300 may substantially occupy the entire volume of empty space defined by the cavity 240c. In some configurations, the midsole 220c, or a portion thereof, may be removed to provide direct contact between the bottom surface of a foot and the exterior surface 306c of the second casing 320 and/or the hardened elastomeric material 310 adhered to the casing 300c.

The resilient member 600 may compress resiliently between the midsole 220c and the outsole 210c. In some configurations, the resilient member 600 corresponds to a slab of polymer foam. In other configurations, the resilient member 600 corresponds to a fluid-filled chamber defining an interior void that receives a pressurized fluid and provides a durable sealed barrier for retaining the pressurized fluid therein. The pressurized fluid may be air. A wide range of polymer materials may be utilized to form the fluid-filled chamber. In selecting the polymer materials, engineering properties, such as tensile strength, stretch properties, fatigue characteristics, and dynamic modulus, as well as the ability of the materials to prevent the diffusion of the fluid contained by the chamber may be considered. Exemplary materials used to form the fluid-filled chamber may include one or more of thermoplastic urethane, polyurethane, polyester, polyester polyurethane, and polyether polyurethane.

During gradient loading of the sole structure 200c, the midsole 220c may translate toward the outsole 210c as the particulate matter 350 within the casing 300c compresses between the midsole 220c and the resilient member 600. Here, the resilient member 600 compresses resiliently between the outsole 210c and the midsole 220c. The resilient member 600, together with the quantity of particulate matter 350 (e.g., foam beads) residing within the casing 300c, may cooperate to enhance functionality and cushioning characteristics that a conventional midsole provides. For example, when the sole structure 200c is under load, the particulate matter 350 compressing may provide a level of soft-type cushioning during an initial impact of a ground-reaction force while compressibility of the resilient member 600 may occur after the initial impact to provide responsive-type cushioning. Accordingly, the particulate matter 350 disposed within the casing 300c and the resilient member 600 residing in the cavity 240c may cooperate to provide gradient cushioning to the article of footwear 10c that changes as the applied load changes (i.e., the greater the load, the more the resilient member 600 compresses, thus, the more responsive the footwear 10c performs).

In some implementations, the casing 300c may include at least one divider wall 650 disposed within the interior void 308 and bonded to walls of the casing 300c. FIG. 14 provides a cross-sectional view of the casing 300c taken along line 14-14 of FIG. 13 showing the divider wall 650 including a first end bonded to an upper wall portion 320 of the casing 300c and a second end bonded to a lower wall portion 322 of the casing 300c. When the casing 300c is disposed within the cavity 240c, the upper wall portion 320 may oppose the bottom surface 222c of the midsole 220c and the lower wall portion 322 may oppose the resilient member 600. In configurations where the resilient member 600 is omitted, the lower wall portion 322 may oppose and contact the inner surface 214c of the outsole 210c.

The divider wall 650 may define at least two segments 652, 654 containing at least one of a portion of the first quantity 352 of particulate matter 350 and a portion of the second quantity 354 of particulate matter 350. In some examples, each segment 652, 654 corresponds to a respective channel that extends substantially parallel to the longitudinal axis L of the sole structure 200c. In some examples, the divider wall 650 is substantially perpendicular to the longitudinal axis L of the sole structure 200c and extends along the length of the casing 300c through the forefoot portion 12, the mid-foot portion 14, and the heel portion 16 of the sole structure 200c. In other examples, the divider wall 650 may be substantially parallel to the longitudinal axis L or may be angled with respect to the longitudinal axis L and/or extend along only a portion of the length of the casing 300c. In some configurations, two or more divider walls 650 are bonded to walls of the casing 300c to define three or more segments. In some configurations, the divider wall 650 may be omitted and the upper wall portion 320 and the lower wall portion 322 may be secured together to define at least two segments 652, 654.

The divider wall 650 and the segments 652, 654 may cooperate to provide cushioning for the foot as well as to control movement of the first quantity 352 of particulate matter 350 residing within each segment 652, 654 during use of the footwear 10c. In some examples, the divider wall 650 may be formed from one or more polymer foam materials to provide resilient compressibility for attenuating ground-reaction forces during gradient loading of the sole structure. The first quantity 352 of particulate matter 350 residing in each segment 652, 654 may be permitted to move within each segment 652, 654 in a direction substantially parallel to the longitudinal axis L of the sole structure 200c and between the second quantity 354 of particulate matter 350 attached to the casing 300c. Conversely, the divider wall 650 may restrict the first quantity 352 of particulate matter 350 residing within the segments 652, 654 from moving between the segments 652, 654.

In some configurations, the divider wall 650 includes a tensile member that may be formed from fibers under tension. For instance, a distance separating the first end bonded to the upper wall portion 320 from the second end bonded to the lower wall portion 322 may cause the fibers from the at least one divider wall 650 to be under tension. While under tension, the fibers may define voids (not shown) through the divider wall 650. In some examples, the first quantity 352 of particulate matter 350 moves between segments 652, 654 through the voids between adjacent ones of the fibers. Conversely, in other examples, the voids may not be large enough to permit the passing of the first quantity 352 of particulate matter 350, thereby allowing the fibers forming the divider wall 650 to restrict the particulate matter 350 from freely moving between the segments 652, 654. Additionally, the first quantity 352 of particulate matter 350 may be permitted to freely move within each of the segments 652, 654.

FIG. 15 is a schematic representation of a process 1500 used to apply the elastomeric material 310 to the exterior surface 306 of the casing 300 of FIG. 1. The process 1500 may include applying the elastomeric material 310 as a liquid on the exterior surface 306 of the casing 300. In some examples, a vat 1502 is filled with the liquid elastomeric material 310 and is used to pour the liquid elastomeric material 310 over the casing 300a, thereby coating the exterior surface 306 of the casing 300. For instance, the vat 1502 may pour the liquid elastomeric material 310 on the casing 300 from the left of the casing 300 to the right of the casing 300 relative to the view shown in FIG. 15. The casing 300 may be rotated or flipped so that the liquid elastomeric material 310 substantially coats the entire exterior surface 306 of the casing 300. In view of the foregoing, the porosity of the casing may allow at least a portion of the liquid elastomeric material 310 to enter the interior void 308 and into contact with at least a portion (e.g. the second quantity 354) of particulate matter 350 residing therein.

Figure 16:
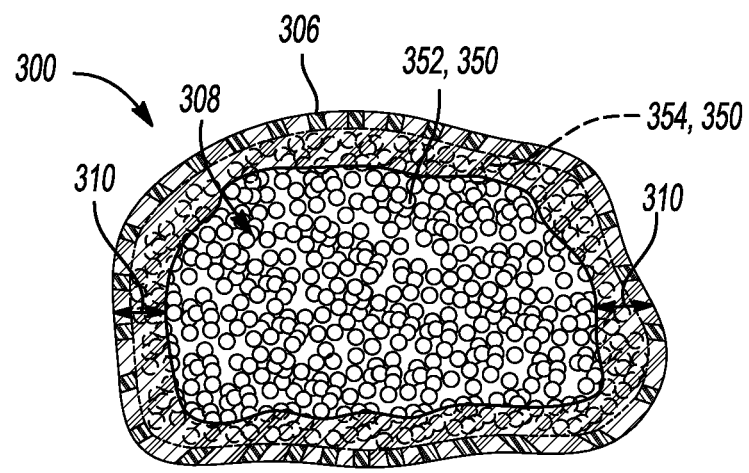
FIG. 16 is a cross-sectional view taken along line 16-16 of FIG. 15 showing the elastomeric material disposed on the exterior surface of the casing and extending into an interior void of the casing that contains particulate matter.

FIG. 16 provides a cross-sectional view taken along line 16-16 of FIG. 15 showing the elastomeric material 310 disposed on the exterior surface 306 of the casing 300 and partially extending into the interior void 308. Here, the first quantity 352 of particulate matter 350 that resides within inner regions of the interior void 308 is not exposed to the liquid elastomeric material 310 and is therefore permitted to move relative to the casing 300. Conversely, the second quantity 354 of particulate matter 350 that resides within outer regions of the interior void 308 is in contact with the liquid elastomeric material 310 and will become attached to the casing 300 by adhering to the elastomeric material 310 when the elastomeric material 310 hardens. In some examples, the elastomeric material 310 hardens when the casing 300 is molded to conform to surface profiles of the inner surface 214 of the outsole 210 and the bottom surface 222 of the midsole 220.

Figure 17:
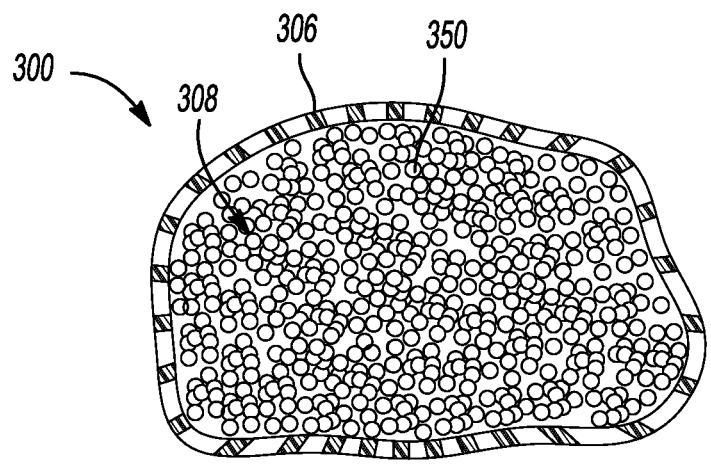
FIG. 17 is a cross-sectional view taken along line 17-17 of FIG. 15 showing a portion of the casing prior to applying the elastomeric material on the exterior surface of the casing.

FIG. 17 provides a cross-sectional view taken along line 17-17 of FIG. 15 showing a portion of the casing 300 containing particulate matter 350 prior to applying the liquid elastomeric material 310. Here, the particulate matter 350 is movable relative to the casing 300 and the elastomeric material 310 is not disposed on the exterior surface 306 of the casing 300. The particulate matter 350 may substantially fill all voids enclosed by the casing 300. Note that while the particulate matter 350 is described as substantially filling all voids of the casing 300, gaps may obviously exits between adjacent particulate matter 350, as the particulate matter 350 may include a substantially spherical shape.

The process 1500 may include allowing the casing 300 to settle for a predetermined period of time to allow the liquid elastomeric material 310 applied thereto to extend into the interior void 308. In other implementations, the liquid elastomeric material 310 may not be poured on the casing 300 but, rather, the casing 300 may be dipped into the vat 1502 filled with the liquid elastomeric material 310. Additionally or alternatively, a brush (not shown) and/or spray device (not shown) may be used to apply the liquid elastomeric material 310 to the exterior surface 306 of the casing 300. While the process 1500 for applying the elastomeric material 310 is described with reference to the casing 300 of the article of footwear 10 of FIGS. 1-4, the process 1500 described herein may also be used to apply the elastomeric material 310 to the exterior surfaces 306a-c of the casings 300a-c.

With reference to FIGS. 1-17, the casings 300, 300b, 300c and the cushioning member 400 may be molded to conform to surface profiles of associated ones of the inner surfaces 214, 214a-c of the outsoles 210, 210a-c (or the resilient member 600) and the bottom surfaces 222, 222a-c of the midsoles 220, 220a-c. Prior to molding, the liquid elastomeric material 310 may be coated on the exterior surfaces 306, 306a-c of the casings 300, 300a-c. The elastomeric material 310 disposed on the exterior surfaces 306, 306a-c may cause the liquid elastomeric material 310 to enter the casings 300, 300a-c and come into contact with the second quantities 354 of particulate matter 350. During molding, however, the elastomeric material 310 may harden and thereby adhere to the second quantity 354 of particulate matter 350 to attach and affix the second quantity 354 of particulate matter 350 to associated ones of the casings 300, 300a-c. The hardened elastomeric material 310 may encapsulate the casings 300, 300a-c to provide the casings 300, 300a-c with a flexible outer skin.

Figure 18:
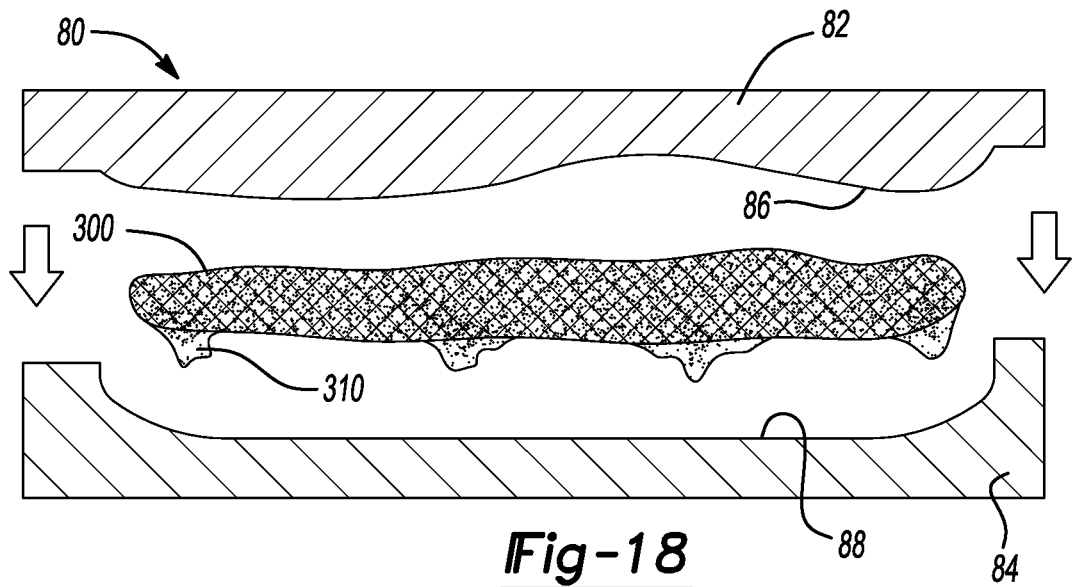
FIG. 18 is a schematic view of a mold showing a casing positioned between an upper mold portion of the mold and a lower mold portion of the mold when the mold is open in accordance with principles of the present disclosure.
Figure 19:
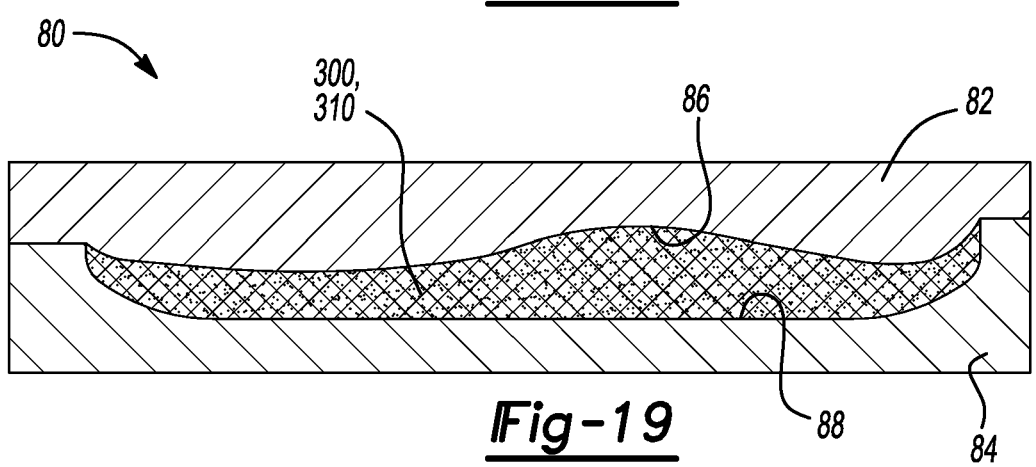
FIG. 19 is a schematic view of the mold of FIG. 18 showing the casing positioned between the upper mold portion and the lower mold portion when the mold is closed.
Figure 20:
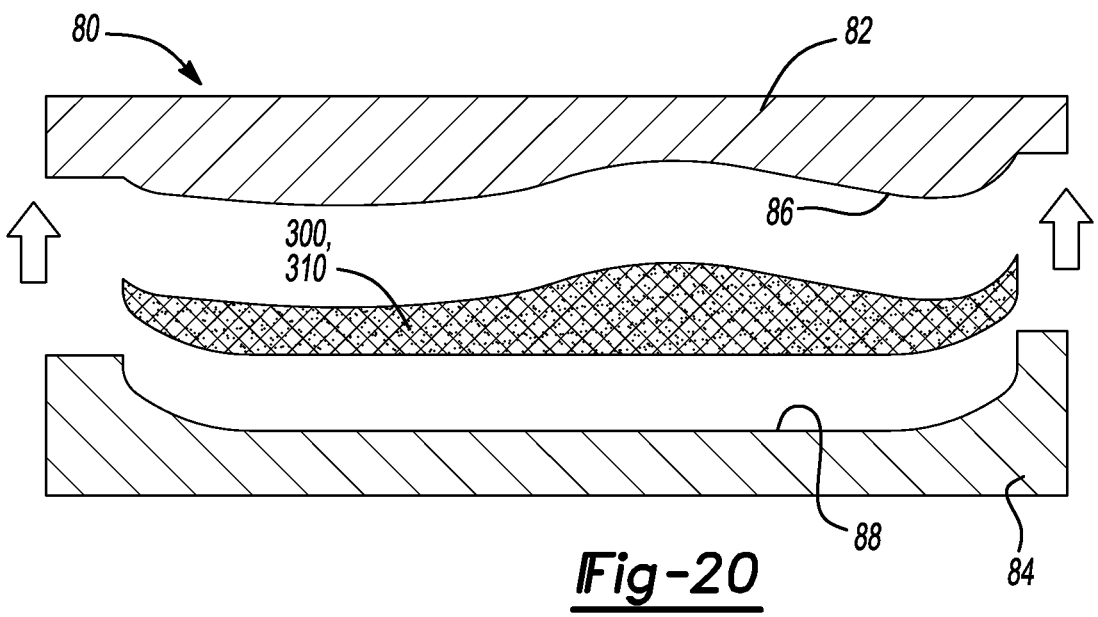
FIG. 20 is a schematic view of the mold of FIG. 18 showing the mold open and the casing molded to include a shape imparted by the upper mold portion and the lower mold portion.

Referring to FIGS. 18-20, a mold 80 is provided and includes an upper mold portion 82 and a lower mold portion 84 that compress and mold the casing 300 of the article of footwear 10 of FIGS. 1-4 to conform to the surface profiles of the inner surface 214 of the outsole 210 and the bottom surface 222 of the midsole 220. The upper mold portion 82 may include a contact surface 86 having a surface profile that imparts a shape to the casing 300 that conforms to the surface profile of the inner surface 214 of the outsole 210 when the casing 300 is compressed between the mold portions 82, 84. Likewise, the lower mold portion 84 may include a contact surface 88 having a surface profile that imparts a shape to the casing 300 that conforms to the surface profile of the bottom surface 222 of the midsole 220 when the casing 300 is compressed between the mold portions 82, 84. In some examples, the lower mold portion 84 is fixed and the upper mold portion 82 translates toward the lower mold portion 84 to close the mold 80 and thereby compress the casing 300 therebetween. In other examples, the lower mold portion 84 and the upper mold portion 82 may each translate toward one another or only the lower mold portion 84 may translate toward the upper mold portion 82.

FIG. 18 shows the mold 80 open and the casing 300 coated with the liquid elastomeric material 310 positioned between the upper mold portion 82 and the lower mold portion 84. The mold 80 may close by translating the upper mold portion 82 toward the lower mold portion 84. FIG. 19 shows the mold 80 closed and the casing 300 compressed between the upper mold portion 82 and the lower mold portion 84. While compressed, heat may additionally be applied to the casing 300 via the mold 80 to cure or harden the elastomeric material 310. Here, the casing 300 may be formed to its desired shape and the elastomeric material 310 disposed on the casing 300 and extending into the casing 300 hardens. FIG. 20 shows the mold 80 opening as the upper mold portion 82 translates away from the lower mold portion 84 and/or the lower mold portion 84 translates away from the upper mold portion 82. The casing 300 is formed to its desired shape and the hardened elastomeric material 310 provides the casing 300 with a flexible outer skin that encapsulates the casing 300.

Figure 21:
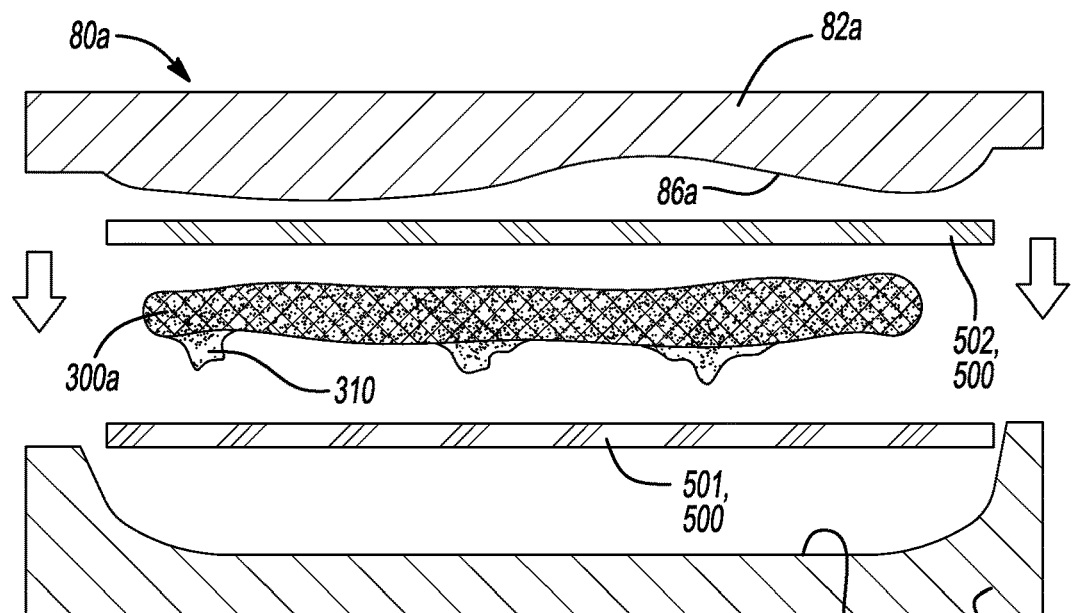
FIG. 21 is a schematic view of a mold showing first and second layers of a cushioning material and a casing positioned between an upper mold portion of the mold and a lower mold portion of the mold when the mold is open in accordance with principles of the present disclosure.
Figure 22:
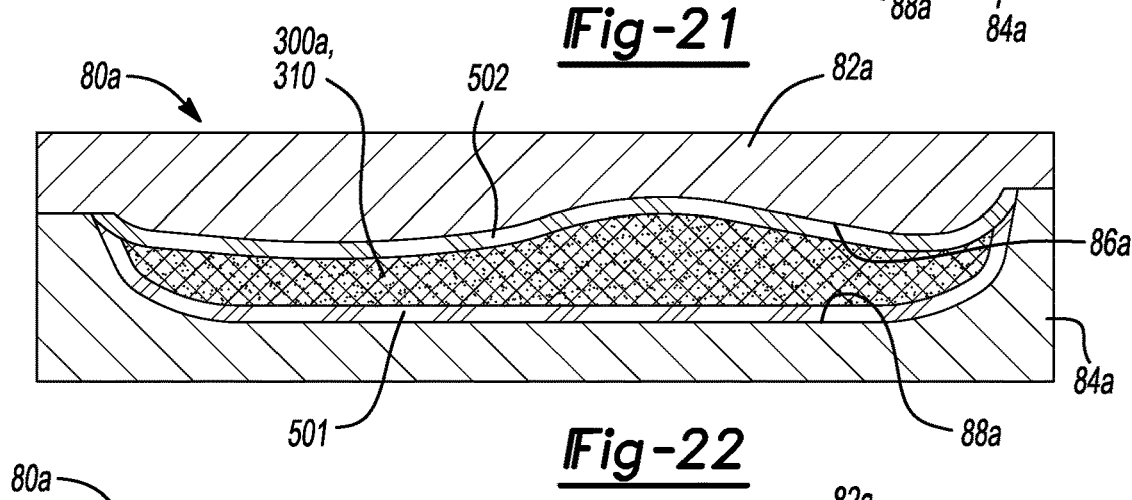
FIG. 22 is a schematic view of the mold of FIG. 21 showing the first and second layers of the cushioning material and the casing positioned between the upper mold portion and the lower mold portion when the mold is closed.
Figure 23:
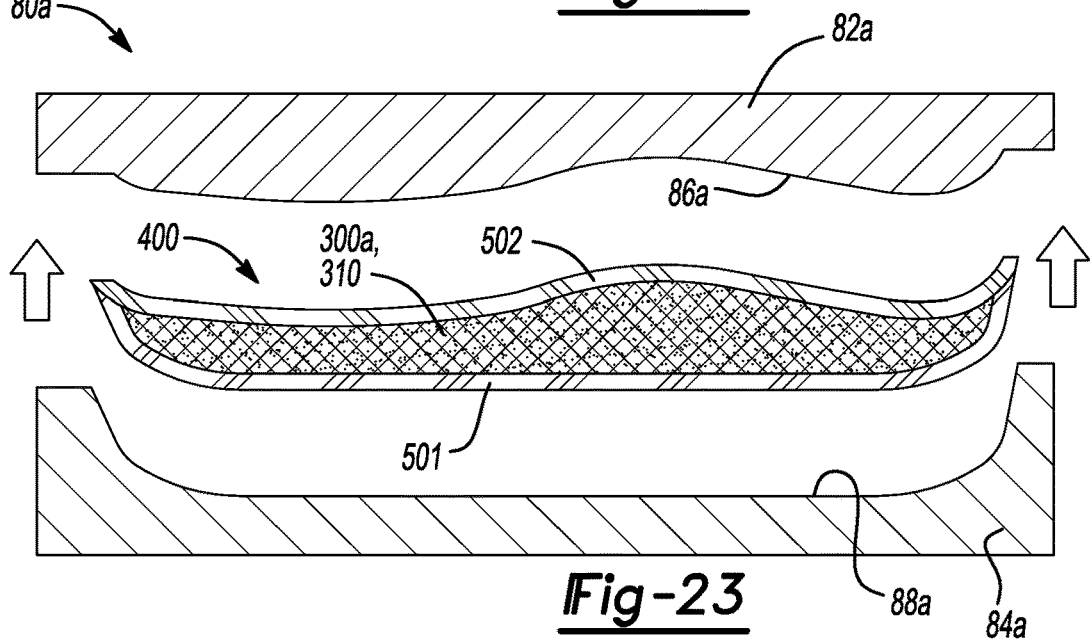
FIG. 23 is a schematic view of the mold of FIG. 21 showing the mold open and the first and second layers of the cushioning material adhering to the casing to form a cushioning member that includes a shape imparted by the upper mold portion and the lower mold portion.

Referring to FIGS. 21-23, a mold 80a is provided and includes an upper mold portion 82a and a lower mold portion 84a that compress and mold the cushioning member 400 of the article of footwear 10a of FIGS. 5-8 to conform to the surface profiles of the inner surface 214a of the outsole 210a and the bottom surface 222a of the midsole 220a. As discussed above, the cushioning member 400 includes the casing 300a encapsulated within the cushioning material 500. The cushioning material 500 may include the first layer 501 (e.g., bottom surface) and the second layer 502 (e.g., top surface). The lower mold portion 84a may include a contact surface 88a having a surface profile that imparts a shape to the second layer 502 that conforms to the surface profile of the bottom surface 222a of the midsole 220a when the layers 501, 502 and the casing 300a are compressed between the mold portions 82a, 84a. Likewise, the upper mold portion 82a may include a contact surface 86a having a surface profile that imparts a shape to the first layer 501 that conforms to the surface profile of the inner surface 214a of the outsole 210a when the layers 501, 502 and the casing 300a are compressed between the mold portions 82a, 84a. In some examples, the lower mold portion 84a is fixed and the upper mold portion 82a translates toward the lower mold portion 84a to close the mold 80a and thereby compress the layers 501, 502 and the casing 300a therebetween. In other examples, the lower mold portion 84a and the upper mold portion 82a may each translate toward one another or only the lower mold portion 84a may translate toward the upper mold portion 82a.

FIG. 21 shows the mold 80a open with the first layer 501 of the cushioning material 500, the casing 300a coated with the elastomeric material 310, and the second layer 502 of the cushioning material 500 positioned between the upper mold portion 82a and the lower mold portion 84a. The first layer 501 may oppose the contact surface 88a associated with the lower mold portion 84a and the second layer 502 may oppose the contact surface 86a associated with the upper mold portion 82a. The casing 300a may be disposed between the first layer 501 and the second layer 502. FIG. 22 shows the mold 80a closed and the layers 501, 502 of the cushioning material 500 and the casing 300a compressed between the upper mold portion 82a and the lower mold portion 84a. Here, the layers 501, 502 are compressed into the material of the casing 300a and may adhere to the elastomeric material 310 disposed on surfaces of the casing 300a when the elastomeric material 310 hardens under heat and compression. Accordingly, the layers 501, 502 may cooperate to surround and form the cushioning material 500 that encapsulates the casing 300a. FIG. 23 shows the mold 80a opening as the upper mold portion 82a translates away from the lower mold portion 84a and/or the lower mold portion 84a translates away from the upper mold portion 82a. The cushioning material 500 may adhere to the elastomeric material 310 and encapsulate the casing 300a to thereby form the cushioning member 400 that conforms to the surface profiles of the inner surface 214a of the outsole 210a and the bottom surface 222a of the midsole 220a. Accordingly, the cushioning material 500 may provide resilient compressibility for the article of footwear 10a to attenuate ground-reaction forces.

Figure 24:
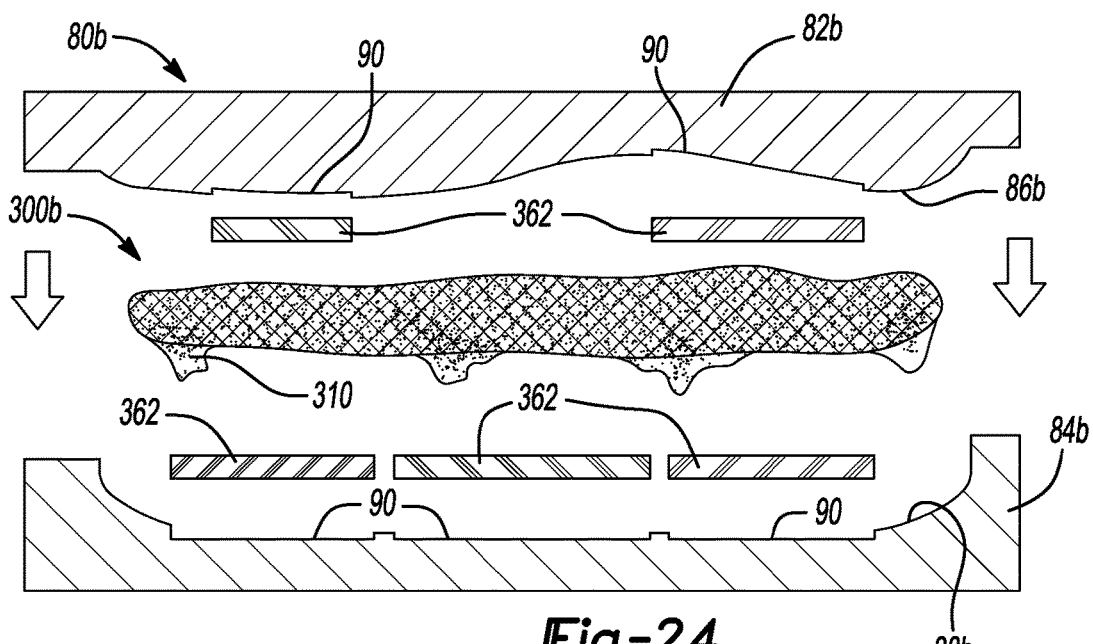
FIG. 24 is a schematic view of a mold showing foam segments and a casing positioned between an upper mold portion of the mold and a lower mold portion of the mold when the mold is open in accordance with principles of the present disclosure.
Figure 25:
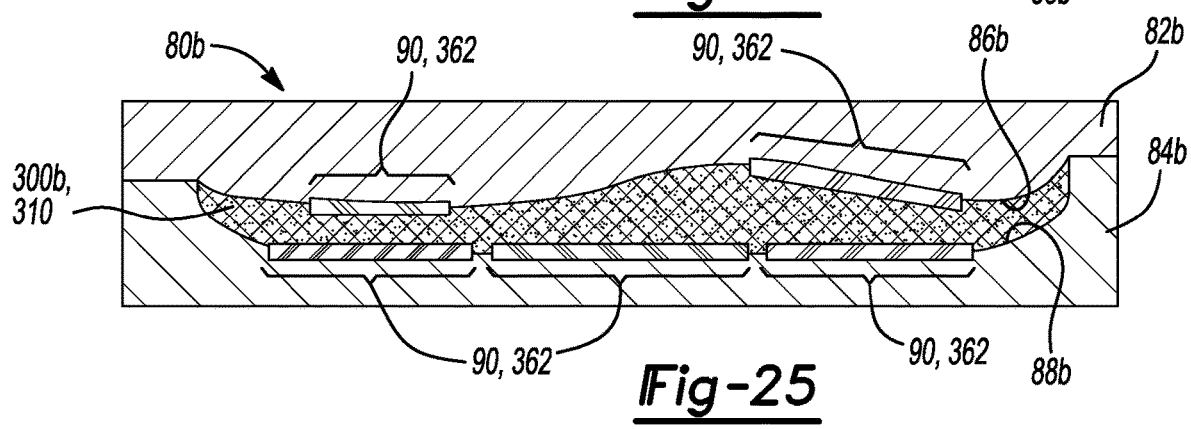
FIG. 25 is a schematic view of the mold of FIG. 24 showing the foam segments and the casing positioned between the upper mold portion and the lower mold portion when the mold is closed.
Figure 26:
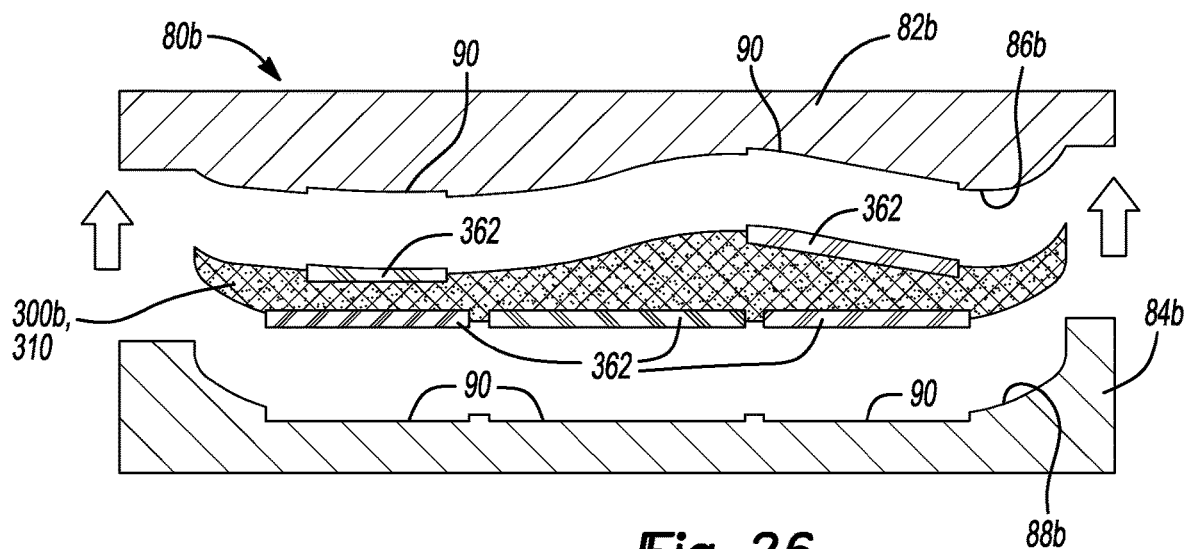
FIG. 26 is a schematic view of the mold of FIG. 24 showing the mold open and the foam segments adhered to the casing that includes a shape imparted by the upper mold portion and the lower mold portion.

Referring to FIGS. 24-26, a mold 80b is provided and includes an upper mold portion 82b and a lower mold portion 84b that compress and mold the casing 300b of the article of footwear 10b of FIGS. 9-11 to conform to the surface profiles of the inner surface 214b of the outsole 210b and the bottom surface 222b of the midsole 220b. The upper mold portion 82b may include a contact surface 86b having a surface profile that imparts a shape to the casing 300b that conforms to the surface profile of the bottom surface 222b of the midsole 220b when the casing 300b and the first foam segments 362 are compressed between the mold portions 82b, 84b. Likewise, the lower mold portion 84b may include a contact surface 88b having a surface profile that imparts a shape to the casing 300b that conforms to the surface profile of the inner surface 214b of the outsole 210b when the casing 300b and the first foam segments 362 are compressed between the mold portions 82b, 84b. At least one of the contact surfaces 86b, 88b may optionally include one or more indentations 90 disposed in areas that apply pressure (e.g., compressive force) to corresponding ones of the first foam segments 362 when the mold portions 82b, 84b contact the casing 300b. The indentations 90 may be sized and shaped to matingly receive the respective first foam segments 362 therein.

In some examples, the lower mold portion 84b is fixed and the upper mold portion 82b translates toward the lower mold portion 84a to close the mold 80a and thereby compress the casing 300b and the first foam segments 362 therebetween. In other examples, the lower mold portion 84b and the upper mold portion 82b may each translate toward one another or only the lower mold portion 84b may translate toward the upper mold portion 82b.

FIG. 24 shows the mold 80b open with the casing 300a coated with the elastomeric material 310 and the first foam segments 362 positioned between the upper mold portion 82b and the lower mold portion 84b. Three of the first foam segments 362 may oppose the contact surface 88b associated with the lower mold portion 84b and two of the first foam segments 362 may oppose the contact surface 86b associated with the upper mold portion 82b. The casing 300b may oppose the first foam segments 362 associated with the upper mold portion 82b and the first foam segments 362 associated with the lower mold portion 84b. FIG. 25 shows the mold 80b closed to compress the first foam segments 362 and the casing 300b between the upper mold portion 82b and the lower mold portion 84b. Here, the first foam segments 362 are compressed into the material of the casing 300a and may adhere to the elastomeric material 310 disposed on surfaces of the casing 300a when the elastomeric material 310 hardens via pressure and/or heat applied thereto via the mold 80b.

In some examples, the optional indentations 90 disposed along at least one of the contact surfaces 86b, 88b may vary the pressure when the first foam segments 362 compress into the material of the casing 300b. For example, an indentation 90 that fully receives the thickness of the first foam segments 362 applies little pressure during molding while a relatively shallow indentation 90 that receives only a portion of the first foam segments 362 applies greater pressure during molding. The depths of the indentations 90 may vary at one or both of the contact surfaces 86b, 88b to individually control the amount of pressure applied to each foam segment 362 and, thus, the degree to which the respective foam segments 362 extend into the casing 300b.

FIG. 26 shows the mold 80b opening as the upper mold portion 82b translates away from the lower mold portion 84b and/or the lower mold portion 84b translates away from the upper mold portion 82b. Accordingly, the casing 300b may be molded to conform to the surface profiles of the inner surface 214b of the outsole 210b and the bottom surface 222b of the midsole 220b and the first foam segments 362 may adhere to the elastomeric material 310 to thereby attach to the exterior of the casing 300b.

Referring to FIGS. 27-30, a mold 80*d* is provided and includes an upper mold portion 82*d* and a lower mold portion 84*d* that compress and mold a casing 300*d* that may be inserted within the cavity 240 of the article of footwear 10 of FIGS. 1-4 in place of the casing 300 to conform to the surface profiles of the inner surface 214 of the outsole 210 and the bottom surface 222 of the midsole 220. The upper mold portion 82*d* may include a contact surface 86*d* having a surface profile that imparts a shape to the casing 300*d* that conforms to the surface profile of the bottom surface 222 of the midsole 220 when the casing 300*d* is compressed between the mold portions 82*d*, 84*d*. Likewise, the lower mold portion 84*d* may include a contact surface 88*d* having a surface profile that imparts a shape to the casing 300*d* that conforms to the surface profile of the inner surface 214 of the outsole 210 when the casing 300*d* is compressed between the mold portions 82*d*, 84*d*. In some examples, the lower mold portion 84*d* is fixed and the upper mold portion 82*d* translates toward the lower mold portion 84*d* to close the mold 80*d* and thereby compress the casing 300*d* therebetween. In other examples, the lower mold portion 84*d* and the upper mold portion 82*d* may each translate toward one another or only the lower mold portion 84*d* may translate toward the upper mold portion 82*d*.

Figure 27:
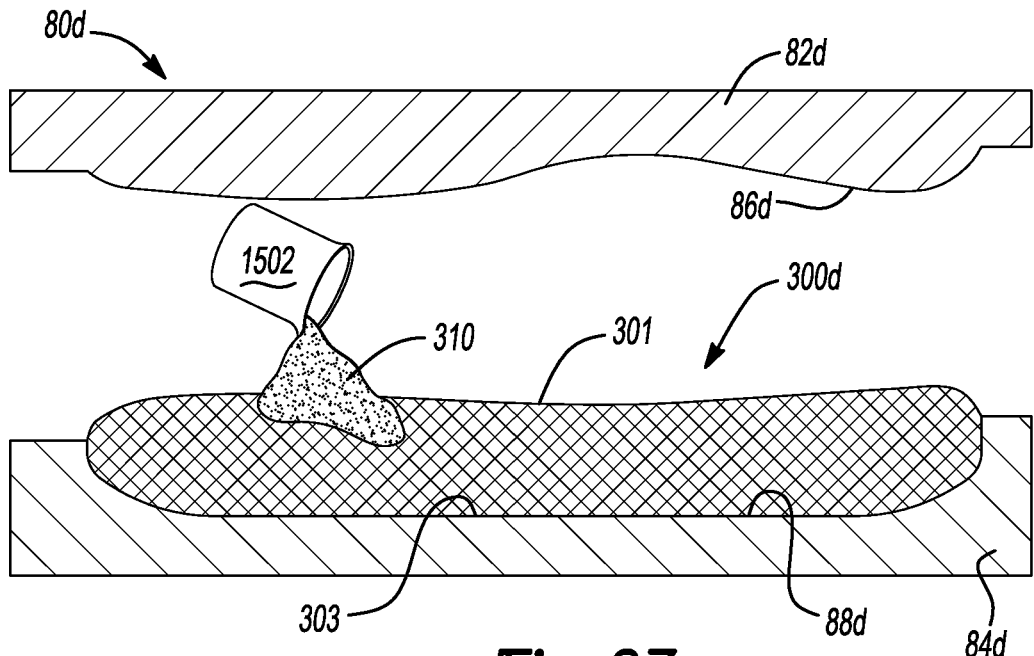
FIG. 27 is a schematic view of a mold showing a casing containing particulate matter positioned on a lower portion of the mold below an upper portion of the mold with an elastomeric material being applied to an exposed surface of the casing when the mold is open.

FIG. 27 shows the mold 80*d* open and the casing 300*d* disposed on the contact surface 88*d* of the lower mold portion 84*d*. A top surface 301 of the casing 300*d* which will conform to the surface profile of the bottom surface 222 of the midsole 220 when the casing 300*d* is compressed between the mold portions 82*d*, 84*d*, is coated with the elastomeric material 310. On the other hand, a bottom surface 303 of the casing 300*d*, while in contact with the contact surface 88*d* of the lower mold portion 84*d*, is not coated with the elastomeric material 310. The bottom surface 303 of the casing 300*d* conforms to the surface profile of the inner surface 214 of the outsole 210 when the casing 300*d* is compressed between the mold portions 82*d*, 84*d*. In some examples, the vat 1502 is filled with the liquid elastomeric material 310 and is used to pour the liquid elastomeric material 310 over the top surface 301 of the casing 300*d*. Additionally or alternatively, a brush (not shown) and/or spray device (not shown) may be used to apply the liquid elastomeric material 310 to the top surface 301 of the casing 300*d*. In some examples, the contact surface 86*d* of the upper mold portion 82*d* may be coated with the elastomeric material 310 and, thereafter, may apply the elastomeric material 310 to the top surface 301 of the casing 300*d* when the casing 300*d* is compressed between the mold portions 82*d*, 84*d*.

Figure 28:
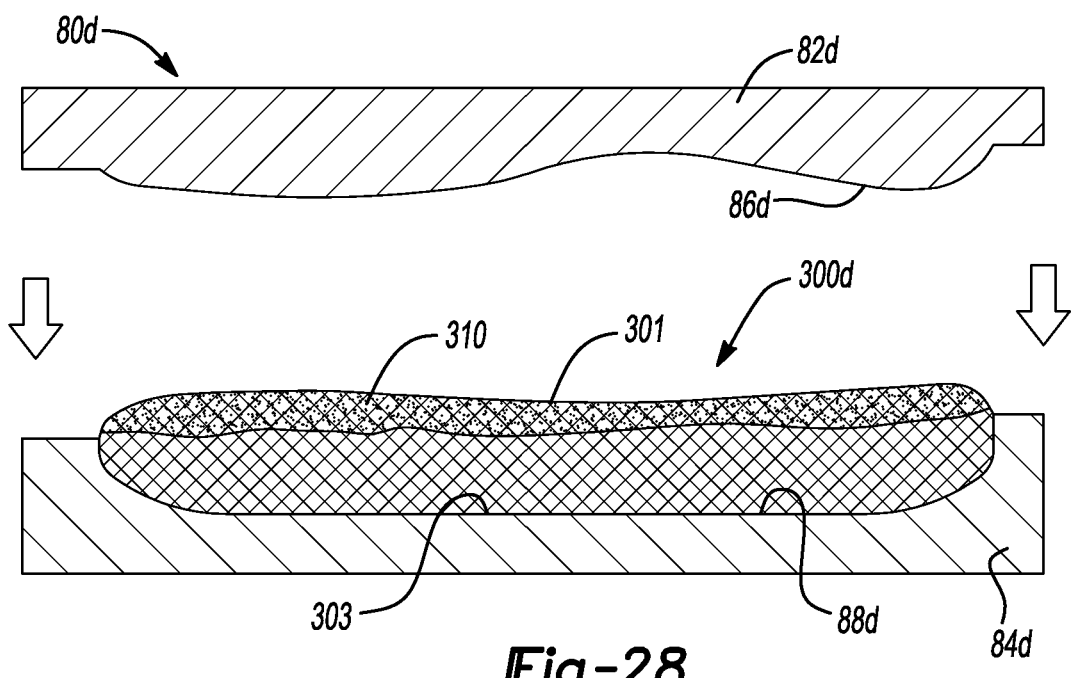
FIG. 28 is a schematic view of the mold of FIG. 27 showing the exposed surface of the casing coated with the elastomeric material while positioned on the lower portion of the mold when the mold is open.
Figure 29:
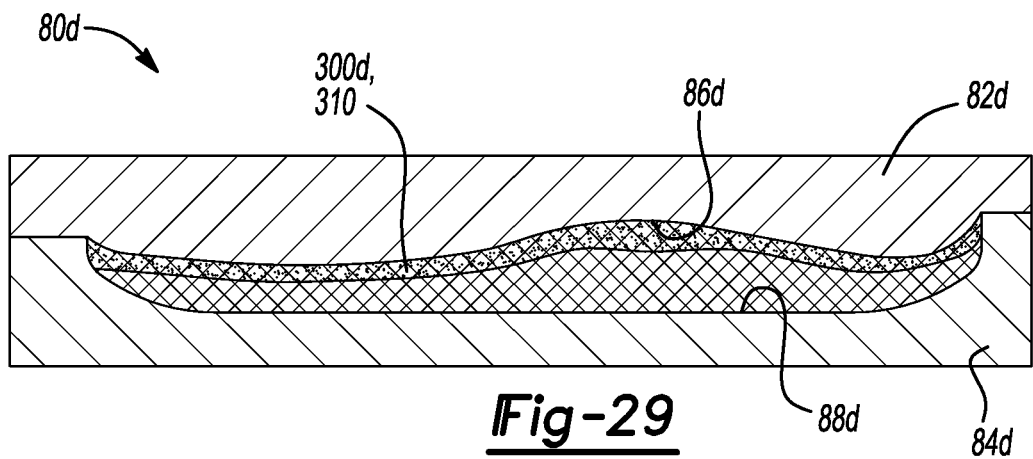
FIG. 29 is a schematic view of the mold of FIG. 27 showing the elastomeric material and the casing positioned between the upper mold portion and the lower mold portion when the mold is closed.
Figure 30:
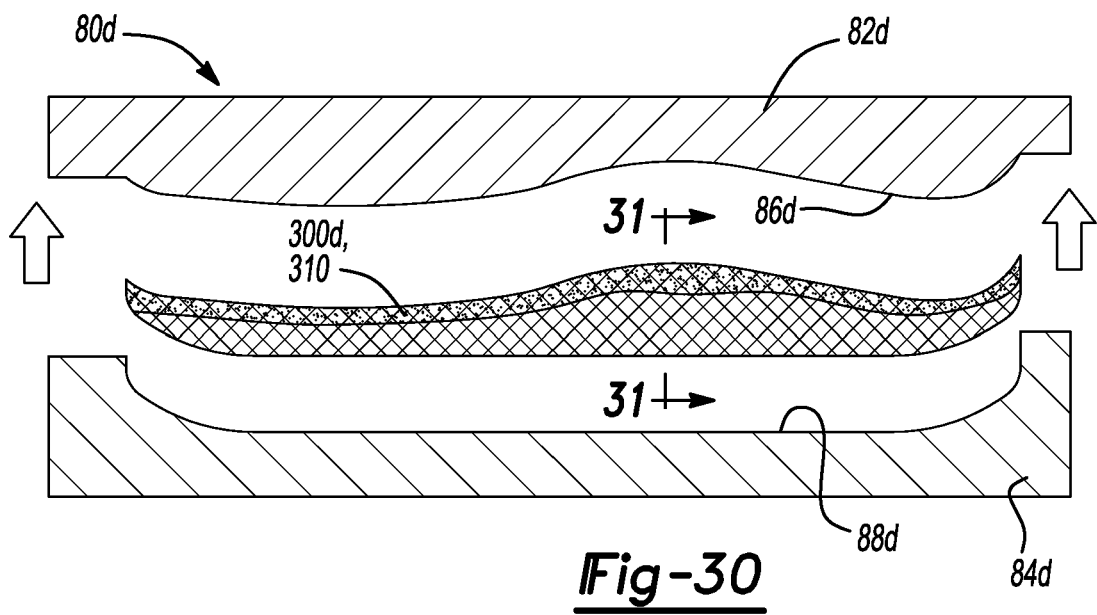
FIG. 30 is a schematic view of the mold of FIG. 27 showing the mold open and the elastomeric material adhered to the surface of the casing that includes a shape imparted by the upper mold portion and the lower mold portion.

FIG. 28 shows the mold 80*d* open and the top surface 301 of the casing 300*d* coated with the liquid elastomeric material 310 while the bottom surface 303 is disposed on the contact surface 88*d* of the lower mold portion 84*d*. FIG. 29 shows the mold 80*d* closed and the casing 300*d* compressed between the upper mold portion 82*d* and the lower mold portion 84*d*. While compressed, heat may additionally be applied to the casing 300*d* via the mold 80*d* to cure or harden the elastomeric material 310. Here, the casing 300*d* may be formed to its desired shape and the elastomeric material 310 disposed on the top surface 301 of the casing 300*d* and extending into the casing 300*d* hardens. FIG. 30 shows the mold 80*d* opening as the upper mold portion 82*d* translates away from the lower mold portion 84*d* and/or the lower mold portion 84*d* translates away from the upper mold portion 82*d*. The casing 300*d* is formed to its desired shape and the hardened elastomeric material 310 provides the casing 300*d* with a flexible outer skin on the top surface 301 of the casing 300*d*.

Figure 31:
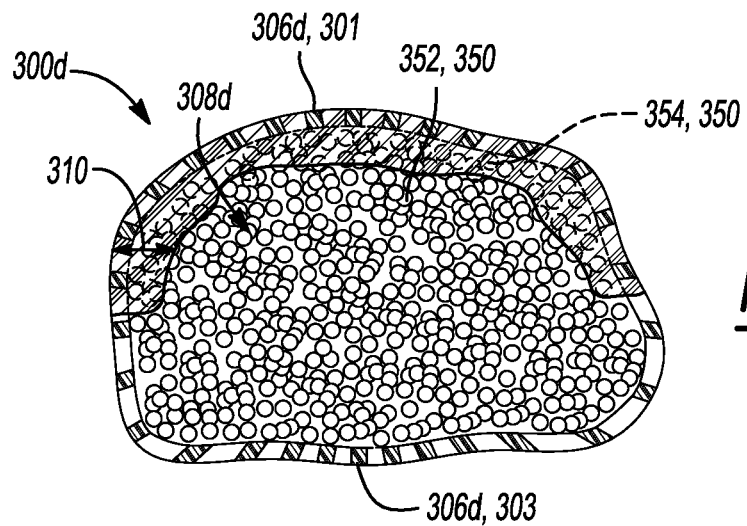
FIG. 31 shows a schematic view taken along line 31-31 of FIG. 30 showing a first quantity of the particulate matter movable relative to the casing and a second quantity of the particulate matter adhered to the elastomeric material that extends into the casing proximate to a top surface of the casing.

FIG. 31 provides a cross-sectional view taken along line 31-31 of FIG. 30 showing the elastomeric material 310 disposed on an exterior surface 306*d* at the top surface 301 of the casing 300*d* and partially extending into an interior void 308*d*. The casing 300*d* may be inserted into the cavity 240 of the sole structure 200 of FIGS. 1-4 in place of the casing 300. Where the casing 300 of FIGS. 1-4 is entirely encapsulated by the elastomeric material 310, FIG. 31 shows the elastomeric material 310 adhered to the top surface 301 of the casing 300*d*, while the bottom surface 303 of the casing 300*d* is not coated by the elastomeric material 310. Here, the second quantity 354 of particulate matter 350 that resides within outer regions of the interior void 308*d* proximate to the top surface 301 of the casing 300*c*, is in contact with the liquid elastomeric material 310 and will become attached to the casing 300*d* at the top surface 301 by adhering to the elastomeric material 310 when the elastomeric material 310 hardens. The first quantity 352 of particulate matter 350 that resides within the interior void 308*d* proximate to the bottom surface 303 of the casing 300*d*, however, is not exposed to the liquid elastomeric material 310, and is therefore permitted to move relative to the casing 300*d*. Thus, the first quantity 352 of particulate matter 350 is permitted to move relative to the casing 300*d* near the bottom surface 303 that is conformed to the surface profile of the inner surface 214 of the outsole 210. As discussed above, the midsole 220 may be formed from a flexible material to provide the midsole 220 with sufficient flexibility, thereby allowing the first quantity 352 of particulate matter 350 disposed proximate to the top surface 301 of the formed casing 300*d* to interact with the profile of the bottom surface of a foot during gradient loading of the sole structure 200.

Referring to FIGS. 32-35, a mold 80*e* is provided and includes an upper mold portion 82*e* and a lower mold portion 84*e* that compress and mold a casing 300*e* that may be inserted within the cavity 240 of the article of footwear 10 of FIGS. 1-4 in place of the casing 300 to conform to the surface profiles of the inner surface 214 of the outsole 210 and the bottom surface 222 of the midsole 220. The upper mold portion 82*e* may include a contact surface 86*e* having a surface profile that imparts a shape to the casing 300*e* that conforms to the surface profile of the inner surface 214 of the outsole 210 when the casing 300*e* is compressed between the mold portions 82*e*, 84*e*. Likewise, the lower mold portion 84*d* may include a contact surface 88*e* having a surface profile that imparts a shape to the casing 300*e* that conforms to the surface profile of the bottom surface 222 of the midsole 220 when the casing 300*e* is compressed between the mold portions 82*e*, 84*e*. In some examples, the lower mold portion 84*e* is fixed and the upper mold portion 82*e* translates toward the lower mold portion 84*e* to close the mold 80*e* and thereby compress the casing 300*e* therebetween. In other examples, the lower mold portion 84*e* and the upper mold portion 82*e* may each translate toward one another or only the lower mold portion 84*e* may translate toward the upper mold portion 82*e*.

Figure 32:
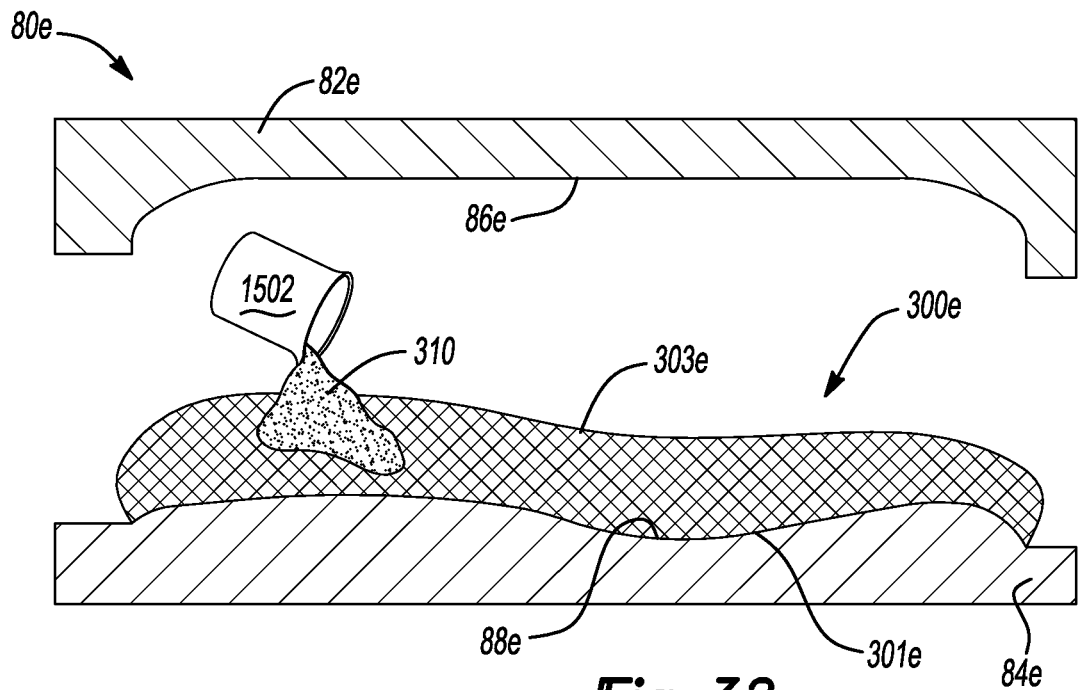
FIG. 32 is a schematic view of a mold showing a casing containing particulate matter positioned on a lower portion of the mold below an upper portion of the mold with an elastomeric material being applied to an exposed surface of the casing when the mold is open.

FIG. 32 shows the mold 80*e* open and the casing 300*e* disposed on the contact surface 88*e* of the lower mold portion 84*e*. A bottom surface 303*e* of the casing 300*e* which will conform to the surface profile of the inner surface 214 of the outsole when the casing 300*e* is compressed between the mold portions 82*e*, 84*e*, is coated with elastomeric material. On the other hand, a top surface 301*e* of the casing, while in contact with the contact surface 88e of the lower mold portion 84e, is not coated with elastomeric material 310. The top surface 301e of the casing 300e conforms to the surface profile of the inner surface 214 of the outsole 210 when the casing 300d is compressed between the mold portions 82e, 84e. In some examples, the vat 1502 is filled with the liquid elastomeric material 310 and is used to pour the liquid elastomeric material 310 over the bottom surface 303e of the casing 300e. Additionally or alternatively, a brush (not shown) and/or spray device (not shown) may be used to apply the liquid elastomeric material 310 to the bottom surface 303e of the casing 300e. In some examples, the contact surface 86e of the upper mold portion 82e may be coated with the elastomeric material 310 and, thereafter, may apply the elastomeric material 310 to the bottom surface 303e of the casing 300e when the casing 300e is compressed between the mold portions 82e, 84e.

Figure 33:
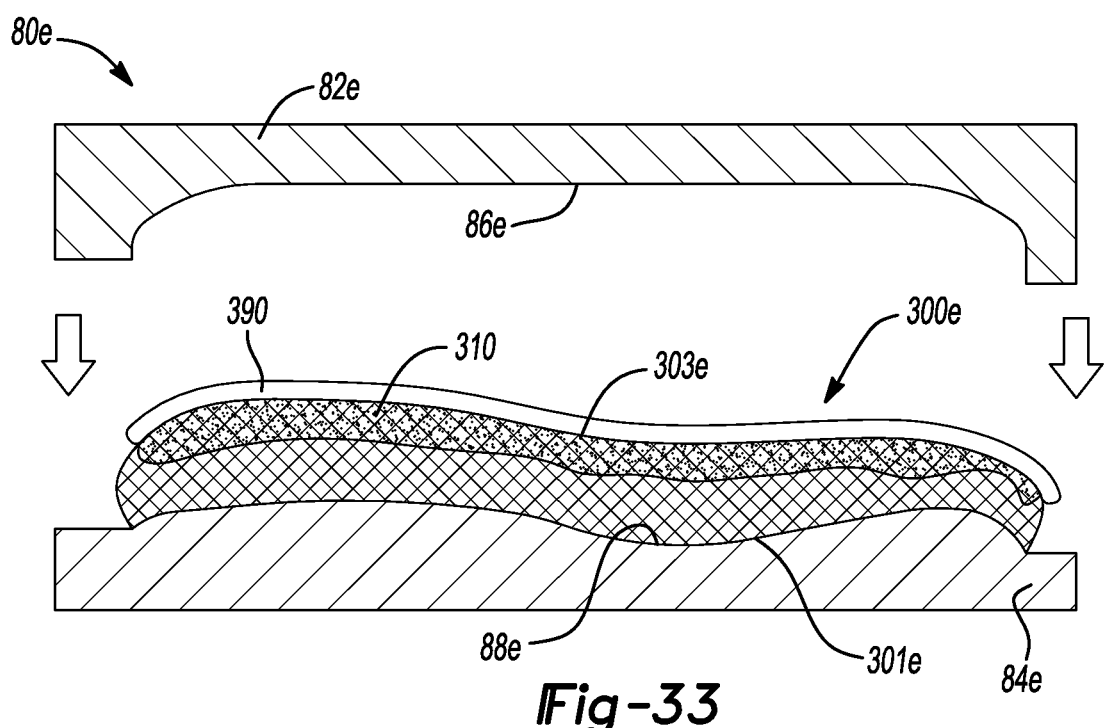
FIG. 33 is a schematic view of the mold of FIG. 32 showing the exposed surface of the casing coated with the elastomeric material while positioned on the lower portion of the mold when the mold is open.
Figure 34:
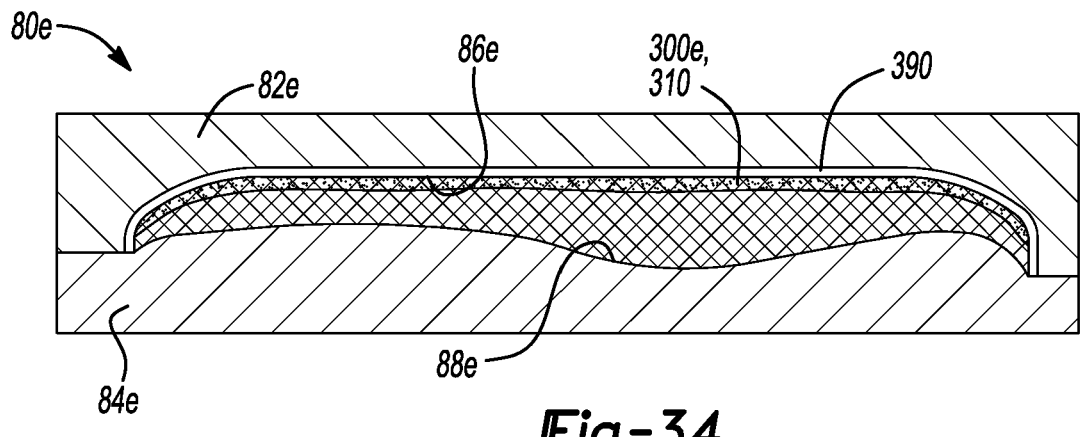
FIG. 34 is a schematic view of the mold of FIG. 32 showing the elastomeric material and the casing positioned between the upper mold portion and the lower mold portion when the mold is closed.
Figure 35:
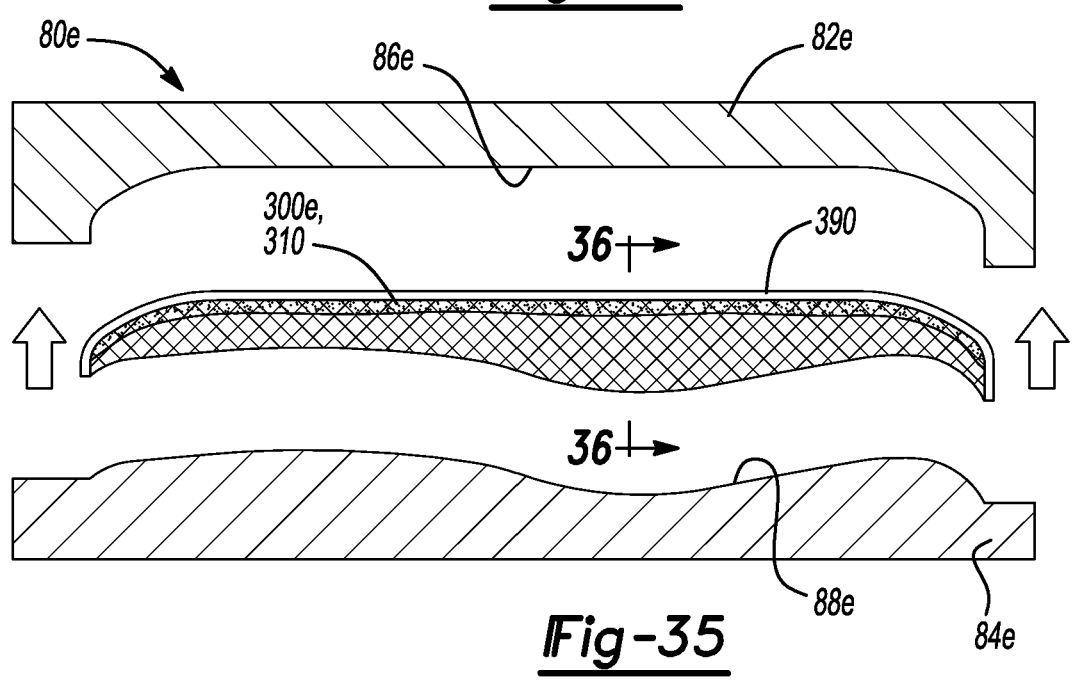
FIG. 35 is a schematic view of the mold of FIG. 32 showing the mold open and the elastomeric material adhered to the surface of the casing that includes a shape imparted by the upper mold portion and the lower mold portion.

FIG. 33 shows the mold 80e open and the bottom surface 303e of the casing 300e coated with the liquid elastomeric material 310 while the top surface 301e is disposed on the contact surface 88e of the lower mold portion 84e. A flexible textile membrane 390 may be positioned over the bottom surface 303e of the casing 300e and at least partially overlap the sides of the casing 300e. FIG. 34 shows the mold 80e closed and the casing 300e and the flexible textile membrane 390 compressed between the upper mold portion 82e and the lower mold portion 84e. In other configurations, the flexible textile membrane 390 may be omitted. While compressed, heat may additionally be applied to the casing 300e via the mold 80e to cure or harden the elastomeric material 310. Here, the casing 300e may be formed to its desired shape and the elastomeric material 310 disposed on the bottom surface 303e of the casing 300e and extending into the casing 300e hardens. Additionally, the flexible textile membrane 390 may be joined with the casing 300e by forming a bond 392 (FIG. 36) with the elastomeric material 310 as the elastomeric material hardens. FIG. 35 shows the mold 80e opening as the upper mold portion 82e translates away from the lower mold portion 84e and/or the lower mold portion 84e translates away from the upper mold portion 82e. The casing 300e is formed to its desired shape and the flexible textile membrane 390 bonded with the hardened elastomeric material 310 provides the casing 300e with a flexible outer skin on the bottom surface 303e of the casing 300e.

Figure 36:
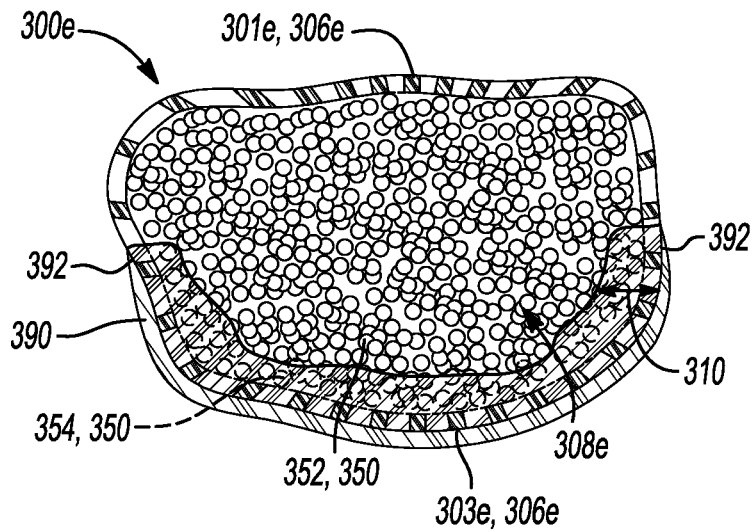
FIG. 36 shows a schematic view taken along line 36-36 of FIG. 35 showing a first quantity of the particulate matter movable relative to the casing and a second quantity of the particulate matter adhered to the elastomeric material that extends into the casing proximate to a bottom surface of the casing.

FIG. 36 provides a cross-sectional view taken along line 36-36 of FIG. 35 showing the elastomeric material 310 disposed on an exterior surface 306e at the bottom surface 303e of the casing 300e and partially extending into an interior void 308e. The casing 300e may be inserted into the cavity 240 of the sole structure 200 of FIGS. 1-4 in place of the casing 300. Where the casing 300 of FIGS. 1-4 is entirely encapsulated by the elastomeric material 310, FIG. 31 shows the elastomeric material 310 adhered to the bottom surface 303e of the casing 300e, while the top surface 301e of the casing 300e is not coated by the elastomeric material 310. Here, the second quantity 354 of particulate matter 350 that resides within outer regions of the interior void 308e proximate to the bottom surface 303e of the casing 300e, is in contact with the liquid elastomeric material 310 and will become attached to the casing 300e at the bottom surface 303e by adhering to the elastomeric material 310 when the elastomeric material 310 hardens. The first quantity 352 of particulate matter 350 that resides within the interior void 308e proximate to the top surface 301e of the casing 300e, however, is not exposed to the liquid elastomeric material 310, and is therefore permitted to move relative to the casing 300e. Thus, the first quantity 352 of particulate matter 350 is permitted to move relative to the casing 300e near the top surface 301e that is conformed to the surface profile of the bottom surface 222 of the midsole 220. As discussed above, the midsole 220 may be formed from a flexible material to provide the midsole 220 with sufficient flexibility, thereby allowing the first quantity 352 of particulate matter 350 disposed proximate to the top surface 301e of the formed casing 300e to interact with the profile of the bottom surface of a foot during gradient loading of the sole structure 200. FIG. 36 shows the bond 392 formed between the flexible textile membrane 390 and the elastomeric material 310 as the elastomeric material 310 hardens to join the flexible textile membrane 390 with the bottom surface 303e and a portion of the sides of the casing 303e. The flexible textile membrane 390 may impart additional protection for the casing 300e without losing flexibility thereof.

Figure 37:
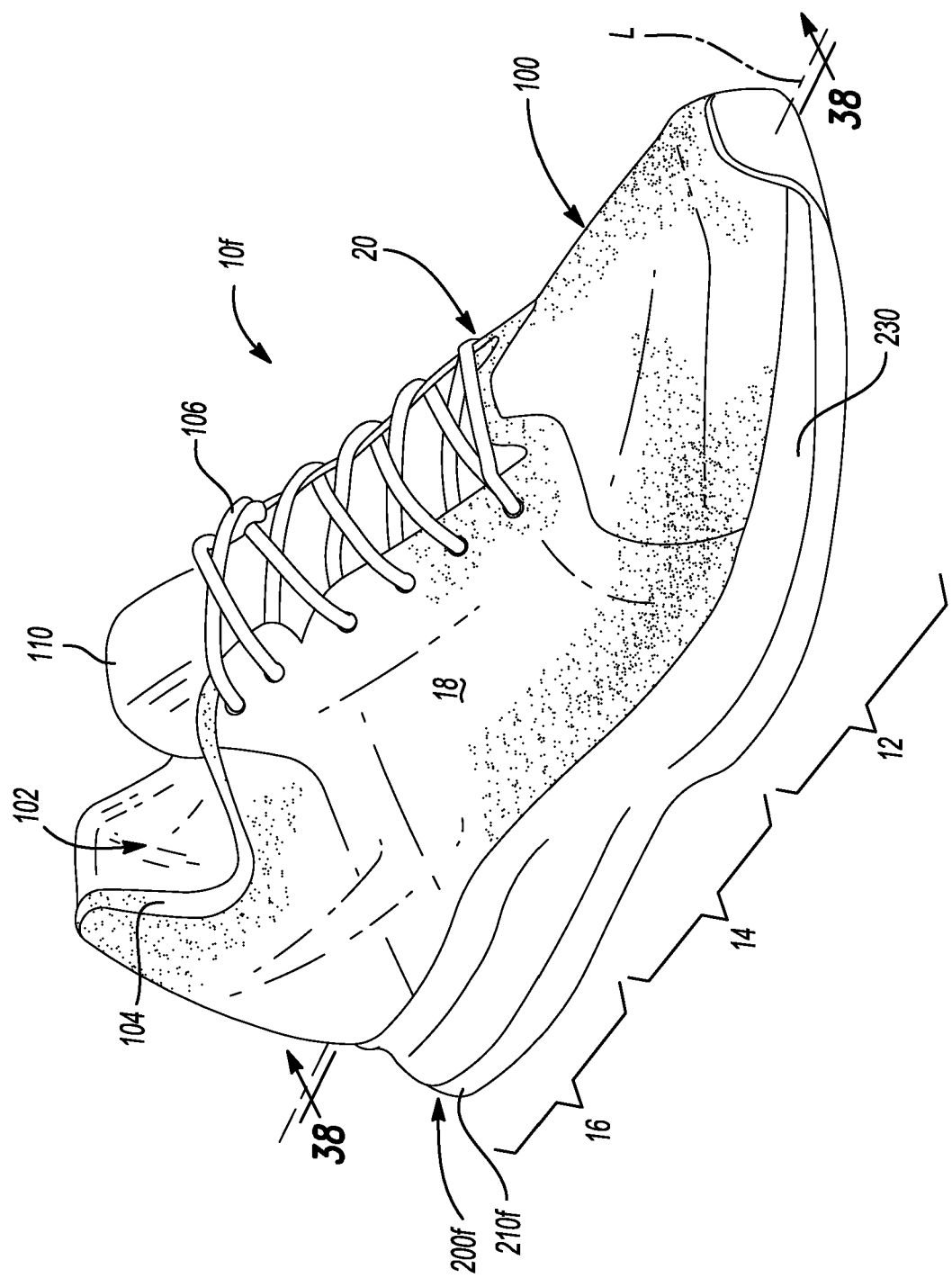
FIG. 37 is a top perspective view of an article of footwear in accordance with principles of the present disclosure.
Figure 38:
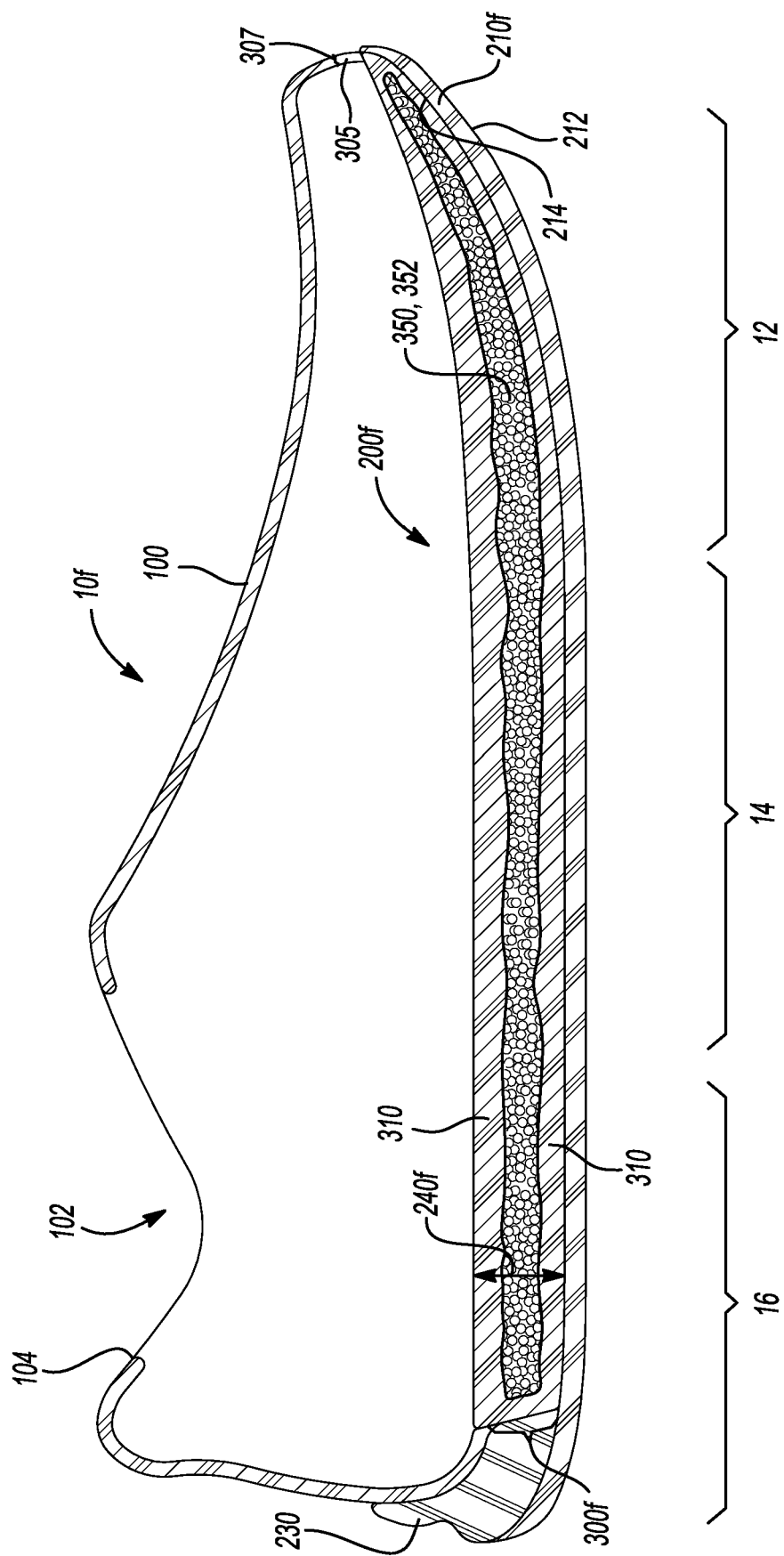
FIG. 38 is a cross-sectional view taken along line 38-38 of FIG. 37 showing a sole structure without a midsole and a casing containing particulate matter disposed on an inner surface of an outsole.

With reference to FIGS. 37 and 38, an article of footwear 10f is provided and includes an upper 100 and a sole structure 200f attached to the upper 100. In view of the substantial similarity in structure and function of the components associated with the article of footwear 10 with respect to the article of footwear 10f, like reference numerals are used hereinafter and in the drawings to identify like components while like reference numerals containing letter extensions are used to identify those components that have been modified.

The sole structure 200f may include an outsole 210f attached to the upper 100 and the sidewall 230 extending from the perimeter of the outsole 210f. The outsole 210f includes the inner surface 214 and the ground-engaging surface 212 disposed on an opposite side of the outsole than the inner surface 214. While the article of footwear 10e is similar to the article of footwear 10 of FIGS. 1-4 in some regards, the article of footwear 10e does not include a midsole. Instead, a cavity 240f is bounded by the inner surface of the sidewall 230 and the inner surface 214 of the outsole 210f. In some configurations, a casing 300f that contains particulate matter 350 to provide cushioning for the foot during use of the footwear 10e, is disposed within the cavity 240f and is supported on the inner surface 214.

Referring to FIG. 38, a schematic view taken along line 38-38 of FIG. 37 shows the casing 300f disposed on the inner surface 214 of the outsole 210f. Compared to the depth of the cavity 240 of the sole structure 200 of FIGS. 1-4, the cavity 240f of the sole structure 200f may include a greater depth, as the midsole 220 or strobel is absent. The casing 300f may be formed from a flexible and porous material. For example, the casing 300f may be formed from the mesh material and/or the nylon material that form the casing 300 of FIGS. 1-4. In a similar fashion as described above with respect to FIGS. 1-4, the elastomeric material 310 may be applied to surfaces of the casing 300f to provide the casing 300f with a flexible outer skin that encapsulates the casing 300f. Here, the flexible outer skin of the casing 300f allows the casing 300f to correspond to a flexible midsole or strobel disposed between the outsole 210f and the bottom surface of the foot.

In some implementations, the casing 300f may include one or more edges 305 for use in attaching the casing 300f to the upper 100. For example, FIG. 38 shows the edge 305 extending from the casing 300f proximate to the forefoot portion 12 of the article of footwear 10f and fastening to the upper 100 via stitching 307. In some examples, the elastomeric material 310 is not applied to surfaces of the casing 300f that oppose the bottom surface of a foot such that the first quantity 352 of particulate matter 350 is permitted to move relative to the casing 300f, thereby allowing the first quantity 352 of particulate matter 350 to directly interact with the bottom surface of a foot during use of the article of footwear 10e. Additionally or alternatively, the cushioning material 500 of FIGS. 5-8 may at least partially encapsulate the casing 300f. For example, at least one of the bottom portion 501 or the top portion 502 of the cushioning material 500 may be applied to surfaces of the casing 300f by adhering with the elastomeric material 310 during a molding process (e.g. FIGS. 21-24). For example, the casing 300f may receive the top portion 502 of the cushioning material 500 to provide the casing 300f with a foot-receiving surface that directly receives the bottom surface of a foot during use of the article of footwear 10f.

With reference to FIGS. 39-41, an article of footwear 10g is provided and includes an upper 100 and a sole structure 200g attached to the upper 100. In view of the substantial similarity in structure and function of the components associated with the article of footwear 10 with respect to the article of footwear 10g, like reference numerals are used hereinafter and in the drawings to identify like components while like reference numerals containing letter extensions are used to identify those components that have been modified.

The sole structure 200f may include an outsole 210g and a midsole 220g arranged in the layered configuration. The sidewall 230 may surround the perimeter of the outsole 210g and may separate the outsole 210g and the midsole 220g to define a cavity 240g therebetween. The outsole 210g includes an inner surface 214g disposed on an opposite side of the outsole 210g than the ground-engaging surface 212. The midsole 220g includes a bottom surface 222g disposed on an opposite side of the midsole 220g than the footbed 224. The bottom surface 222g opposes the inner surface 214g and the sidewall 230 may separate the bottom surface 222g and the inner surface 214g to define a depth of the cavity 240g.

In some configurations, the cavity 240g receives a first casing 300g and a second casing 700 each containing particulate matter 350. FIG. 40 provides an exploded view of the article of footwear 10g showing the first casing 300f defining a length extending through the forefoot portion 12 and a portion of the mid-foot portion 14 of the outsole 200g between a first end 302g and a second end 304g. The second casing 700 opposes the first casing 300g and defines a length extending through the heel portion 16 and a portion of the mid-foot portion 14 of the outsole 200g between a first end 702 and a second end 704 opposing the first end 302g of the first casing 300g. The casings 300g, 700 may be formed from a flexible and porous material. For example, the casings 300g, 700 may be formed from the mesh material and/or the nylon material that form the casing 300 of FIGS. 1-4. In a similar fashion as described above with respect to the casing 300e of FIGS. 32-36, the elastomeric material 310 (FIG. 41) may be applied to surfaces of the casings 300g, 700 that contact the inner surface 214g of the outsole 210g while surfaces opposing the bottom surface 222g of the midsole 220g are not coated with the elastomeric material 310.

Referring to FIG. 41, a cross-sectional view taken along line 41-41 of FIG. 39 shows the casings 300g, 700 each containing the particulate matter 350 and received within the cavity 240g between the outsole 210g and the midsole 220g. FIG. 41 shows the first casing 300g having an exterior surface 306g opposing the inner surface 214g of the outsole 210g and the bottom surface 222g of the midsole 220g, as well as the inner periphery surfaces of the side wall 230. Similarly, the second casing 700 includes an exterior surface 706 opposing the inner surface 214g, the bottom surface 222g, and the inner periphery surfaces of the sidewall 230.

FIG. 41 shows the elastomeric material 310 coating and adhering to the exterior surfaces 306g, 706 of the casings 300g, 700 that oppose the inner surface 214g of the outsole 210g, while the elastomeric material 310 is absent from the exterior surfaces 306g, 706 of the casings 300g, 700 that oppose the bottom surface 222g of the midsole 220g. Thus, the elastomeric material 310 may provide a flexible outer skin that encapsulates surfaces of the casings 300g, 700 that oppose the inner surface 214g of the outsole 210f when the elastomeric material 310 hardens.

In some implementations, the elastomeric material 310 is applied as a liquid and hardens during formation of the casings 300g, 700. For example, the casings 300g, 700 may be formed concurrently during a molding process similar to the molding process described above with reference to FIGS. 32-35. The elastomeric material 310 may also affix the first casing 300g and the second casing 700 together when the elastomeric material 310 hardens such that the first casing 300g and the second casing 700 form a single integral member for insertion into the cavity 240g during assembly of the footwear 10g. In other implementations, the elastomeric material 310 may coat and adhere to the entire exterior surfaces 306g, 706 of the casings 300g, 700, such that when the elastomeric material 310 hardens, the elastomeric material 310 provides the flexible outer skin that entirely encapsulates the casings 306g, 706 and affixes the casings 306g, 706 together.

In some scenarios, at least a portion of the elastomeric material 310 applied to the casings 300g, 700 as a liquid, may extend into the casings 300g, 700 and into contact with portions of the particulate matter 350 disposed substantially proximate to the exterior surfaces 306g, 706 of the casings 300g, 706 that oppose the inner surface 214g of the outsole 210g. However, the remaining particulate matter 350 disposed within each of the casings 300g, 706 that is separated from the exterior surfaces 306g, 706 is unexposed to the elastomeric material 310. Accordingly, the first quantity 352 of the particulate matter 350, neither exposed to nor in contact with the elastomeric material 310, is allowed to move relative to the respective casings 300g, 700. Conversely, the second quantity 354 of the particulate matter 350 in contact with the elastomeric material 310, is subsequently adhered to the elastomeric material 310, thereby attaching and affixing the second quantity 354 of particulate matter 350 to the respective casings 300g, 700. Accordingly, in addition to encapsulating surfaces of the casings 300g, 700 that oppose the inner surface 214g of the outsole 210g to provide the casings 300g, 700 with the flexible outer skin, the elastomeric material 310 may adhere to the second quantity 354 of particulate matter 350 and, thus, may attach the second quantity 354 of particulate matter 350 to the respective casings 300g, 700 to prevent the second quantity 354 of particulate matter 350 from migrating throughout the cavity 240g of the sole structure 200g during repeated compressions. Moreover, with the surfaces of the casings 300g, 700 that oppose the bottom surface 222g of the midsole 220g being unexposed to the elastomeric material 310, the first quantity 352 of particulate matter 350 is permitted to move about the respective casings 300g, 700 and, thus, may more closely interact with the bottom surface of the foot so that a level of soft-type cushioning may be dynamically distributed based on a direction and magnitude of the ground-reaction force applied to the sole structure 200g.

The midsole 220g may be formed from the flexible material forming the midsole 220 of FIGS. 1-4 to provide the midsole 220g with sufficient flexibility, thereby allowing the particulate matter 350 residing in the casings 300g, 700 to interact with the profile of the bottom surface of a foot during gradient loading of the sole structure 200g. In some configurations, the midsole 220g, or a portion thereof, may be removed to provide direct contact between the bottom surface of the foot and the exterior surface 306g of the first casing 300g and/or the exterior surface 706 of the second casing 700.

The following Clauses provide an exemplary configuration for the sole structure for an article of footwear described above.

Clause 1: An article of footwear comprising an upper and an outsole attached to the upper and including a ground-engaging surface and an inner surface disposed on an opposite side of the outsole than the ground-engaging surface and a midsole having a footbed and a bottom surface disposed on an opposite side of the midsole than the footbed and opposing the inner surface of the outsole to define a cavity therebetween and a casing received within the cavity and defining an interior void, the interior void containing a first quantity of particulate matter movable relative to the casing and a second quantity of particulate matter attached to the casing.

Clause 2: The article of footwear of Clause 1, wherein the casing is formed from a porous material.

Clause 3: The article of footwear of any of the preceding clauses, wherein the casing is formed from a flexible material.

Clause 4: The article of footwear of any of the preceding clauses, further comprising an elastomeric material disposed on a surface of the casing.

Clause 5: The article of footwear of Clause 4, wherein the elastomeric material is disposed on an exterior surface of the casing.

Clause 6: The article of footwear of Clause 5, wherein at least a portion of the elastomeric material extends into the interior void of the casing.

Clause 7: The article of footwear of Clause 6, wherein the second quantity of particulate matter attaches to the casing by adhering to the elastomeric material.

Clause 8: The article of footwear of Clause 5, wherein the elastomeric material encapsulates the casing.

Clause 9: The article of footwear of Clause 4, further comprising a first foam segment attached to the elastomeric material.

Clause 10: The article of footwear of any of the preceding clauses, further comprising a second foam segment disposed within the interior void of the casing.

Clause 11: The article of footwear of any of the preceding clauses, further comprising at least one divider wall disposed within the interior void and bonded to walls of the casing to define at least two segments each containing at least one of a portion of the first quantity of particulate matter and a portion of the second quantity of particulate matter.

Clause 12: The article of footwear of any of the preceding clauses, wherein the particulate matter includes foam beads.

Clause 13: The article of footwear of Clause 12, wherein the foam beads include at least one of a substantially spherical shape and a substantially polygonal shape.

Clause 14: The article of footwear of Clause 12, wherein the foam beads include approximately the same size and shape.

Clause 15: The article of footwear of Clause 12, wherein the foam beads include at least one of a different size and shape.

Clause 16: The article of footwear of any of the preceding clauses, wherein the casing is molded to conform to surface profiles of the inner surface of the outsole and the bottom surface of the midsole.

Clause 17: The article of footwear of any of the preceding clauses, further comprising a resilient member disposed within the cavity between the casing and the inner surface of the outsole.

Clause 18: An article of footwear comprising an upper and an outsole attached to the upper and including a ground-engaging surface and an inner surface disposed on an opposite side of the outsole than the ground-engaging surface and a midsole having a footbed opposing the upper and a bottom surface disposed on an opposite side of the midsole than the footbed and opposing the inner surface of the outsole to define a cavity therebetween and a casing disposed within an elastomeric material and received within the cavity, the casing including a first portion of particulate matter affixed to the casing by the elastomeric material.

Clause 19: The article of footwear of Clause 17, wherein the particulate matter includes a second portion movable relative to the casing.

Clause 20: The article of footwear of any of the preceding clauses, wherein the casing is formed from a porous material.

Clause 21: The article of footwear of any of the preceding clauses, wherein the casing is formed from a flexible material.

Clause 22: The article of footwear of any of the preceding clauses, wherein the elastomeric material is applied to exterior surfaces of the casing as a liquid.

Clause 23: The article of footwear of Clause 22, wherein at least a portion of the elastomeric material extends into the casing.

Clause 24: The article of footwear of Clause 22, wherein the elastomeric material encapsulates the casing.

Clause 25: The article of footwear of any of the preceding clauses, wherein the particulate matter includes foam beads.

Clause 26: The article of footwear of Clause 25, wherein the foam beads include at least one of a substantially spherical shape and a substantially polygonal shape.

Clause 27: The article of footwear of Clause 25, wherein the foam beads include approximately the same size and shape.

Clause 28: The article of footwear of Clause 25, wherein the foam beads include at least one of a different size and shape.

Clause 29: The article of footwear of Clause 25, further comprising a quantity of foam segments disposed within the casing, the foam segments having a different size and shape than the foam beads.

Clause 30: The article of footwear of Clause 29, wherein the quantity of foam segments is movable relative to the casing.

Clause 31: The article of footwear of Clause 29, wherein at least a portion of the quantity of foam segments is affixed to the casing by the elastomeric material.

Clause 32: The article of footwear of any of the preceding clauses, further comprising a cushioning material encapsulating the casing.

Clause 33: The article of footwear of any of the preceding clauses, further comprising at least one divider wall disposed within the interior void and bonded to walls of the casing to define at least two segments each containing a respective quantity of the particulate matter.

Clause 34: The article of footwear of any of the preceding clauses, wherein the casing is molded to conform to surface profiles of the inner surface of the outsole and the bottom surface of the midsole.

Clause 35: The article of footwear of any of the preceding clauses, further comprising a resilient member disposed within the cavity between the casing and the inner surface of the outsole.

Clause 36: A method of making an article of footwear, the method comprising providing a cavity between a footbed and an outsole and providing a casing containing a first quantity of particulate matter movable relative to the casing and a second quantity of particulate matter attached to the casing and inserting the casing into the cavity.

Clause 37: The method of Clause 36, further comprising forming the casing from a porous material.

Clause 38: The method of any of the preceding clauses, further comprising forming the casing from a flexible material.

Clause 39: The method of any of the preceding clauses, further comprising coating at least a portion of an exterior surface of the casing with an elastomeric material.

Clause 40: The method of Clause 39, wherein coating the casing with the elastomeric material includes coating the casing with a liquid elastomeric material.

Clause 41: The method of Clause 40, further comprising hardening the liquid elastomeric material.

Clause 42: The method of Clause 39, wherein coating the casing includes adhering the elastomeric material to the second quantity of particulate matter to attach the second quantity of particulate matter to the casing.

Clause 43: The method of any of the preceding clauses, further comprising encapsulating the casing with a first cushioning material.

Clause 44: The method of Clause 43, wherein encapsulating the casing with a first cushioning material includes attaching the first cushioning material to the casing via the elastomeric material.

Clause 45: The method of any of the preceding clauses, further comprising providing a tensile member disposed within the interior void of the casing and bonded to walls of the casing.

Clause 46: The method of any of the preceding clauses, further comprising securing walls of the casing together to define at least two segments each containing at least one of a portion of the first quantity of particulate matter and a portion of the second quantity of particulate matter.

Clause 47: The method of any of the preceding clauses, wherein providing the casing containing the first quantity of particulate matter and the second quantity of particulate matter includes providing the casing with a quantity of foam beads.

Clause 48: The method of Clause 47, wherein providing the quantity of foam beads includes providing foam beads having at least one of a substantially spherical shape and a substantially polygonal shape.

Clause 49: The method of Clause 47, wherein providing the quantity of foam beads includes providing foam beads having approximately the same size and shape.

Clause 50: The method of Clause 47, wherein providing the quantity of foam beads includes providing foam beads that include at least one of a different size and shape.

Clause 51: A method of making an article of footwear, the method comprising providing a cavity between a footbed and an outsole and providing a casing containing a first quantity of particulate matter and coating an exterior surface of the casing with an elastomeric material and hardening the elastomeric material and inserting the casing into the cavity.

Clause 52: The method of Clause 51, further comprising forming the casing from a porous material.

Clause 53: The method of any of the preceding clauses, further comprising forming the casing from a flexible material.

Clause 54: The method of any of the preceding clauses, further comprising encapsulating the casing with a first cushioning material.

Clause 55: The method of Clause 54, wherein encapsulating the casing with a first cushioning material includes attaching the first cushioning material to the casing via the elastomeric material.

Clause 56: The method of any of the preceding clauses, further comprising providing a tensile member disposed within the interior void of the casing and bonded to walls of the casing.

Clause 57: The method of any of the preceding clauses, further comprising providing the casing with a second quantity of particulate matter.

Clause 58: The method of Clause 57, further comprising attaching the second quantity of particulate matter to the second casing via the elastomeric material.

Clause 59: The method of Clause 57, wherein coating the exterior surface of the casing causes the elastomeric material to enter the casing and contact the second quantity of particulate matter.

Clause 60: The method of Clause 57, further comprising securing walls of the casing together to define at least two segments each containing at least one of a portion of the first quantity of particulate matter and a portion of the second quantity of particulate matter.

Clause 61: The method of Clause 57, wherein providing the casing containing the first quantity of particulate matter and the second quantity of particulate matter includes providing the casing with a quantity of foam beads.

Clause 62: The method of Clause 61, wherein providing the quantity of foam beads includes providing foam beads having at least one of a substantially spherical shape and a substantially polygonal shape.

Clause 63: The method of Clause 61, wherein providing the quantity of foam beads includes providing foam beads having approximately the same size and shape.

Clause 64: The method of Clause 61, wherein providing the quantity of foam beads includes providing foam beads that include at least one of a different size and shape.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
   an upper;
   an outsole attached to the upper and including a ground-engaging surface and an inner surface disposed on an opposite side of the outsole than the ground-engaging surface;

a midsole having a footbed and a bottom surface disposed on an opposite side of the midsole than the footbed and opposing the inner surface of the outsole to define a cavity therebetween; and a casing received within the cavity and extending along (i) a length of the outsole from a heel region to a forefoot region and (ii) a width of the outsole from a medial side to a lateral side, the casing formed entirely of a porous mesh material and defining an interior void containing a first quantity of particulate matter movable relative to the casing along both the length and width of the outsole and a second quantity of particulate matter affixed to the porous mesh material.

2. The article of footwear of claim 1, wherein the casing includes a flexible material.

3. The article of footwear of claim 1, further comprising an elastomeric material disposed on a surface of the casing.

4. The article of footwear of claim 3, wherein the elastomeric material is disposed on an exterior surface of the casing.

5. The article of footwear of claim 4, wherein at least a portion of the elastomeric material extends into the interior void of the casing.

6. The article of footwear of claim 5, wherein the second quantity of particulate matter attaches to the casing by adhering to the elastomeric material.

7. The article of footwear of claim 4, wherein the elastomeric material encapsulates the mesh material.

8. The article of footwear of claim 3, further comprising a first foam segment attached to the elastomeric material.

9. The article of footwear of claim 8, further comprising a second foam segment disposed within the interior void of the casing.

10. The article of footwear of claim 1, further comprising at least one divider wall disposed within the interior void and bonded to walls of the casing to define at least two segments each containing at least one of a portion of the first quantity of particulate matter and a portion of the second quantity of particulate matter.

11. The article of footwear of claim 1, wherein the particulate matter includes foam beads.

12. The article of footwear of claim 11, wherein the foam beads include at least one of a substantially spherical shape and a substantially polygonal shape.

13. The article of footwear of claim 11, wherein the foam beads include approximately the same size and shape.

14. The article of footwear of claim 11, wherein the foam beads include at least one of a different size and shape.

15. The article of footwear of claim 1, wherein the casing is molded to conform to surface profiles of the inner surface of the outsole and the bottom surface of the midsole.

16. An article of footwear comprising:

an upper;

an outsole attached to the upper and including a ground-engaging surface and an inner surface disposed on an opposite side of the outsole than the ground-engaging surface;

a midsole having a footbed opposing the upper and a bottom surface disposed on an opposite side of the midsole than the footbed and opposing the inner surface of the outsole to define a cavity therebetween, the cavity extending along (i) a length of the outsole from a heel region to a forefoot region and (ii) a width of the outsole from a medial side to a lateral side; and a casing including a porous mesh material encapsulated within an elastomeric material and received within and filling the cavity, the casing including a first portion of particulate matter affixed to the mesh material by the elastomeric material.

17. The article of footwear of claim 16, wherein the casing further includes an interior void, the particulate matter including a second portion disposed within the interior void and movable relative to the casing.

18. The article of footwear of claim 16, wherein the casing encloses the entire interior void.

19. The article of footwear of claim 16, wherein the elastomeric material is applied to exterior surfaces of the casing as a liquid.

20. The article of footwear of claim 19, wherein at least a portion of the elastomeric material extends into the casing.

* * * * *